(12) United States Patent
Fujisawa et al.

(10) Patent No.: US 7,937,718 B2
(45) Date of Patent: May 3, 2011

(54) DISC DEVICE WITH SHUTTER TO BLOCK INSERTION OF A DISK

(75) Inventors: Shinichi Fujisawa, Akiruno (JP); Kazuo Yokota, Arakawa-ku (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1043 days.

(21) Appl. No.: 11/789,715

(22) Filed: Apr. 24, 2007

(65) Prior Publication Data

US 2007/0250843 A1  Oct. 25, 2007

(30) Foreign Application Priority Data

Apr. 24, 2006  (JP) .................................. 2006-119394

(51) Int. Cl.
G11B 17/04 (2006.01)
G11B 33/12 (2006.01)

(52) U.S. Cl. ..................... 720/620; 720/647; 720/652

(58) Field of Classification Search .................. 720/617, 720/620, 622, 623, 647, 631, 645, 652
See application file for complete search history.

(56) References Cited

U.S. PATENT DOCUMENTS

| 6,157,607 A * | 12/2000 | Nakamichi | 720/623 |
| 6,751,180 B2 * | 6/2004 | Tanaka et al. | 720/623 |
| 2005/0229193 A1 | 10/2005 | Omori et al. | |

FOREIGN PATENT DOCUMENTS

| JP | 2002117604 A | 4/2002 |
| JP | 2002230878 A | 8/2002 |
| JP | 2003068003 A | 3/2003 |
| JP | 2005251363 A | 9/2005 |
| JP | 2005267781 A | 9/2005 |

* cited by examiner

*Primary Examiner* — Craig A. Renner
*Assistant Examiner* — Gustavo Polo
(74) *Attorney, Agent, or Firm* — Seed IP Law Group PLLC

(57) ABSTRACT

A disc device has a plurality of arms configured to support the outer rim of a disc carryable. Automatic loading is applied such that the disc inserted can be carried in the device, and the disc housed inside the device can be carried out of the device. A pair of shutter pieces are located on the central portion of a slot in a front bezel to be used to insert the disc therethrough and are spaced at a certain interval. The shutter piece rotates about one end thereof to raise/tumble the other end thereof. The tumbled shutter piece changes to the raised state after the disc is housed in the device while the shutter piece changes to the tumbled state before the disc housed inside the device is carried out of the device.

3 Claims, 53 Drawing Sheets

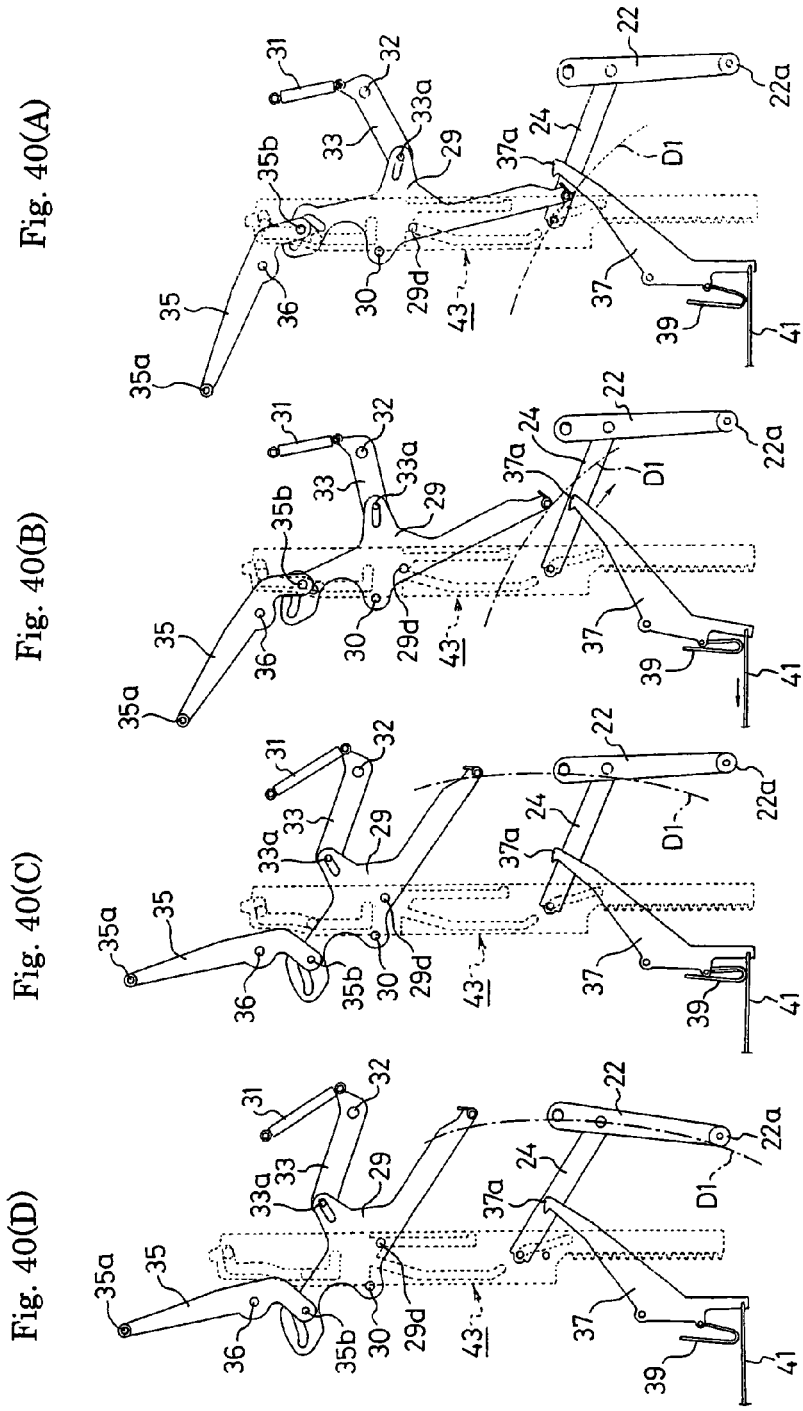

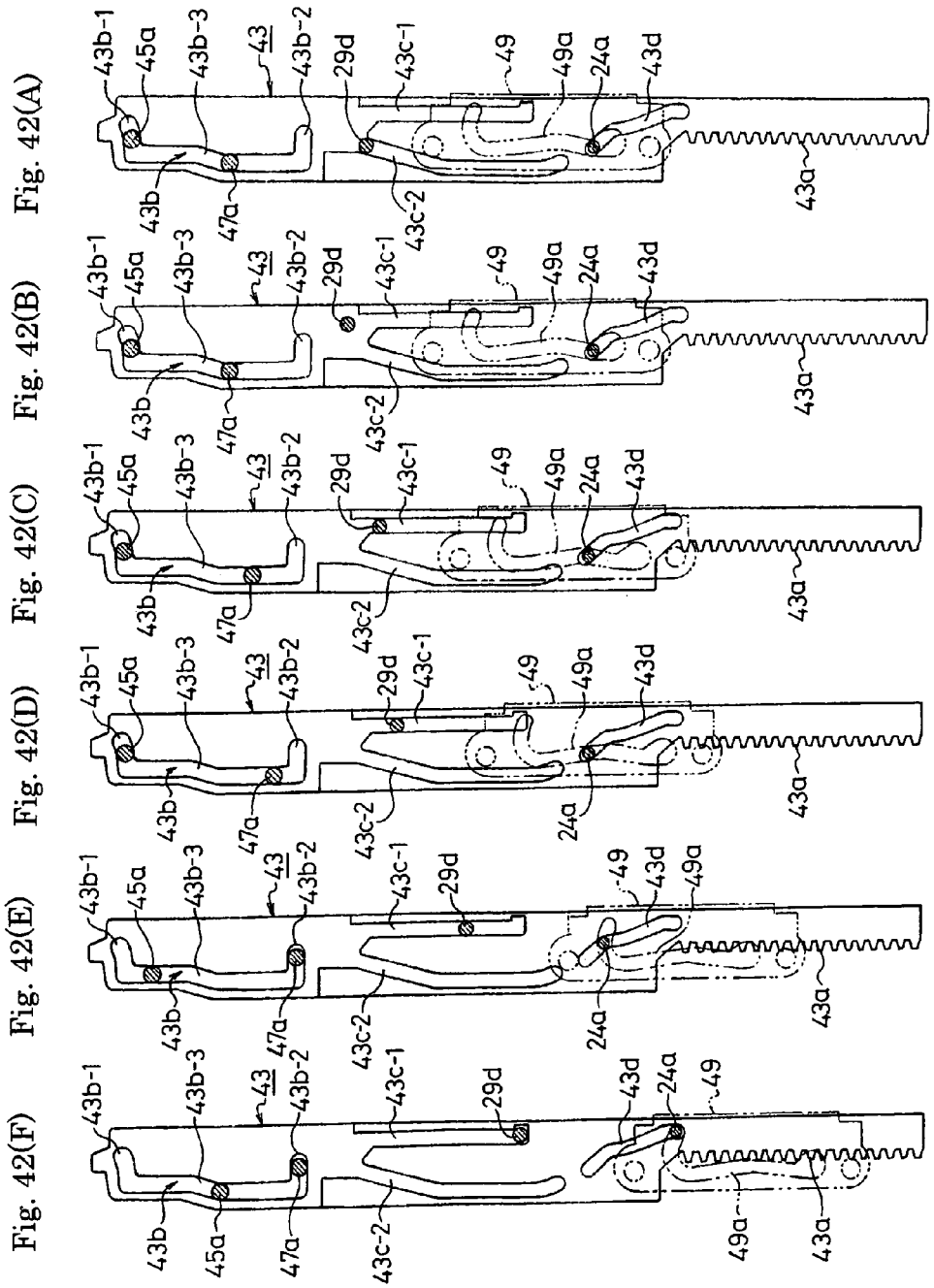

DISC DEVICE WITH SHUTTER TO BLOCK INSERTION OF A DISK

BACKGROUND OF THE INVENTION

1. Field of the Invention

The present invention relates to a disc device configured to drive optical discs (such as CD-R/RW, DVD-R/-RW/RAM/+R/+RW) that serve as record media to record mass information in information instruments such as various computer systems.

2. Description of the Related Art

In general, a disc device contained in a personal computer or the like is usually provided with a disc tray to load a disc therein and configured such that the disc tray moves forward and backward. The disc loaded in the disc tray is driven within a body of the disc device to record and reproduce information.

On the other hand, a disc device of the slot-in type is widely employed as the disc-trayless type. This tendency is suitable for thinning and downsizing the personal computer. The disc device of the slot-in type does not employ any disc tray to carry the disc in (load)/out of (unload) the device body. Therefore, after an operator inserts most of the disc into the slot, a loading mechanism in the device body is actuated such that the disc is automatically carried in.

FIGS. 51 and 52 show an arrangement and operation mode of a loading mechanism in a conventional disc device of the slot-in type. In the shown arrangement, after an operator inserts a disc D, the disc D reaches the position shown in FIG. 51. During this process, the disc is restricted for the elevation and lateral position from a tip pin 100a of a first swinging member 100 and a left and a right guide member 101, 102 and, after some midpoint, a tip pin 103a of a second swinging member 103.

At this time, the first swinging member 100 rotates in the direction of the arrow 100A as the disc D pushes the tip pin 100a. In addition, the second swinging member 103 also rotates in the direction of the arrow 103A as the disc D pushes the tip pin 103a. As pushed by the end of the second swinging member 103, a switch lever 104 rotates in the direction of the arrow 104A and actuates a detector switch 105.

When the detector switch 105 is actuated, a drive means 106 starts to operate and a first slid member 107 begins to move in the direction of the arrow 107A. The first slide member 107 and a second slide member 108 have tips linked via a slide link member 109. The slide link member 109 is swingably pivoted about a pin 110. Accordingly, in synchronization with the backward movement of the first slide member 107, the second slide member 108 moves forward in the direction of the arrow 108A.

When the first slide member 107 starts the backward movement in this way, the first swinging member 100 cantilevered on the first slide member 107 rotates in the direction of the arrow 100B about a fulcrum 100c because a cam groove 107a in the first slide member 107 guides a follower pin 100b. As a result, the tip pin 10a of the first swinging member 100 carries the disc D in the direction of the arrow 107A until the disc impinges on pins 111a, 111b of a disc positioning member 111.

At this time, the tip pin 103a of the second swinging member 103 rotates in the direction of the arrow 103A. Accordingly, the tip pin 103a of the second swinging member 103 supports the disc D in synchronization with the tip pin 100a of the first swinging member 100 and moves in the direction of the arrow 103A. After the disc D impinges on the pins 111a, 111b of the disc positioning member 111, the tip pin 103a rotates to a position slightly apart from the disc D.

The foregoing is associated with the operation mode of the loading mechanism when the disc D is carried in the device. When the disc D is carried out of the device, in contrast, the loading mechanism operates in the reverse operation mode to the foregoing. Namely, when the disc D is located in place inside the device as shown in FIG. 52, the drive means 106 is actuated in the direction of reverse rotation based on a carry-out instruction. In this case, the first slide member 107 starts to move forward in the direction of the arrow 107B and, in synchronization with this movement, the second slide member 108 linked to the slide link member 109 moves backward in the direction of the arrow 108A. As a result, the first swinging member 100 rotates in the direction of the arrow 100A and the second swinging member 103 in the direction of the arrow 103B. Accordingly, the tip pins 100a, 103a support the disc D and carry it out of the device.

The disc D carried inside the device is clamped on a clamp head 112 that can move upward/downward in place. The clamp head 112 is integrated with a turntable 113 fixed to a drive shaft of a spindle motor 114. The spindle motor 114 is disposed on a frame member (not shown). An elevator mechanism is used to move the frame member upward/downward (for example, Patent Document 1: JP 2002-117604A).

As described above, in the disc device of the slot-in type, the disc is inserted through the slot in the front bezel and housed in the device through the application of automatic loading. In this state, the disc can not be viewed from the outside. In particular, the slot in the front bezel has an aperture width designed minimum. In addition, if a shield member is provided to prevent dusts from entering, it is made quite impossible to view the disc.

In the disc device of the slot-in type thus configured, even if the disc housed inside the device is being driven, another disc may be erroneously inserted into the slot. In such the case, the outer rims of both the discs contact each other to lower the rotation speed of the driven disc, leaving a risk of critical damages imposed on reading/writing data from/in the disc.

To solve such the problem, the existing product of the present applicant includes a shutter configured to move upward/downward at the central portion of the slot in the front bezel. The shutter is used to prevent another disc from entering. FIG. 53 shows an arrangement for allowing the shutter to move upward/downward. The arrangement includes a slide member 201 having a vertical groove 201a formed at an end and capable of laterally sliding. The slide member 201 is disposed on a front flange 202c of a base panel 202 having a pair of slanting grooves 202a, 202b formed therethrough. The shutter 203 has a pin 203a provided at the lower end thereof, which is inserted into the vertical groove 201a and the slanting groove 202a at the same time, and the other pin 203b, which is inserted into the slanting groove 202b, to assemble the arrangement.

Therefore, as the slide member 201 slides in the direction of the arrow as shown in FIG. 53(B), the vertical groove 201a pulls the pin 203a on the shutter 203. As a result, the pin 203a ascends along the slanting groove 202a and the shutter 203 ascends to a position sufficient to block the central portion of the slot in the front bezel as shown in FIG. 53(C). Namely, the slanting groove 202a is configured to forcibly convert the lateral force of the slide member 201 into the longitudinal force.

As configured above, the width in the longitudinal direction of the vertical groove 201a and the slanting grooves 202a, 202b for moving the shutter 203 upward/downward corresponds to the stroke of the shutter 203 moving upward/downward. Accordingly, the width in the longitudinal direction can not be made smaller than the latter. Namely, the width in the longitudinal direction of the front flange 202c of the base panel 202 is determined from the vertical groove 201a and the slanting grooves 202a, 202b. Therefore, the width of this portion can not be reduced further and indicates the limit of thinning the disc device.

An ascent/descent of the pin 203a utilizes variations in mutual position of the vertical groove 201a and the slanting groove 202a. Therefore, a sliding contact resistance occurs between the pin 203a and each groove and requires a larger drive torque. This is not a suitable arrangement for seeking stable operation with no variation overtime. Further, when the shutter 203 reaches the highest state, the lower end thereof supports two pins 203a, 203b at the tip of a shutter cover 204. Accordingly, the shutter is cantilevered and the structural hardness can not be enhanced. Thus, the structure becomes unstable such that it easily tumbles when the disc D impinges thereon as shown in FIG. 54 and damages the rim of the disc D as a malfunction.

Even the shutter 203 thus configured can block the entry of a large diameter disc D1 generally referred to as a 12 cm disc and prevent it from contacting another large diameter disc D1 housed inside the device and driven as shown in FIG. 55. Incidentally, a small diameter disc D2 generally referred to as an 8 cm disc may be inserted erroneously. In such the case, part of the small diameter disc D2 enters between one aperture end of the slot in the front bezel and a side end of the shutter 203 and contacts the large diameter disc D1.

Specific numeric values may be applied to this case. For example, when the slot has a standard total aperture width W1 of 120.8 mm, and the shutter 203 has a total width W3 of 10.6 mm, one aperture end of the slot and the side end of the shutter 203 opposed thereto has a width W2 of 55.1 mm. Thus, the large diameter disc D1 contacts the small diameter disc D2. Therefore, it is required to make the total width W3 of the shutter 203 larger than 10.6 mm and the width W2 smaller than 55.1 mm. The above-described numeric values are minimum numeric values for fundamental design on the assumption that a clamp head locates on the central position of the slot. If the clamp head deviates from the central position of the slot either left or right, or if a front bezel with a larger depth is used and it changes the difference between the slot aperture and the clamp head, setting of numeric values corresponding to the state is required.

Such the malfunction is a problem that may arise even in a disc device configured to drive only the large diameter disc D1. The disc device configured to drive both the large diameter disc D1 and the small diameter disc D2 increases the probability of the erroneous insertion of the small diameter disc D2 because the user strongly recognizes that the device can also drive the small diameter disc D2.

A simple means for solving such the problem is to merely widen the shutter 203 though this means increasingly lowers the structural hardness. Even with such the provision, a mechanical problem on the upward/downward movement of the shutter 203, and a critical subject to reduce the width in the longitudinal direction of the front flange 202c of the base panel 202 to thin the entire disc device are left unsolved.

SUMMARY OF THE INVENTION

The present invention has been made to solve such the conventional problems and provide below-described means to solve the above subject.

In one embodiment the present invention provides a disc device having a plurality of arms configured to support the outer rim of a disc carryable such that the disc inserted through a slot formed in a front bezel can be automatically carried in the device and the disc carried inside the device can be automatically carried out of the device.

The device comprises a shutter piece located on a position of the central portion of the slot in the front bezel and configured to rotate about one end thereof to raise/tumble the other end thereof.

The shutter piece changes from the tumbled state to the raised state after the disc is carried in the device while the shutter piece changes from the raised state to the tumbled state before the disc is carried out of the device.

Preferably, the disc device of the present invention comprises a loading slider to be moved forward/backward to carry the disc in/out, and the shutter piece is raised/tumbled in engagement with the forward/backward movement of the loading slider.

Preferably, in the disc device of the present invention, the shutter piece is one of a pair of shutter pieces, which are located on the central portion of the slot and spaced at a certain interval.

Preferably, one aperture end of the slot and a side end of the shutter piece opposed thereto have a distance of 55.1 mm or less therebetween.

In another embodiment the present invention provides a disc device having a plurality of arms configured to support the outer rim of a disc carryable such that the disc inserted through a slot formed in a front bezel can be automatically carried in the device and the disc carried inside the device can be automatically carried out of the device. The device comprising:

a shutter piece located on a position of the central portion of the slot in the front bezel and configured to rotate about one end thereof to raise/tumble the other end thereof; and a rotation means configured to rotate the shutter piece such that the shutter piece changes from the tumbled state to the raised state after the disc is carried in the device while the shutter piece changes from the raised state to the tumbled state before the disc is carried out of the device.

Preferably, the disc device further comprises a loading slider to be moved forward/backward to carry in/out the disc, and the rotation means is a link arm linked to the loading slider and configured to raise/tumble the shutter piece in engagement with the forward/backward movement of the loading slider.

Preferably, the shutter piece is one of a pair of shutter pieces, which are located on the central portion of the slot and spaced at a certain interval.

Preferably, one aperture end of the slot and a side end of the shutter piece opposed thereto have a distance of 55.1 mm or less therebetween.

In accordance with the present invention, a shutter mechanism is given higher mechanical hardness. Accordingly, even if a disc inserted impinges thereon, it can retain a stable state. In addition, the configuration for actuating the shutter mechanism does not include any element that causes a sliding contact resistance. Accordingly, it is possible to achieve stable operation with no variation over time and provide the mechanism with higher reliability. Further, it is possible to reduce the stroke of driving the shutter and accordingly thin the disc device.

BRIEF DESCRIPTION OF THE DRAWINGS

FIGS. 40(A)-40(D) show process step diagrams illustrative of an operation mode of arms on carrying the large diameter disc.

FIGS. 42(A)-42(F) show process step diagrams illustrative of an operation mode of the loading slider and a follower pin.

DETAILED DESCRIPTION OF THE EMBODIMENTS

The embodiment of the present invention will now be described below as an example of a disc device configured to drive different large/small diameter discs though a disc device configure to drive only the large diameter disc also becomes a target to be implemented.

Figure 1:
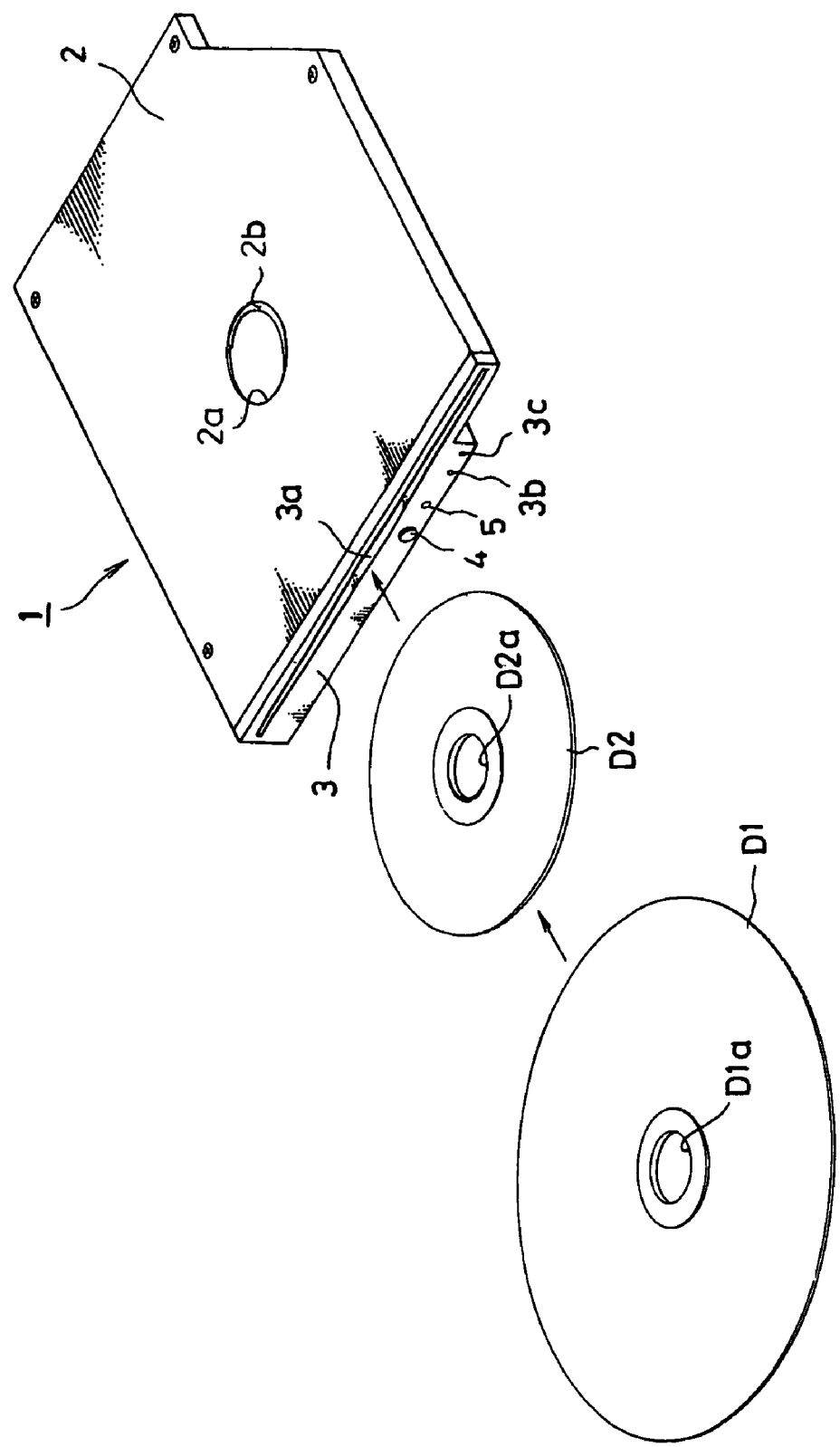
FIG. 1 is a perspective view of a disc device of the slot-in type implementing the present invention.

FIG. 1 shows an outward appearance of a disc device 1 of the slot-in type implementing the present invention, which includes a chassis case 2 configured shielded and having an aperture 2a formed through the center of a top plate. A protrusion 2b is formed at the rim of the aperture 2a and protruding into the inside. The chassis case 2 has a front end to which a front bezel 3 is secured. A slot 3a is formed through the front bezel to insert a 12 cm disc (hereinafter referred to as a large diameter disc) D1 and an 8 cm disc (hereinafter referred to as a small diameter disc) D2 therethrough. Through-holes 3b, 3c for emergency release are also formed through the front bezel 3. The front bezel 3 is provided with a pushbutton 4 for instructing the device to carry out the large diameter disc D1 or the small diameter disc D2, and an indicator 5 operative to indicate the operating state of the disc device 1.

Figure 2:
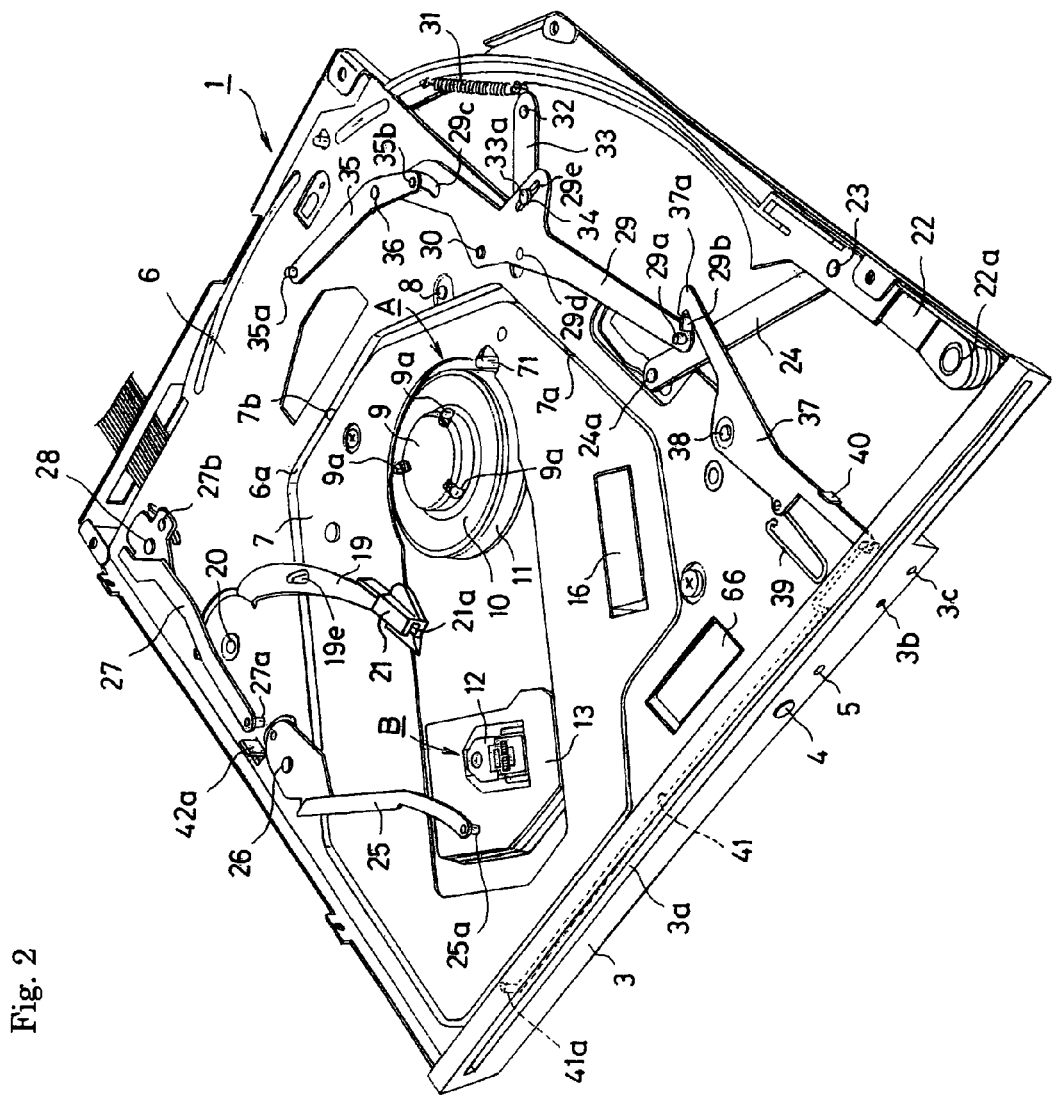
FIG. 2 is a perspective view showing an internal arrangement of the disc device of FIG. 1.

FIG. 2 is a perspective view of the device from which the top plate of the chassis case 2 is removed. A base plate 6 is disposed in the chassis case 2. A drive unit A for the large diameter disc D1 and the small diameter disc D2 is provided on the base plate at a location between the center thereof and a lower portion in a slanting direction. In order to clamp around central bores D1a, D2a of the large diameter disc D1 and the small diameter disc D2 or release the clamped disc, the drive unit A includes an elevator frame 7. The elevator frame has a rear end located on the center of the device and vertically swingable about the front bezel 3 as the fulcrum. The elevator frame is linked to the base panel 6 at plural locations by a known buffer support structure 8.

A clamp head 9 is placed on the tip of the elevator frame 7 at a position corresponding to the center of the large diameter disc D1 or the small diameter disc D2 carried inside and held stationary. The clamp head 9 is configured integral with a turntable 10 and fixed to a drive shaft of a spindle motor 11 arranged immediately below. The spindle motor 11 rotationally drives the large diameter disc D1 or the small diameter disc D2 clamped by chuck jaws of the clamp head 9 to record or reproduce information.

The reference symbol B denotes a head unit supported on the elevator frame 7. The head unit includes a carrier block 13 configured to reciprocate an optical pickup 12 in the direction of the diameter of the large diameter disc D1 and the small diameter disc D2. The carrier block 13 has both ends supported on guide shafts 14, 15 fixed to the elevator frame 7. The carrier block 13 moves forward/backward when it receives a drive force transmitted through a gear train 17 and a screw shaft 18 from a sled motor 16 (see FIG. 3).

Plural arms capable of managing carrying in and carrying out the large diameter disc D1 and the small diameter disc D2 are arranged on the flat plane of the base panel 6 as surrounding the elevator frame 7. They are configured as actuated by a drive mechanism disposed on the rear surface of the base panel 6. Of the plural arms, one that serves a central function in carrying in and carrying out the disc is a disc support arm 19. The disc support arm swings about a rivet pin 20 as the fulcrum to support the rear end of the large diameter disc D1 and the small diameter disc D2 and accurately retain the elevation in process steps of carrying. Therefore, it is provided with a holder 21 at the tip. The holder 21 has a recessed groove 21a to hold the rear end of the large diameter disc D1 and the small diameter disc D2 therein.

The reference numeral 22 denotes a loading arm for carrying the large diameter disc D1 into the device. The loading arm swings as it is pulled by a link lever 24 linked thereto via a pivot pin 23. The loading arm has a loading roller 22a, which starts to press the inserted large diameter disc D1 from the side closer to the front than the center thereof and serves a function of inducing the large diameter disc D1 into the device.

A guide arm 25 swings about a pivot pin 26 as the fulcrum, which is rotatably attached to the base panel 26. A support member 25a fixed to the tip thereof and hanging down therefrom serves a function of supporting the side of the small diameter disc D2 to be carried and inducing it in place. A guide arm 27 swings about a rivet pin 28 as the fulcrum. A support member 27a fixed to the tip thereof and hanging down therefrom serves a function of supporting the side of the large diameter disc D1 to be carried and inducing it in place. It also serves a function of supporting the side of the small diameter disc D2 and inducing it in place. The guide arm 27 has a pivot pin 27b at the base end thereof, to which an end of a third swinging member 51 and an end of a tension coil spring 53 are attached in the rear surface of the base panel 6.

A guide arm 29 swings about a rivet pin 30 as the fulcrum. A support member 29a fixed to the tip thereof and standing up therefrom serves a function of supporting the side of the small diameter disc D2 to be carried and inducing it in place. It also serves a function of supporting the side of the large diameter disc D1 and inducing it in place. A link lever 33 forced by a tension coil spring 31 swings about a rivet pin 32 as the fulcrum. The link lever has an action pin 33a, which engages a slit 29e in the guide arm 29. Accordingly, the tip of the guide arm 29 is always forced in the centripetal direction. A guide arm 35 linked in a guide groove 29c in the rear end of the guide arm 29 via a follower pin 35b swings about a rivet pin 36 as the fulcrum. A support member 35a fixed to the tip thereof and standing up therefrom serves a function of supporting the side of the large diameter disc D1 and the small diameter disc D2 and positioning them in place.

The reference numeral 37 denotes a lock lever, which swings about a rivet pin 38 as the fulcrum and allows an angle 37a formed on the tip thereof to engage a tongue 29b provided on the tip of the guide arm 29. The angle 37a on the tip of the lock lever 37 is always driven in the centripetal direction by a wire spring 39 but normally rests in place as a stopper 40 functions.

The reference numeral 41 denotes a lead wire, which is disposed along the lower side of the front bezel 3. It has an end coupled to the rear end of the lock lever 37, and an engagement end 41a folded standing and facing the slot 3a in the front bezel 3. Therefore, when the large diameter disc D1 is inserted through the slot 3a, the side of the large diameter disc D1 presses the engagement end 41a. Accordingly, the lead wire 41 moves laterally in parallel with the front bezel 3. As a result, the lock lever 37 is pulled and the angle 37a on the tip thereof swings in the centrifugal direction to prevent the tongue 29b of the guide arm 29 from engaging therewith.

In the mechanical elements exposed on the flat plane of the base panel 6, the reference numeral 42a denotes an engagement tongue of a lever arm 42 (see FIG. 3), which serves a function of position controlling the guide arm 27 of which operation mode is described later in detail. The reference numeral 71 denotes a clamp release pin for releasing the large diameter disc D1 and the small diameter disc D2 clamped by the clamp head 9.

The following description is given to the mechanical elements configured on the rear surface of the base panel 6 to actuate the guide arms and so forth configured on the flat plane of the base panel 6. The disc device 1 of the present invention is configured such that the forward/backward movement of the loading slider 43 arranged in the front/rear direction as shown on the side of the inside of the device with the phantom line in FIG. 3 can complete all operation controls associated with the large diameter disc D1 and the small diameter disc D2. The following description is given to the arrangement of the loading slider 43 that serves as the center of the mechanical elements, and the mechanical elements operatively controlled by the loading slider 43.

Figure 4:
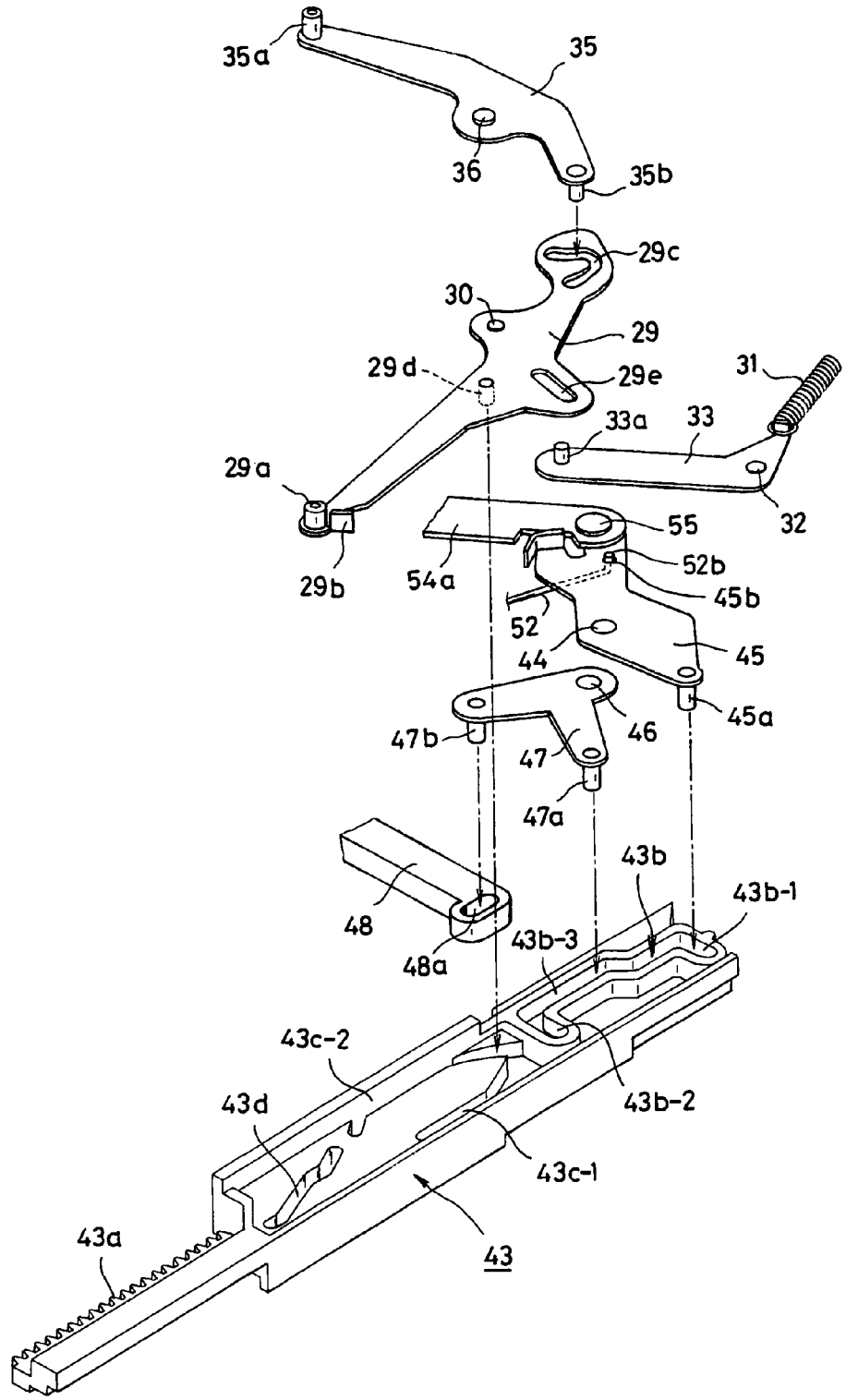
FIG. 4 is an exploded perspective view showing an arrangement of a loading slider.

FIG. 4 shows the loading slider 43 looked down from the point facing the rear surface of the base panel 6. As shown in the same figure, the loading slider 43 is formed in a pillar having a front end portion with a rack gear 43a formed thereon. It also has a rear end portion with a guide groove 43b formed therein that includes an upper end horizontal portion 43b-1, a lower end horizontal portion 43b-2, and a vertical portion 43b-3 having a step at the midpoint, arranged in communication with each other.

In the upper end horizontal portion 43b-l, there is placed a follower pin 45a of a first swinging member 45 that swings about a rivet pin 44 as the fulcrum. In the vertical portion 43b-3, there is placed a follower pin 47a of a second swinging member 47 that swings about a rivet pin 46 as the fulcrum.

The second swinging member 47 includes an action pin 47b, which is placed through an end through-hole 48a in a follower slider 48.

On both sides of a middle portion of the loading slider 43, a guide groove 43c-1 and a guide groove 43c-2 are formed. The guide groove 43c-1 has a slanting surface formed on the rear end portion thereof. The guide groove 43c-2 has front and rear ends tilted. A follower pin 29d of the guide arm 29 is placed such that it locates within an aperture in the rear end slanting portion of the guide groove 43c-2 when the loading slider 43 reaches the frontmost position.

Figure 5:
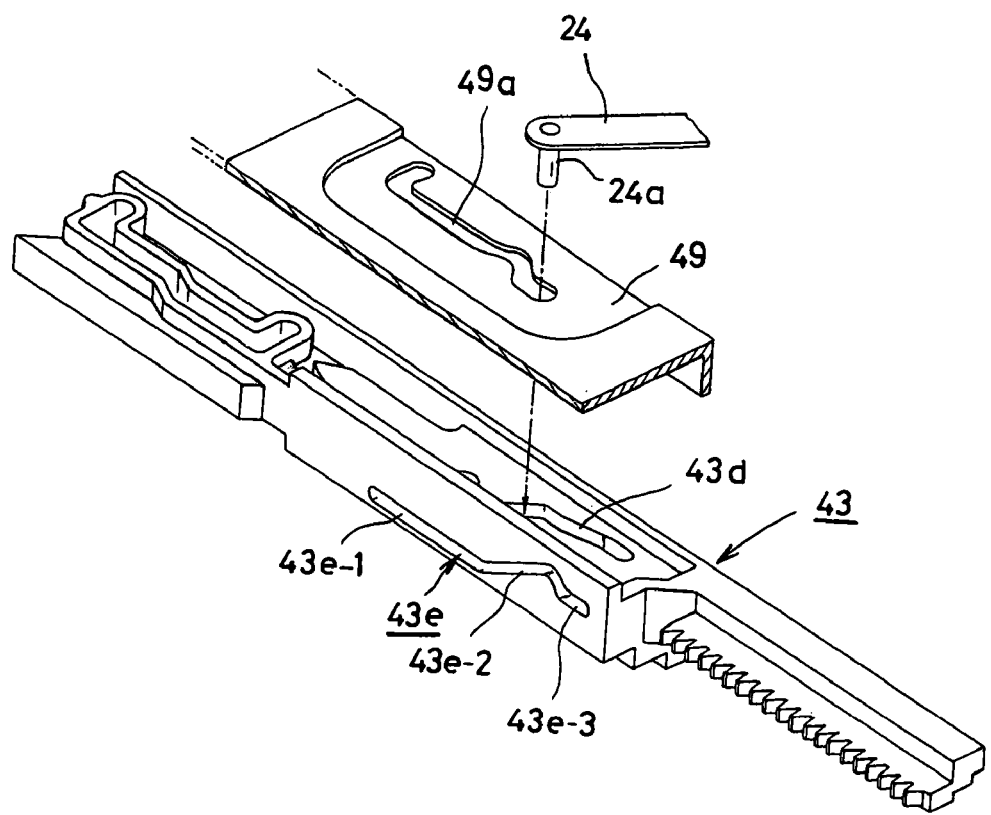
FIG. 5 is an exploded perspective view showing an arrangement of the loading slider and a guide plate.

The reference numeral 43d denotes an induction groove that pulls the link lever 24 such that the loading arm 22 is actuated in synchronization with the operation of carrying the large diameter disc D1. A guide slit 49a is formed through a guide plate 49 fixed to the base panel 6 on a position that overlaps the induction groove 43d as shown in FIG. 5. In this state, a follower pin 24a fixed to the tip of the link lever 24 is inserted into the induction groove 43d and the guides lit 49a. Therefore, the induction groove 43d capable of moving forward/backward interacts with the guide slit 49a located in place to control the operation of the follower pin 24a.

Through the side of the loading slider 43 facing the elevator frame 7, a cam groove 43e is formed to move a follower pin 7a upward/downward that controls the ascent/descent of the elevator frame 7. The cam groove 43e includes a lower portion 43e-1 to hold the elevator frame 7 at a lower position; a slanting portion 43e-2 to bring up or down the elevator frame 7; and a higher portion 43e-3 to hold the elevator frame 7 at a higher position, formed continuously therein.

Figure 6:
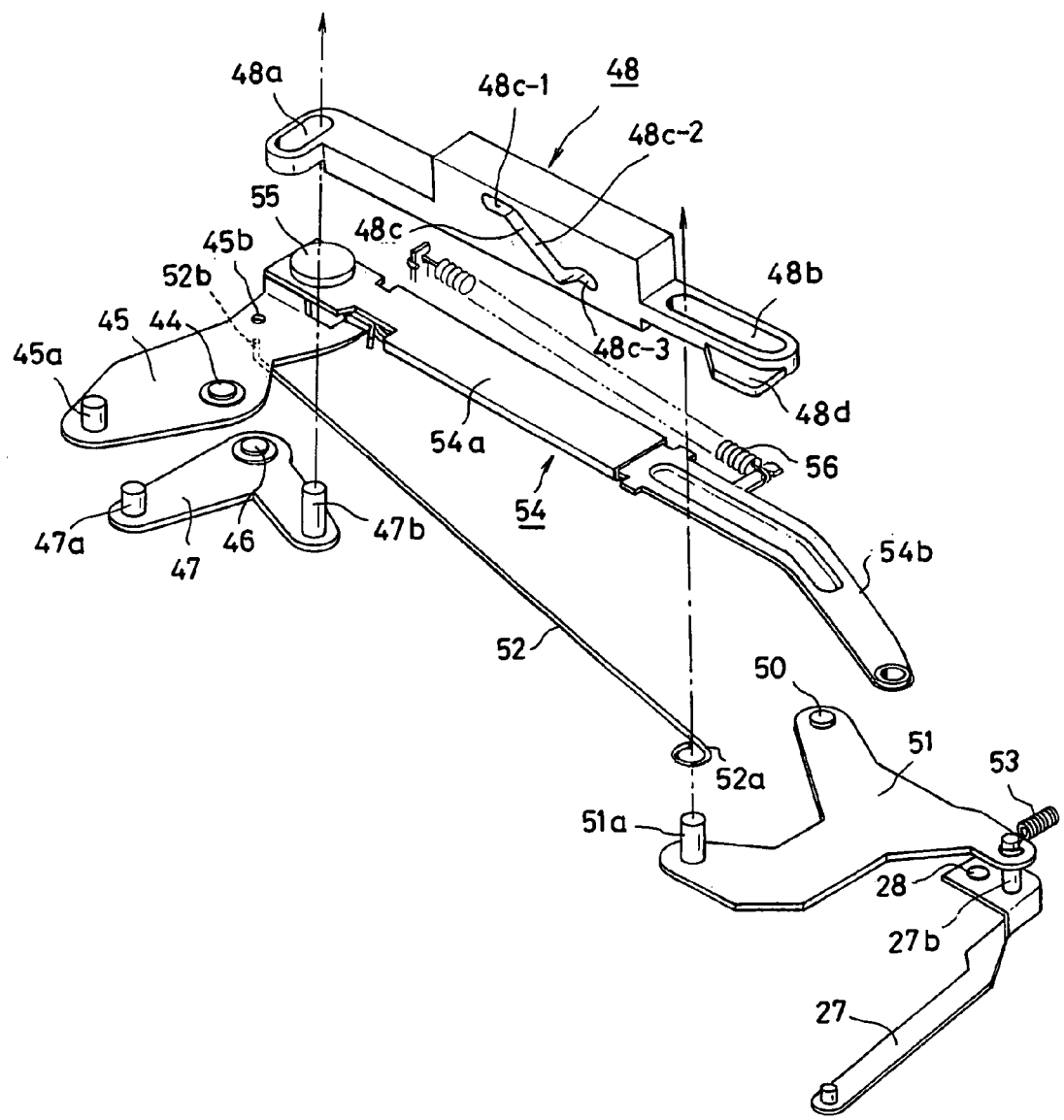
FIG. 6 is an exploded perspective view showing an arrangement of a power transmission mechanism.

FIG. 6 is an exploded perspective view of a power transmission mechanism configured at the rear of the inside of the device, which is looked down from the rear surface. A cam groove 48c is formed in the follower slider 48 to move a follower pin 7b upward/downward that controls the ascent/descent of the elevator frame 7. The cam groove 48c includes a lower portion 48c-1 to hold the elevator frame 7 at a lower position; a slanting portion 48c-2 to bring up or down the elevator frame 7; and a higher portion 48c-3 to hold the elevator frame 7 at a higher position, formed continuously therein.

The follower slider 48 has an end through-hole 48b, in which placed is an action pin 51a of the third swinging member 51 that swings about a rivet pin 50 as the fulcrum. A link wire 52 has one end 52a placed around the action pin 51a and the other end 52b engaged in the through-hole 45b of the first swinging member 45. A drive force from a tension coil spring 53 works on the third swinging member 51 counterclockwise in the same figure. In this case, though, the link wire 52 restricts the movement of the action pin 51a. Accordingly, the third swinging member rests in place when the device does not operate. In addition, an action piece 48d is formed on the side of the end through-hole 48b to actuate the lever arm 42.

A link arm 54 is linked between the first swinging member 45 and a later-described gear disc 59. It is configured stretchable with a first link arm 54a linked to the first swinging member 45 via a link member 55 and a second link arm 54b driven by a tension coil spring 56 in combination. The link arm is used to ensure the safety of the mechanism on carrying the large diameter disc D1 and the small diameter disc D2.

Figure 7:
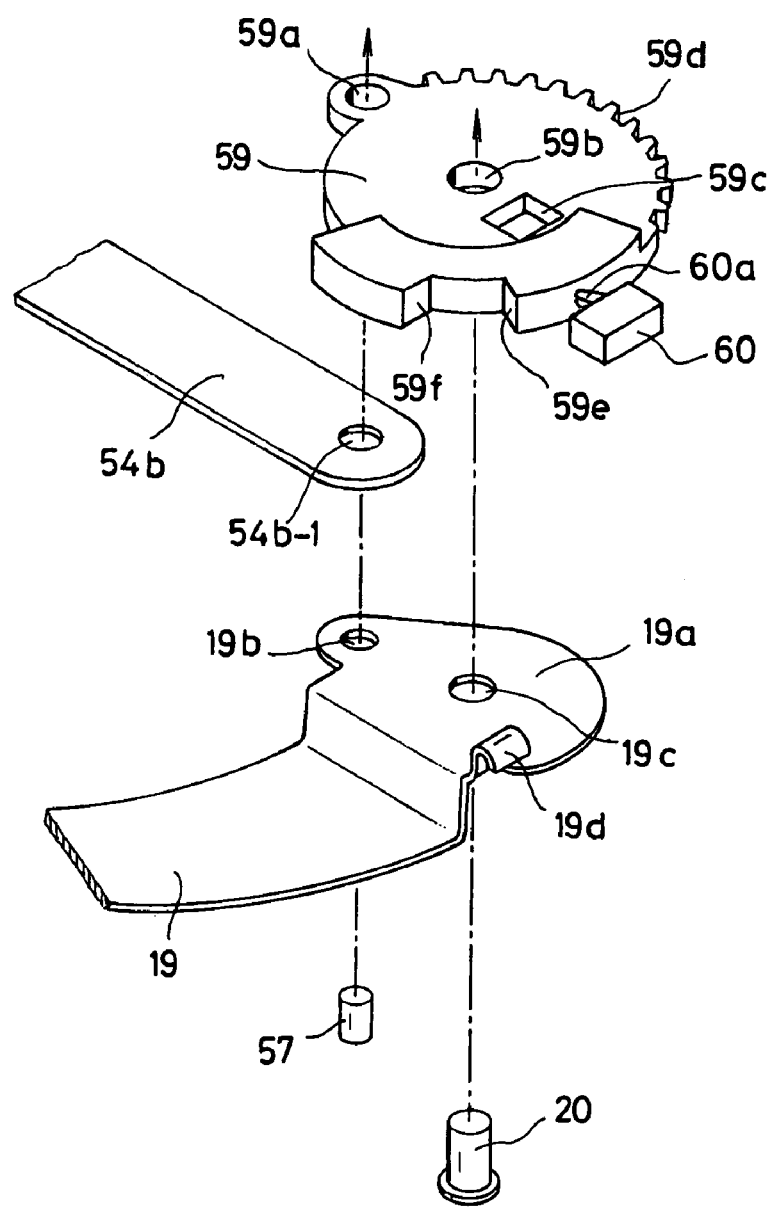
FIG. 7 is an exploded perspective view showing an arrangement of a gear disc.

FIG. 7 is a perspective view of an arrangement of an end of the second link arm 54b looked down from the rear surface of the device. A through-hole 54b-1 in the second link arm 54b, a through-hole 19b in a rotary substrate 19a of the disc support arm 19, and a through-hole 59a in a gear disc 59 are supported together about an axis by a pivot pin 57. A central hole 19c in the rotary substrate 19a of the disc support arm 19 and a central hole 59b in the gear disc 59 are supported together about an axis by the rivet pin 20 of which one end is fixed to the base panel 6. In this case, an engagement piece 19d of the rotary substrate 19a faces an engagement aperture 59c to be unified.

The gear disc 59 has a gear 59d formed in a portion of the outer rim opposing the side of the chassis case 2, and switch actuator steps 59e, 59f formed in the opposite portion of the outer rim. The switch actuator steps 59e, 59f turn on/off a limit switch 60, which is mounted on a circuit board (not shown) disposed on the bottom of the chassis case 2. The limit switch has a switch knob 60a, which is actuated by the switch actuator steps 59e, 59f.

The above-described lever arm 42 is fixed so as to swing about a rivet pin 61 as the fulcrum. The engagement tongue 42a thereof is faced to the front surface of the base panel 6 through the aperture of the base panel 6. In addition, the tip of a spring piece 42b thereof is brought into contact with an aperture wall 6a of the base panel 6 to generate a drive force that acts on a tip roller 42c in the centrifugal direction. This allows the lever arm 42 to rest in place when the roller 42c contacts the sidewall of the follower slider 48. When the follower slider 48 slides, the action piece 48d presses the roller 42c. As a result, the roller swings about the rivet pin 61 as the fulcrum and the engagement tongue 42a moves in the centrifugal direction.

Figure 3:
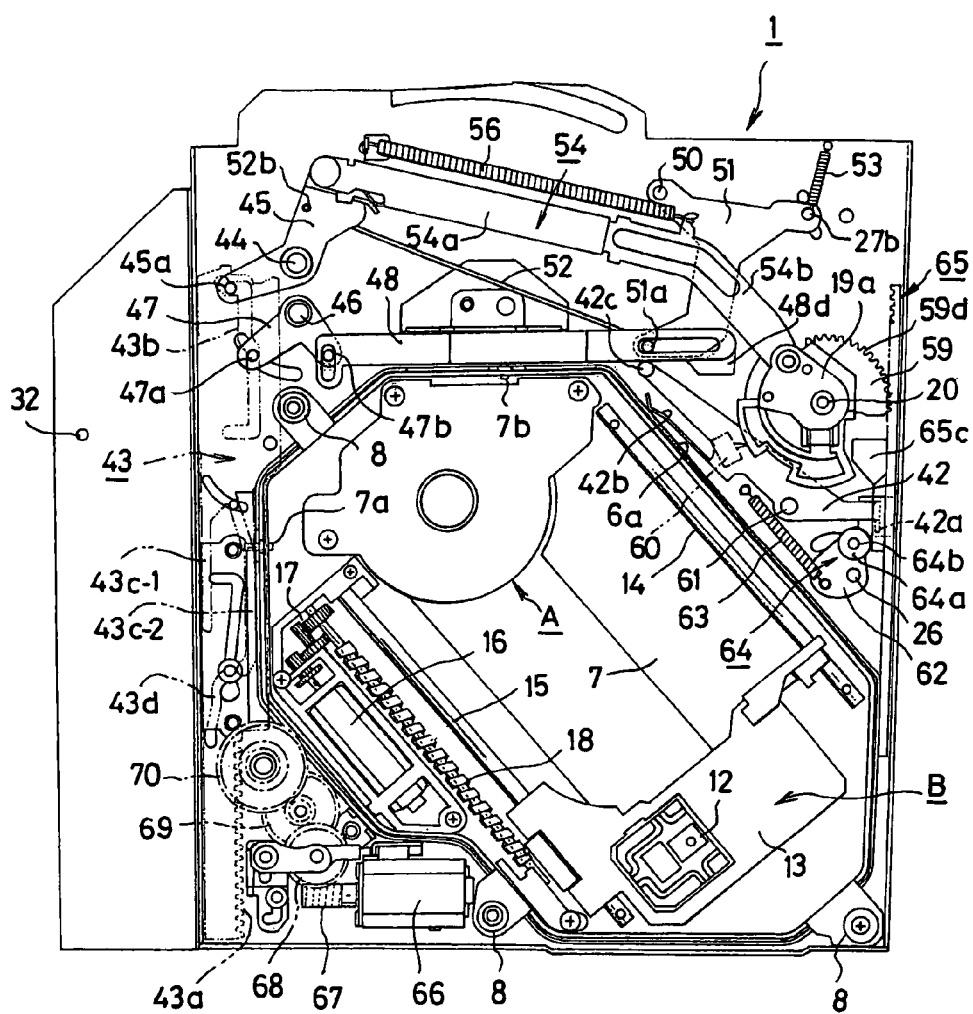
FIG. 3 is a perspective view showing an arrangement of a drive mechanism in the disc device of FIG. 1.
Figure 8:
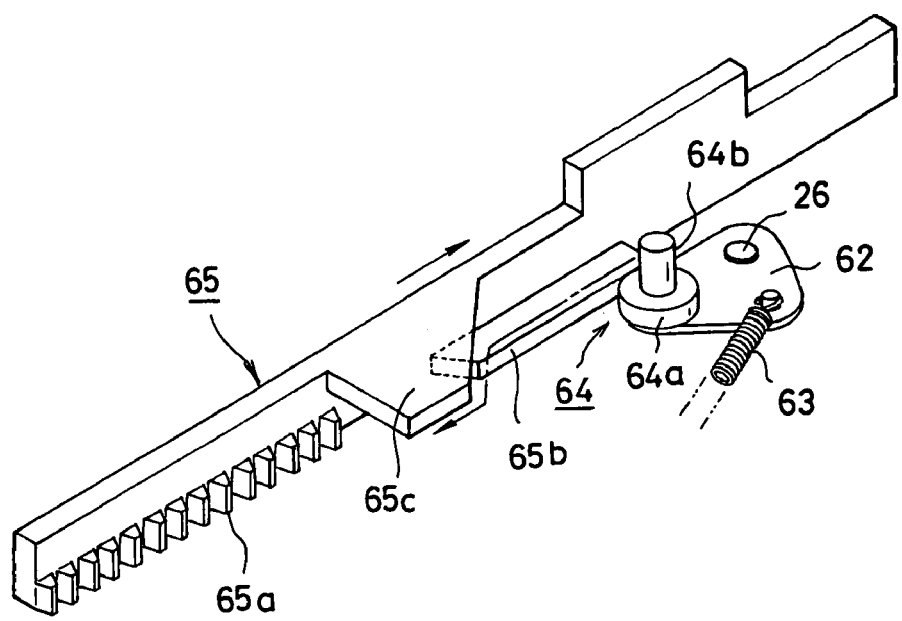
FIG. 8 is a perspective view showing an arrangement of a kick slider.

The following description is given to the mechanism for swinging the guide arm 25. The pivot pin 26 on the base end of the guide arm 25 serving as the fulcrum for swinging is extended to the back surface of the base panel 6 and a roller support plate 62 is fixed to the end of the pivot pin. A tension coil spring 63 is hooked to the roller support plate 62 as shown in FIG. 3. Accordingly, a drive force acts thereon clockwise in the same figure to tilt the guide arm 25 in the centripetal direction. A double roller 64 disposed on the roller support plate 62 comprises a large diameter portion 64a and a small diameter portion 64b configured coaxially as shown in FIG. 8.

In the same figure, a rack slider 65 disposed along the inner surface of the sidewall of the chassis case 2 comprises a rack gear 65a that mates with a gear 59d on the gear disc 59 and moves forward/backward in synchronization with the rotation of the gear disc 59. The rack slider 65 includes a lower guide piece 65b formed on the lower side of the middle portion thereof and a higher guide piece 65c on the higher side. The lower guide piece 65b guides the large diameter portion 64a while the higher guide piece 65c guides the small diameter portion 64b.

The mechanical elements thus configured are actuated with the forward/backward movement of the loading slider 43 and the drive mechanism thereof is disposed on the corner in the rear surface of the device as shown in FIG. 3. A loading motor 66 serves as the power source of the drive mechanism. It has an output shaft with a worm gear 67 of which rotation force is decelerated and transmitted sequentially through a gear train including double gears 68, 69, 70, from a small diameter gear to a large diameter gear. When a drive force is transmitted from a small diameter gear of the double gear 70 mated with the rack gear 43a of the loading slider 43, the loading slider 43 moves forward/backward.

The following description is given to the operation mode of the disc device 1 thus configured. As described above, the disc device of the present invention is configured such that it can carry the large diameter disc D1 and the small diameter disc D2. The mode of carrying the large diameter disc D1 is described first based on FIGS. 9-22 and the mode of carrying the small diameter disc D2 is then described based on FIGS. 23-36.

FIGS. 9-15 are plan views illustrative of the major part of the arrangement exposed on the front surface of the base panel 6 with the solid line while the major part of the arrangement in the rear surface of the base panel 6 at this time is shown with the dashed line. FIGS. 16-22 are bottom views illustrative of the major part of the arrangement exposed on the rear surface of the base panel 6 with the solid line while the major part of the arrangement in the front surface of the base panel 6 at this time is shown with the dashed line. In FIGS. 9-15 the cam grooves 43e, 48c and the follower pins 7a, 7b do not appear originally though they are shown in the same figures for convenience of description to facilitate understanding.

Figure 9:
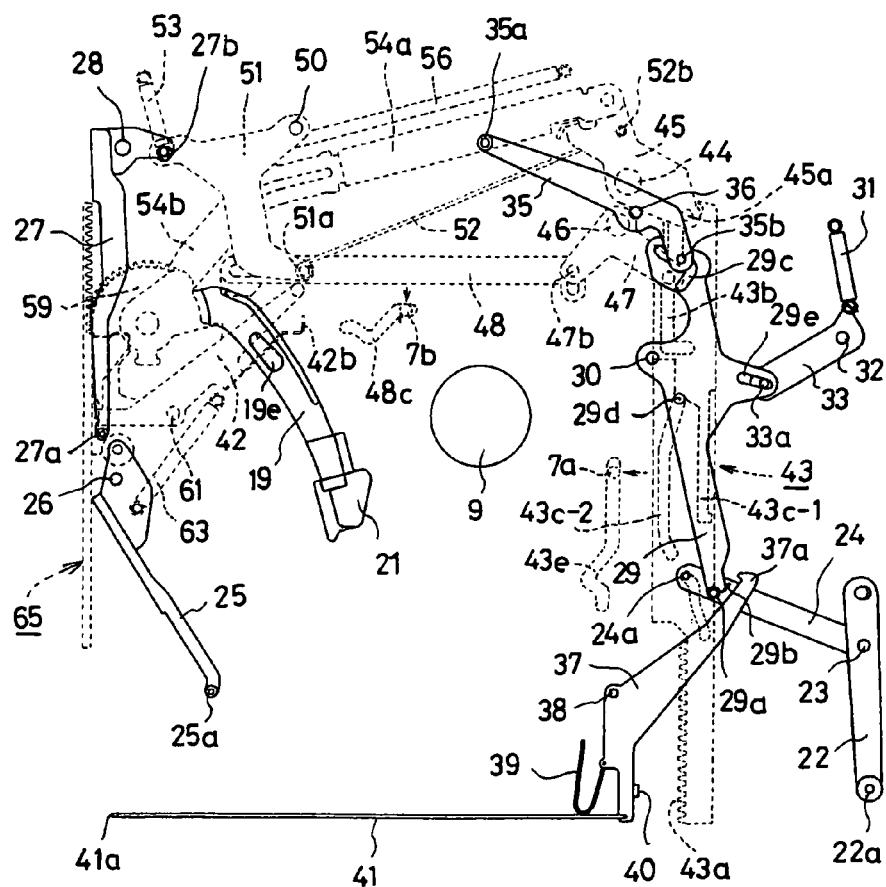
FIG. 9 is a first process step diagram illustrative of the state of carrying a large diameter disc.
Figure 16:
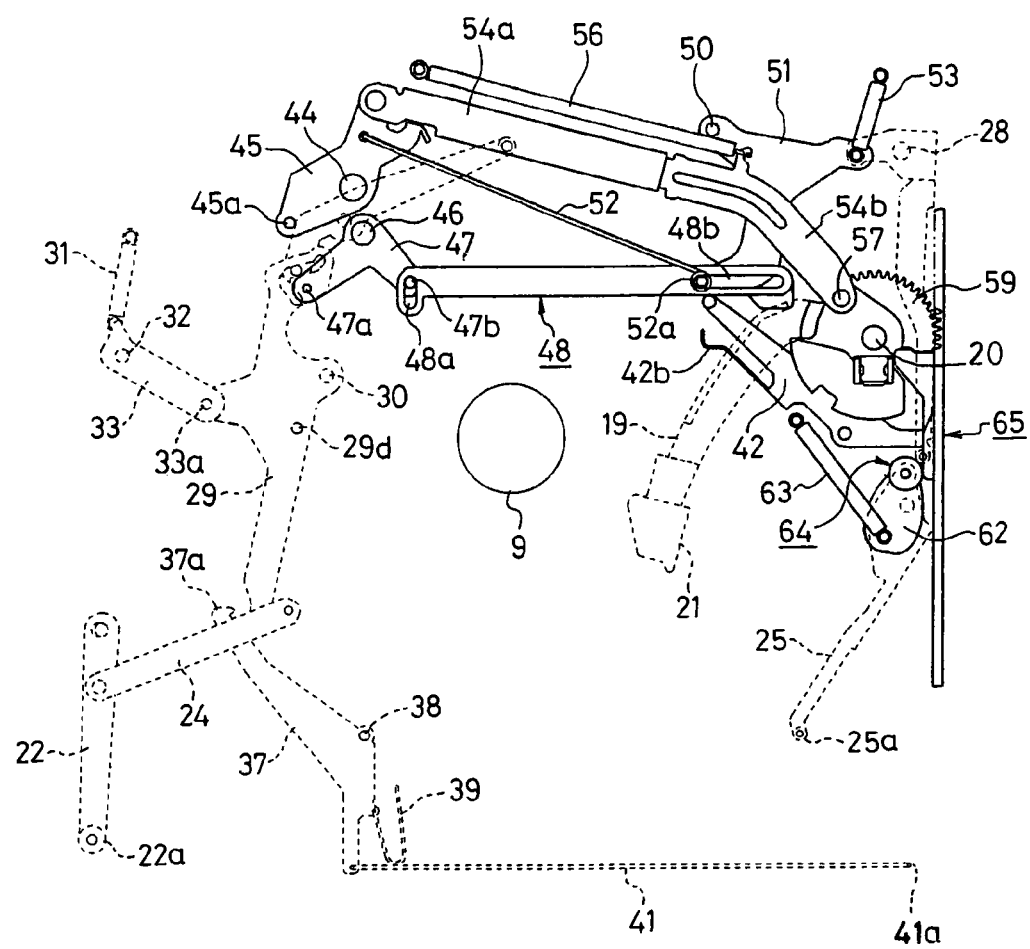
FIG. 16 is a first process step diagram illustrative of the state of carrying the large diameter disc.

FIGS. 9 and 16 show a state in which the large diameter disc D1 is on standby to be inserted through the slot 3a in the front bezel 3 and each arm rests in an initial state. At this time, the large diameter portion 64a of the double roller 64 of the roller support plate 62 fixed to the pivot pin 26 in the rear surface of the base panel 6 impinges on the lower guide piece 65b of the rack slider 65 as shown in FIGS. 8 and 16. In this case, the guide arm 25 halts on a position where it swings a certain distance in the centrifugal direction than a position where it swings most in the centripetal direction.

Halting the guide arm 25 on the position where it swings a certain distance in the centrifugal direction than the position where it swings most in the centripetal direction to wait for an insertion of the disc in this way is for the following reason. Namely, the guide arm 25 may also halt on the position where it swings most in the centripetal direction to wait for an insertion of the disc. In this case, however, when the small diameter disc D2 is inserted into the device near the left side, the small diameter disc D2 enters the left side of the support member 25a. In such the case, the small diameter disc D2 can not be carried. This malfunction can be prevented by halting the guide arm 25 as described above.

As the base end of the guide arm 27 is driven by the tension coil spring 53, a force always works such that the support member 27a at the tip swings in the centripetal direction. In this case, though, as the third swinging member 51 coupled to the pivot pin 27b rests in place, the guide arm 27 rests in the state shown in FIG. 9. This is because the link wire 52 attached between the first swinging member 45 at rest and the action pin 51a on the third swinging member 51 serves as a stopper and prevents the third swinging member 51 from swinging.

Figure 37A:
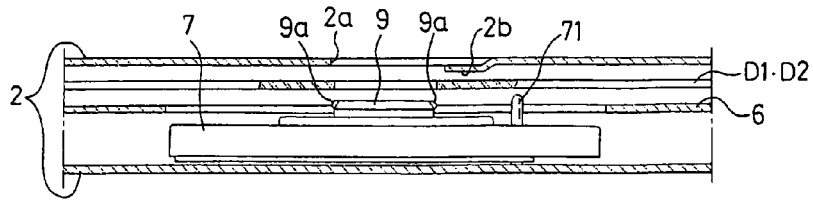
FIGS. 37(A)-37(E) show process step diagrams illustrative of process steps in which an elevator frame ascends.

Similarly, the disc support arm 19, the guide arm 29, the guide arm 35 and the loading arm 22, to which power is transmitted in accordance with the movement of the loading slider 43, also rest in the state shown in FIG. 9. The follower pin 7a on the elevator frame 7 guided through the cam groove 43e in the loading slider 43 locates in the lower portion 43e-1 of the cam groove 43e. On the other hand, the follower pin 7b on the elevator frame 7 guided through the cam groove 48c in the follower slider 48 locates in the lower portion 48c-1 of the cam groove 48c. Accordingly, the elevator frame 7 rests in the lowermost state as shown in FIG. 37(A).

Figure 10:
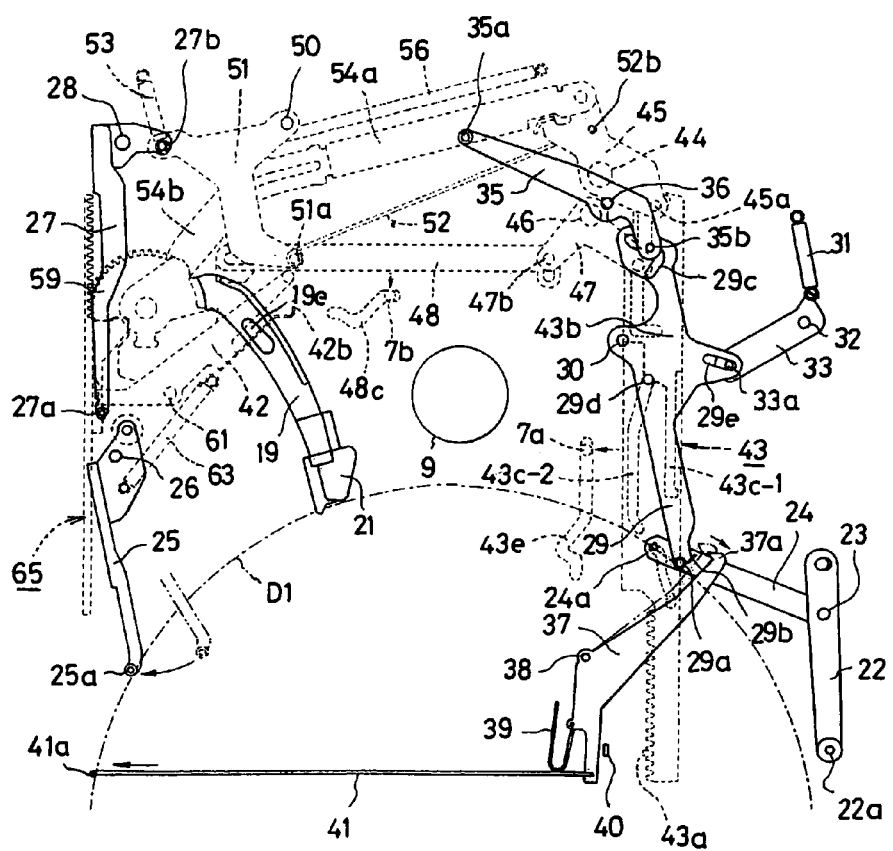
FIG. 10 is a second process step diagram illustrative of the state of carrying the large diameter disc.
Figure 17:
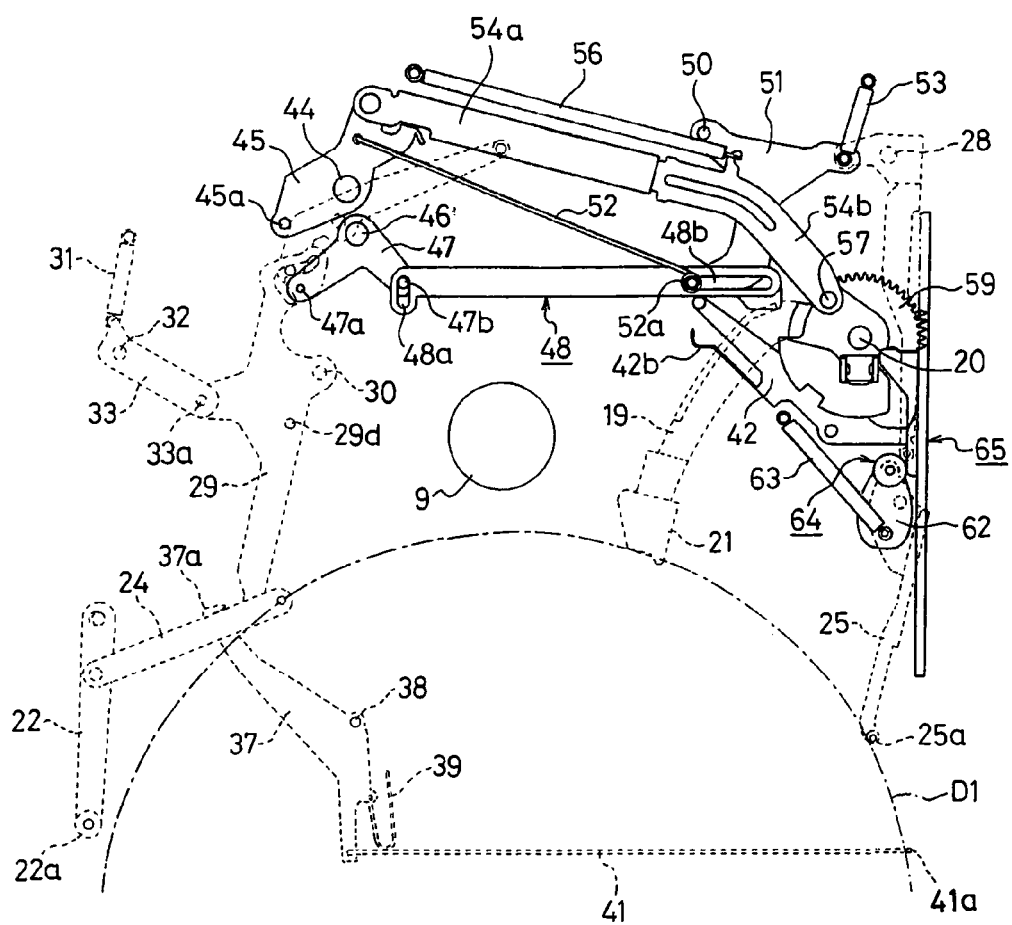
FIG. 17 is a second process step diagram illustrative of the state of carrying the large diameter disc.

FIGS. 10 and 17 show a state in which the operator inserts the large diameter disc D1 through the slot 3a in the front bezel 3. In this state, the front side of the large diameter disc D1 in the direction of insertion impinges on the holder 21 of the disc support arm 19 and the support member 29a of the guide arm 29. At this time, the large diameter disc D1 presses the support member 25a on the tip of the guide arm 25 such that the guide arm 25 swings in the centrifugal direction from the position shown with the phantom line in FIG. 10. Further, the side of the large diameter disc D1 presses the arrangement end 41a of the lead wire 41 to slide the lead wire 41 in the direction indicated by the arrow in the same figure. As a result, the lead wire 41 pulls the lock lever 37 and the angle 37a on the tip thereof swings in the direction indicated by the arrow in the same figure. Accordingly, the angle falls outside the range of engagement with the tongue 29b on the tip of the guide arm 29.

Figure 11:
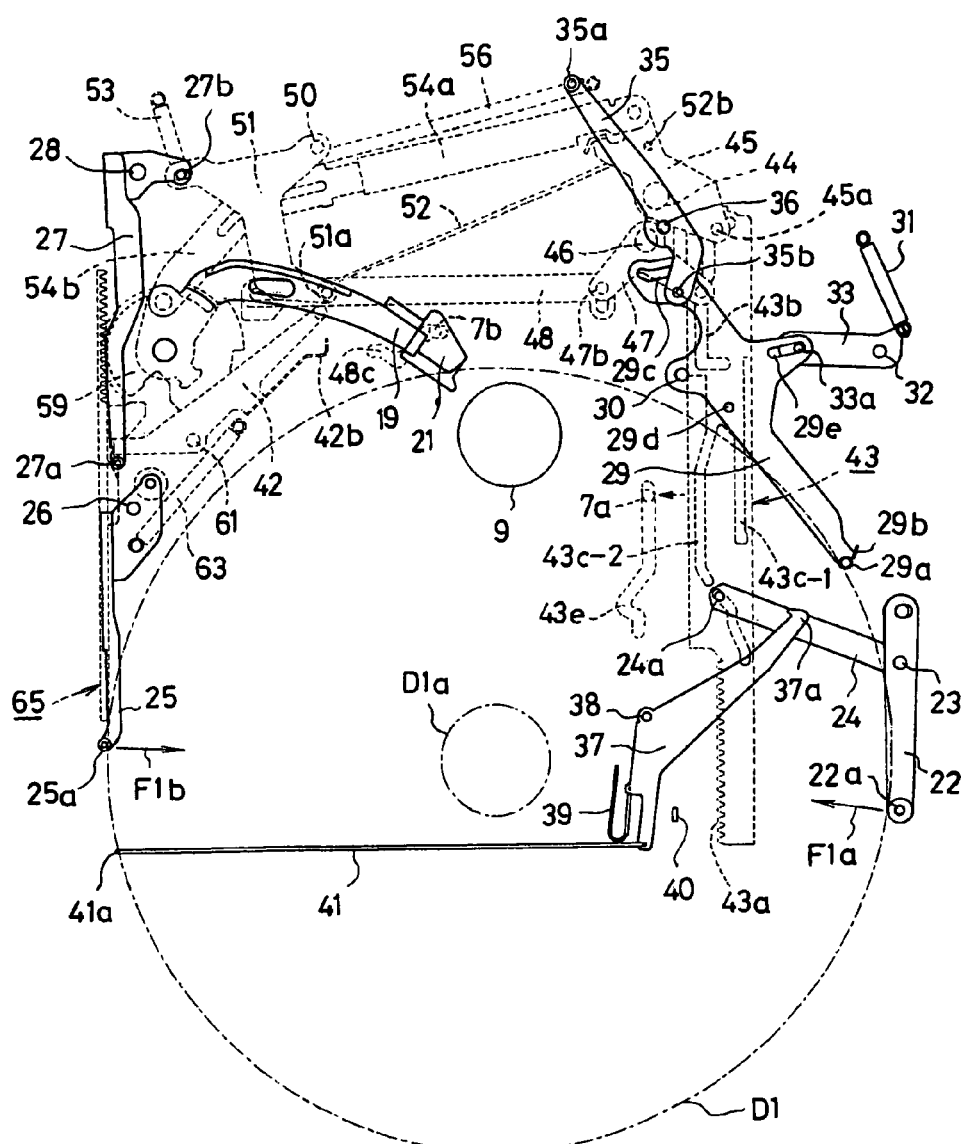
FIG. 11 is a third process step diagram illustrative of the state of carrying the large diameter disc.
Figure 18:
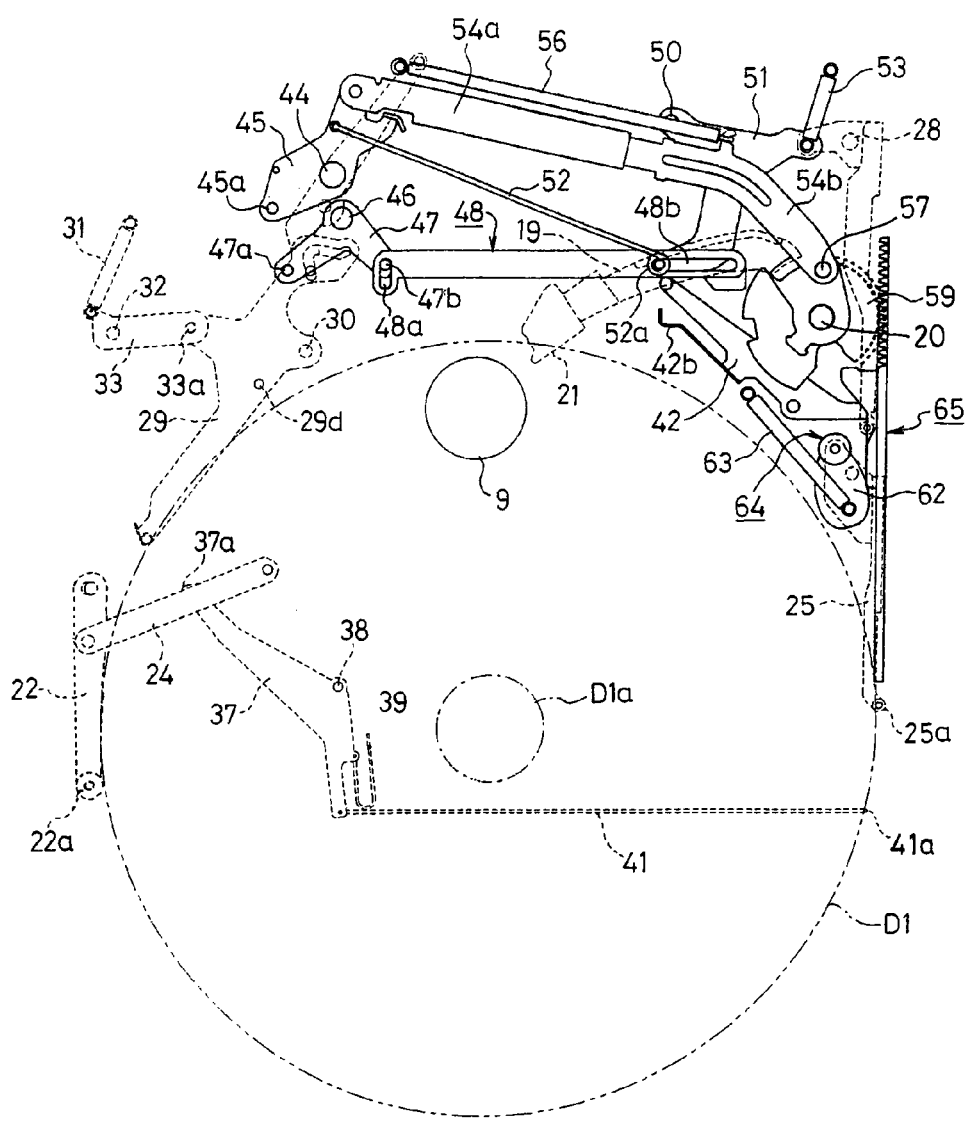
FIG. 18 is a third process step diagram illustrative of the state of carrying the large diameter disc.

FIGS. 11 and 18 show a state in which the operator inserts the large diameter disc D1 much deeper than the above state. In this state, the large diameter disc D1 presses the disc support arm 19, the guide arm 25 and the guide arm 29, which swing in the centrifugal direction. Therefore, the base end of the disc support arm 19 rotates from the position of FIG. 39(A) to the position of FIG. 39(B) about the rivet pin 20 as the fulcrum and the switch actuator step 59e on the gear disc 59 actuates the limit switch 60. At this time, the rack slider 65 mated with the gear disc 59 slightly moves forward.

When the switch actuator step 59e actuates the limit switch 60, current flows in the loading motor 66 based on a signal from the limit switch 60. As a result, the loading slider 43 moves backward to pull the link lever 24. In this case, the loading arm 22 swings to the position shown in FIGS. 11 and 18 and the loading roller 22a on the tip thereof impinges on the side of the large diameter disc D1 and stops.

At this moment, a smaller current (hereinafter referred to as a "low-potential current") than the current for generating large torque required to carry in the large diameter disc D1 is controlled to flow in the loading motor 66. This is because if a larger current (hereinafter referred to as a "high-potential current") for generating large torque required to carry in the large diameter disc D1 is allowed to flow at this moment, a risk of causing a malfunction in the carrier mechanism may occur. Namely, in FIG. 11, a component force F1a due to the pressure from the loading roller 22a and a component force F1b due to the pressure from the support member 25a of the guide arm 25 work near the center of the large diameter disc D1. Accordingly, the resultant force is extremely small and can not cause a power for propelling the large diameter disc D1 in the carry-in direction. In addition, in the state shown in FIG. 11, the support member 29a on the tip of the guide arm 29 driven in the centripetal direction presses the rear end of the large diameter disc D1.

In such the situation, if the high-potential current for generating torque required to carry the large diameter disc D1 is allowed to flow in the loading motor 66, the loading arm 22 stops while sandwiching the large diameter disc D1 and halts the carry-in operation. If this state continues, it may risk the gear train in the carrier mechanism damaged and the loading motor 66 burned. To avoid such the malfunction, the low-potential current is allowed to flow in the loading motor 66 at this moment.

In the above-described state in which the low-potential current flows in the loading motor 66, the drive force from the loading motor 66 only is not sufficient to rotate the loading arm 22 because the large diameter disc D1 loads thereon. Accordingly, the operation of carrying the large diameter disc D1 can not be achieved. When the operator presses the large diameter disc D1, the sum of the drive force from the loading motor 66 and the insertion force from the operator enables the operation of carrying the large diameter disc D1 to be achieved.

Figure 12:
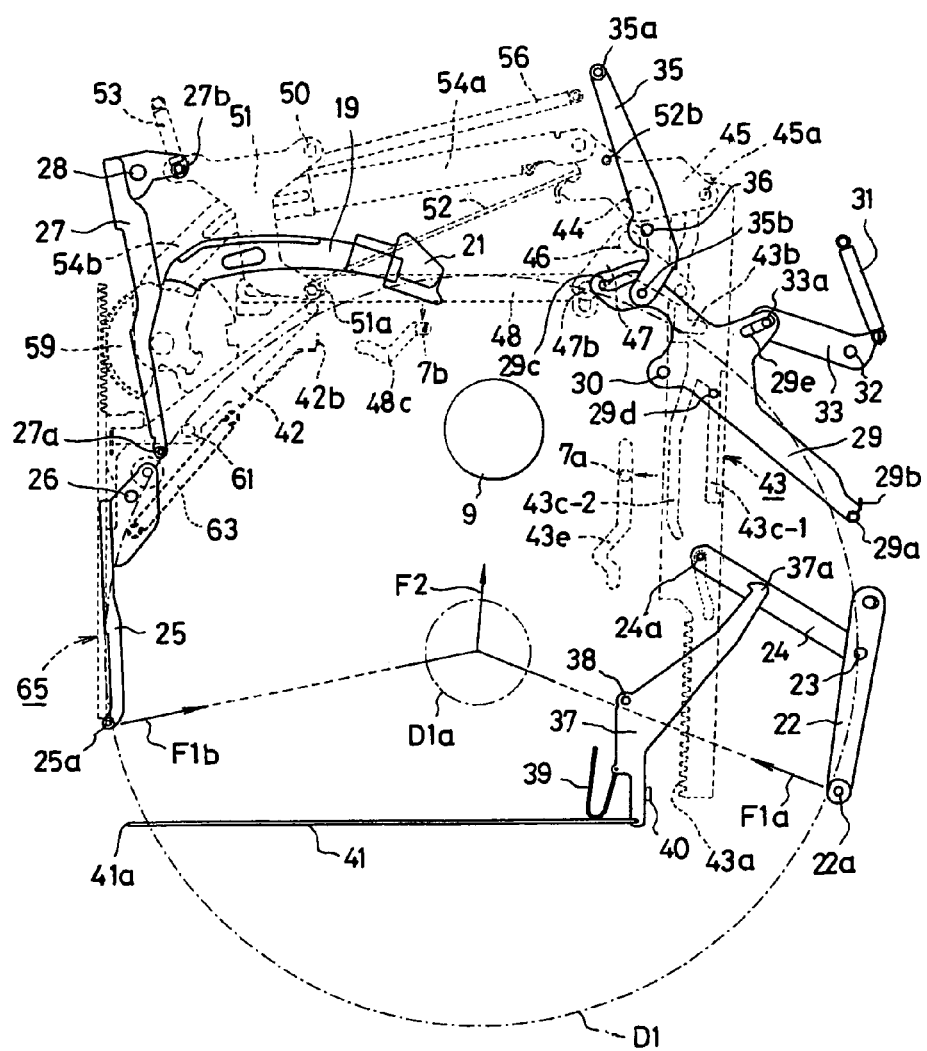
FIG. 12 is a fourth process step diagram illustrative of the state of carrying the large diameter disc.
Figure 19:
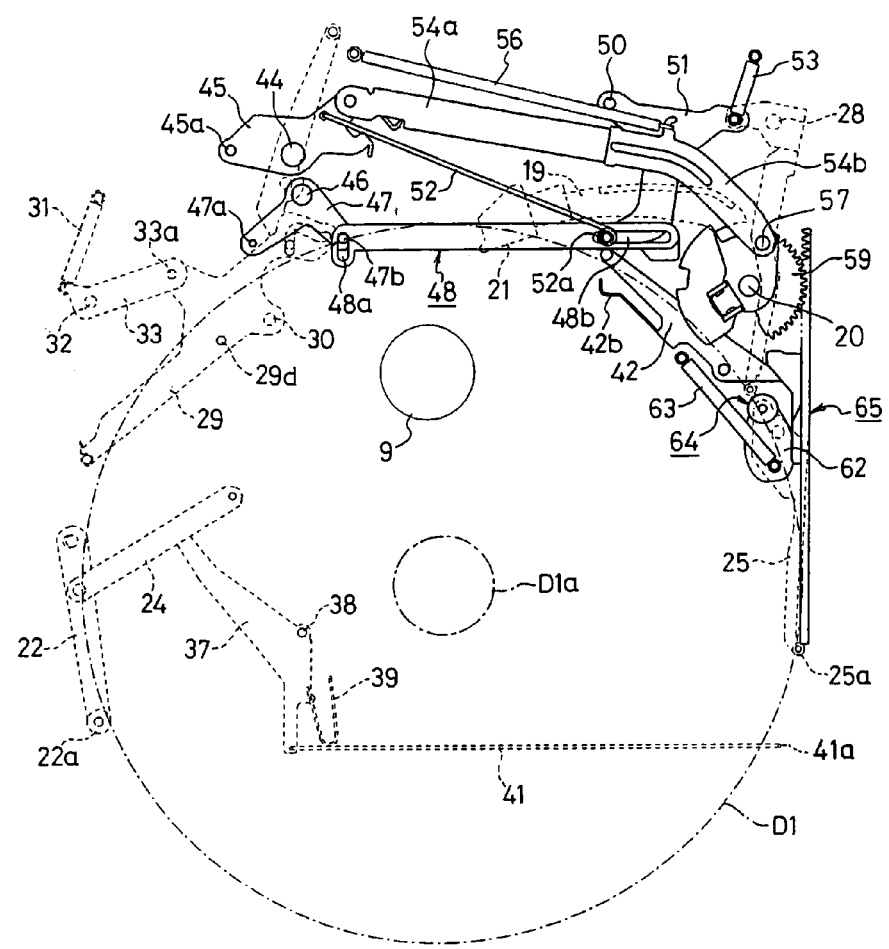
FIG. 19 is a fourth process step diagram illustrative of the state of carrying the large diameter disc.

FIGS. 12 and 19 show a state in which the operator inserts the large diameter disc D1 much deeper than the above state. In this state, the gear disc 59 on the base end of the disc support arm 19 rotates additionally. As a result, the link arm 54 is pulled such that the first swinging member 45 swings about the rivet pin 44 as the fulcrum and the follower pin 45a moves backward. Therefore, the loading slider 43 moves backward as well, which has been driven by the drive force from the loading motor 66 with the low-potential current flowing therein.

When such the operation is reached, the guide arm 29 swings in the centrifugal direction such that the large diameter disc D1 is released from supporting by the support member 29a. This is resulted from the fact that the follower pin 29d on the guide arm 29 located on the slanting surface of the rear end of the guide groove 43c-1 in the loading slider 43 receives the action of the slanting surface as the loading slider 43 moves backward in the state of FIG. 11.

In accordance with the swing of the first swinging member 45 as described above, the third swinging member 51 of which swing is restricted by the link wire 52 receives the action of the tension coil spring 53 and swings about the rivet pin 50 as the fulcrum. As a result, the guide arm 27 swings in the centripetal direction and the support member 27a on the tip thereof supports the rear side of the large diameter disc D1. At this time, the backward movement of the loading slider 43 pulls the link lever 24. Accordingly, the loading arm 22 swings in the centripetal direction, and the loading roller 22a on the tip thereof impinges on the front side of the large diameter disc D1 and supports the disc. In this state, the follower pin 7a on the elevator frame 7 moves laterally in the lower portion 43e-1 of the cam groove 43e and accordingly the elevator frame 7 stops at the position of FIG. 37(A).

On the other hand, the gear disc 59 on the base end of the disc support arm 19 rotates to the position shown in FIG. 37(A) and the switch actuator step 59f actuates the switch knob 60a of the limit switch 60 in reverse. At this time, a signal from the limit switch 60 switches the current flowing in the loading motor 66 to the high-potential current to generate the torque required to carry in the large diameter disc D1. In addition, the component force F1a due to the pressure from the loading roller 22a and the component force Fib due to the pressure from the support member 25a of the guide arm 25 are made larger. Therefore, a resultant force F2 for propelling the disc in the carry-in direction is generated to start automatic loading by the loading motor 66.

Figure 13:
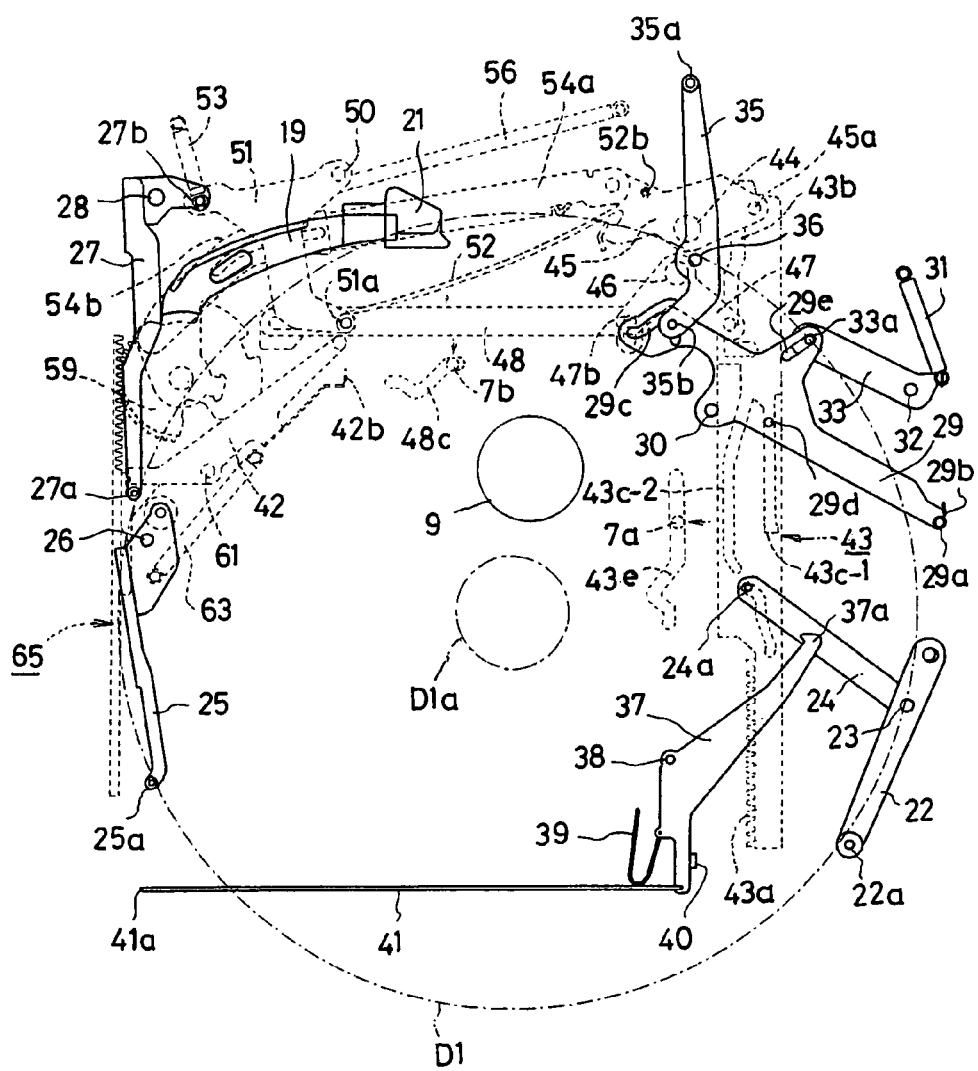
FIG. 13 is a fifth process step diagram illustrative of the state of carrying the large diameter disc.
Figure 20:
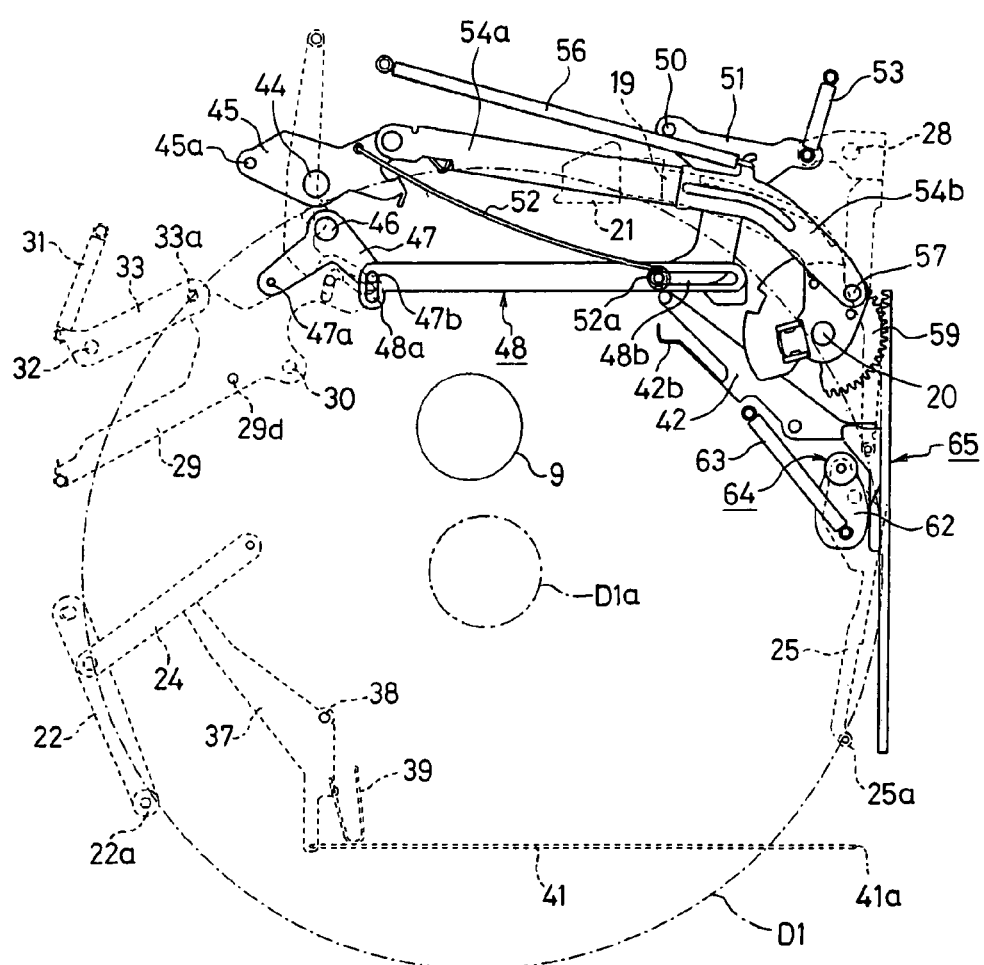
FIG. 20 is a fifth process step diagram illustrative of the state of carrying the large diameter disc.

FIGS. 13 and 20 show a state in which the automatic loading by the loading motor 66 is started to carry in the large diameter disc D1. When the loading slider 43 moves backward additionally from the state of FIG. 12, the follower pin 29d on the guide arm 29 enters from the slanting portion of the loading slider 43 into the guide groove 43c-1. As a result, the guide arm 29 additionally swings in the centrifugal direction, and the support member 29a on the tip thereof is kept from contacting the side of the large diameter disc D1. FIG. 40(A)-(D) show the operation modes of the guide arm 29 successively.

As the loading slider 4 moves backward, the link lever 24 is pulled, and the loading arm 22 starts to swing in the centripetal direction. FIG. 41(A)-(D) show the swinging state of the loading arm 22 successively. The state of the loading arm 22 shown in FIG. 22 corresponds to the state of FIG. 41(B) shifted from the initial state of FIG. 41(A).

As for the link lever 24 that controls the swing of the loading arm 22, the follower pin 24a fixed to the tip of the link lever 24 is inserted into the induction groove 43d in the loading slider 43 and the guide slit 49a in the guide plate 49 as described above. Accordingly, when the loading slider 43 moves backward, the follower pin 24a is sandwiched between the slanting surface of the rear end of the induction groove 43d and the sidewall of the guide slit 49a. Thus, as the loading slider 43 moves backward, the follower pin 24a also moves backward such that the link lever 24 is pulled and the loading arm 22 swings.

When the loading slider 43 moves back to the position shown in FIG. 13, the upper end horizontal portion 43b-1 of the guide groove 43b pushes up the follower pin 45a on the first swinging member 45 accordingly. This movement swings the first swinging member 45 about the rivet pin 44 as the fulcrum and rotates the gear disc 59 via the link arm 54. As a result, the disc support arm 19 swings in the centrifugal direction, that is, the holder 21 that supports the rear end of the large diameter disc D1 moves backward in synchronization with the carry-in of the large diameter disc D1. At this moment, the follower pin 47a on the second swinging member 47 slides on the vertical portion in the guide groove 43b. Accordingly, the second swinging member 47 is at rest, and the follower slider 48 is also at rest.

The guide arm 27 is driven by the tension coil spring 53 in the process step of shifting the state from FIG. 12 to FIG. 13. The support member 27a on the tip thereof is pushed back as the large diameter disc D1 is carried in as shown in FIG. 13. The support member stops when it impinges on the engagement tongue 42a of the lever arm 42. At this time, the third swinging member 51 slightly swings and accordingly the action pin 51a thereof moves in the centripetal direction through the end through-hole 48b in the follower slider 48 at rest such that the link wire 52 slightly distorts.

On the other hand, the support member 25a of the guide arm 25 supports the front side of the large diameter disc D1. In this case, the higher guide piece 65c of the rack slider 65 moved forward in response to the rotation of the gear disc 59 is separated from the small diameter portion 64d of the double roller 64. At this time, the follower pin 7a on the elevator frame 7 is kept to laterally move through the lower portion 43e-1 in the cam groove 43e. In this case, the follower slider 48 rests and the elevator frame 7 still stays at the position of FIG. 37(A).

Figure 14:
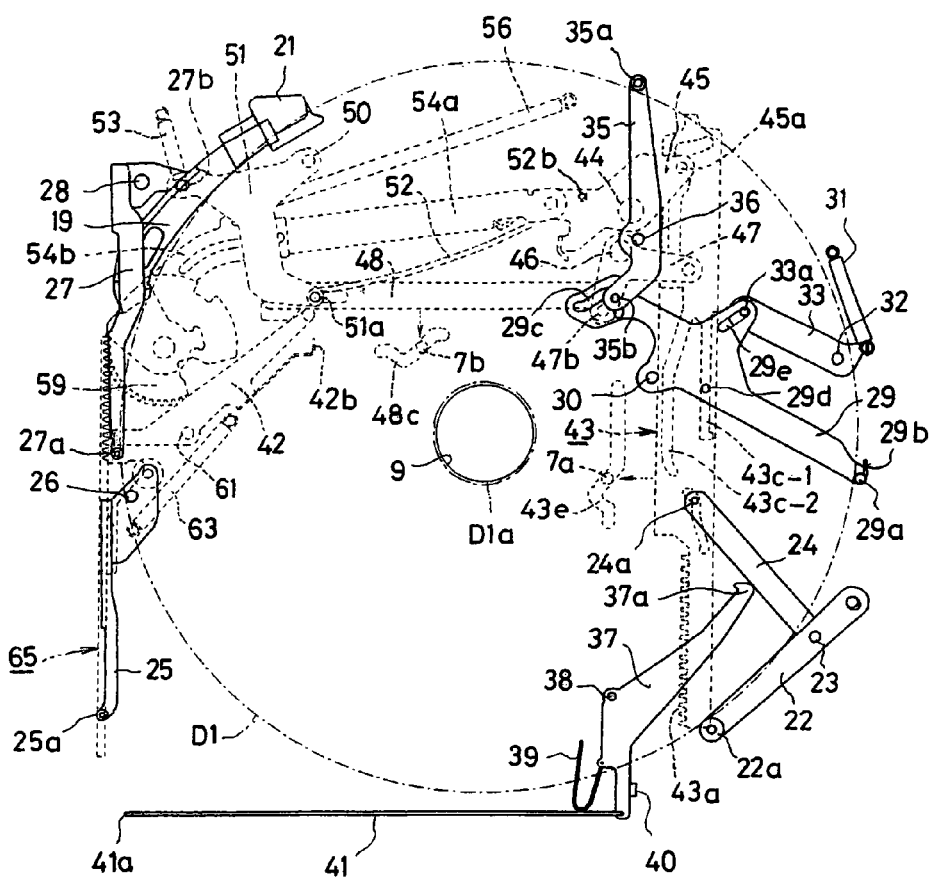
FIG. 14 is a sixth process step diagram illustrative of the state of carrying the large diameter disc.
Figure 21:
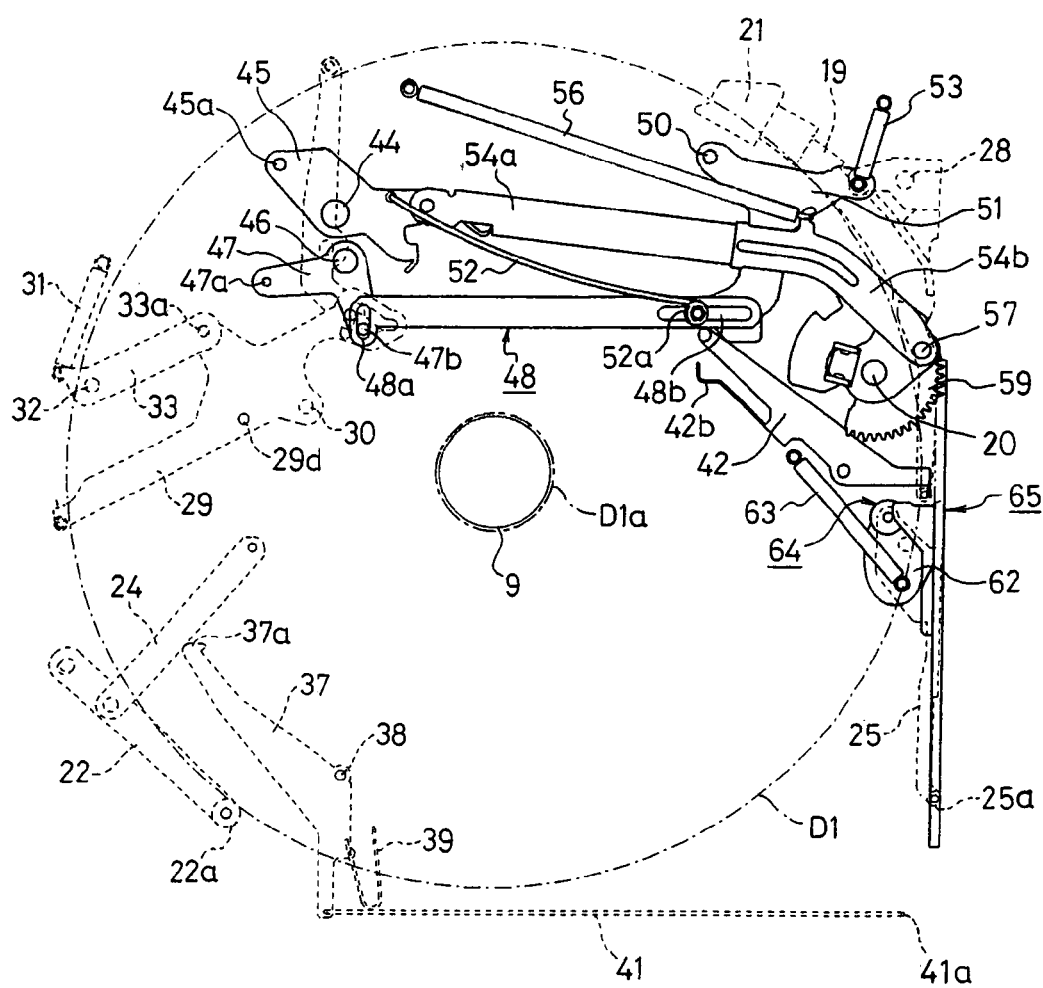
FIG. 21 is a sixth process step diagram illustrative of the state of carrying the large diameter disc.

FIGS. 14 and 21 show a state in which the loading slider 43 additionally moves backward from the state of FIGS. 13 and 20 to pull the link lever 24. In this case, the loading arm 22 swings to the position shown in FIG. 41(C), and the center of the central bore D1a in the large diameter disc D1 carried inside meets the center of the clamp head 9. On the other hand, the follower pin 29d on the guide arm 29 is made to move straight through the guide groove 43c-1 in the loading slider 43. Accordingly, the guide arm 29 and the guide arm 35 rest on the positions shown in FIG. 14. At this time, the support member 29a and the support member 35a receive the outer rim of the large diameter disc D1 for positioning. As a result, the central bore D1a in the large diameter disc D1 and the clamp head 9 are accurately made coincident in position with each other.

As the loading slider 43 moves backward, the follower pin 45a on the first swinging member 45 is pushed up by the upper end horizontal portion 43b-l and shifted to the vertical portion 43b-3. Therefore, the first swinging member 45 swings to the position shown in the same figure and the disc support arm 19 also swings in the centrifugal direction in response to the rotation of the gear disc 59 caused by the link arm 54. The rotation of the gear disc 59 allows the rack slider 65 to move forward additionally such that the small diameter portion 64b of the double roller 64 gets on the higher guide piece 65c. Therefore, the guide arm 25 swings greatly in the centrifugal direction to terminate supporting the outer rim of the large diameter disc D1 by the support member 25a thereof. As a result, the guide arm 25 escapes to the side of the elevator frame 7 so as not to extend over the elevator frame 7. Accordingly, the ascending elevator frame 7 has no possibility of colliding with the guide arm 25.

At this time, the large diameter disc D1 presses the support member 27a of the guide arm 27 while the support member 27a impinges on the engagement tongue 42a of the lever arm 42 and a position is determined where it stops. Accordingly, at this moment, the center of the large diameter disc D1 in the horizontal direction is coincident with that in the clamp head 9. On the other hand, the center of the large diameter disc D1 in the vertical direction relative to the clamp head 9 can be determined from the holder 21 of the disc support arm 19 and the loading roller 22a of the loading arm 22 halted at the state shown in FIG. 14.

Thus, in accordance with the disc device of the present invention, automatic loading of the large diameter disc D1 continues from the beginning to the state of FIG. 14. During this period, at least three locations on the outer rim of the large diameter disc D1 are supported on the plurality of previously described arms, and the disc is carried in the device and located stationary such that the clamp head 9 can clamp around the central bore D1a.

Figure 37B:
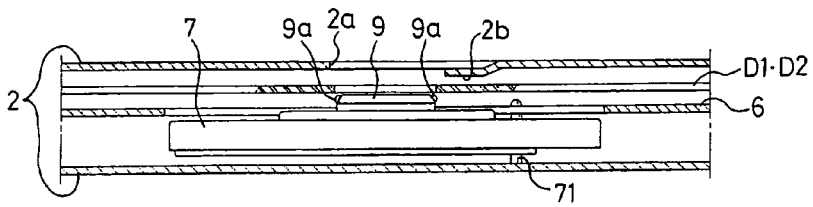

In the process steps from FIG. 13 to FIG. 14, as the cam groove 43e in the loading slider 43 moves backward, the follower pin 7a on the elevator frame. 7 is made to shift from the lower portion 43e-1 to the slanting portion 43e-2 and ascend it. On the other hand, the follower pin 47a on the second swinging member 47 shifts from the vertical portion 43b-3 of the loading slider 43 to the lower end horizontal portion 43b-2 and the second swinging member 47 swings in the centrifugal direction. Therefore, the action pin 47b horizontally moves the follower slider 48 and accordingly the cam groove 48c horizontally moves. As a result, the follower pin 7b on the elevator frame 7 is made to shift from the lower portion 48c-1 to the slanting portion 48c-2 and ascend it and the elevator frame 7 starts to ascend as shown in FIG. 37(B).

Figure 15:
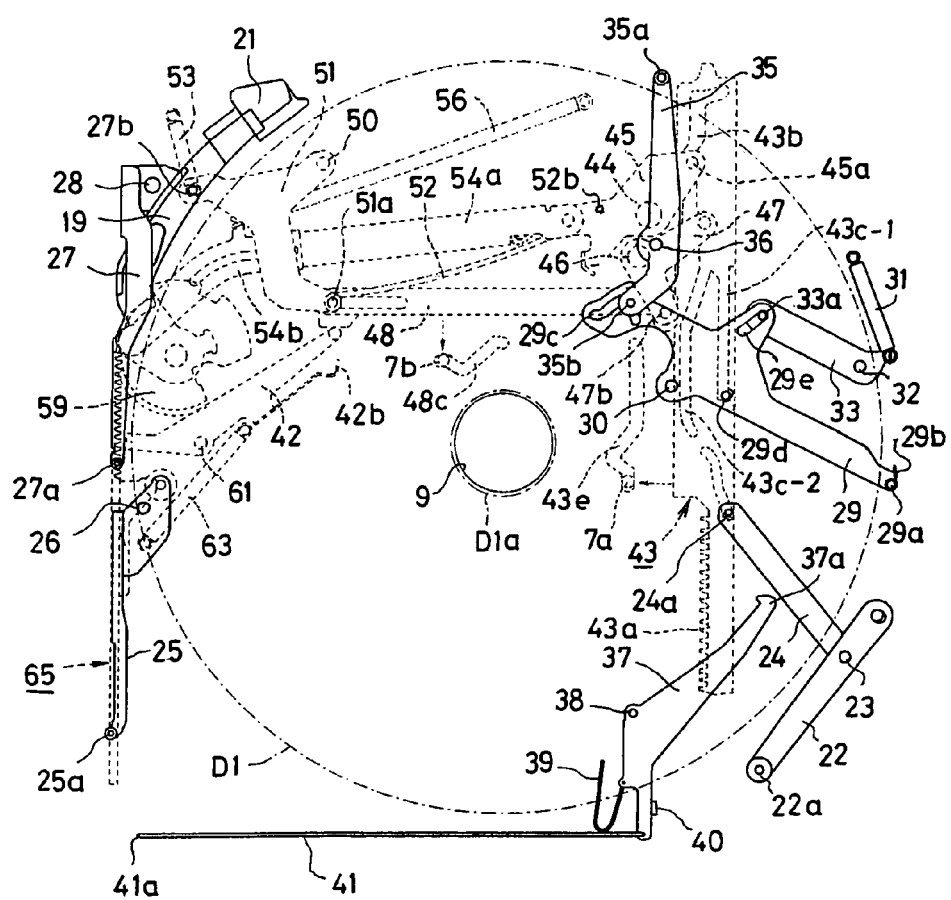
FIG. 15 is a seventh process step diagram illustrative of the state of carrying the large diameter disc.
Figure 22:
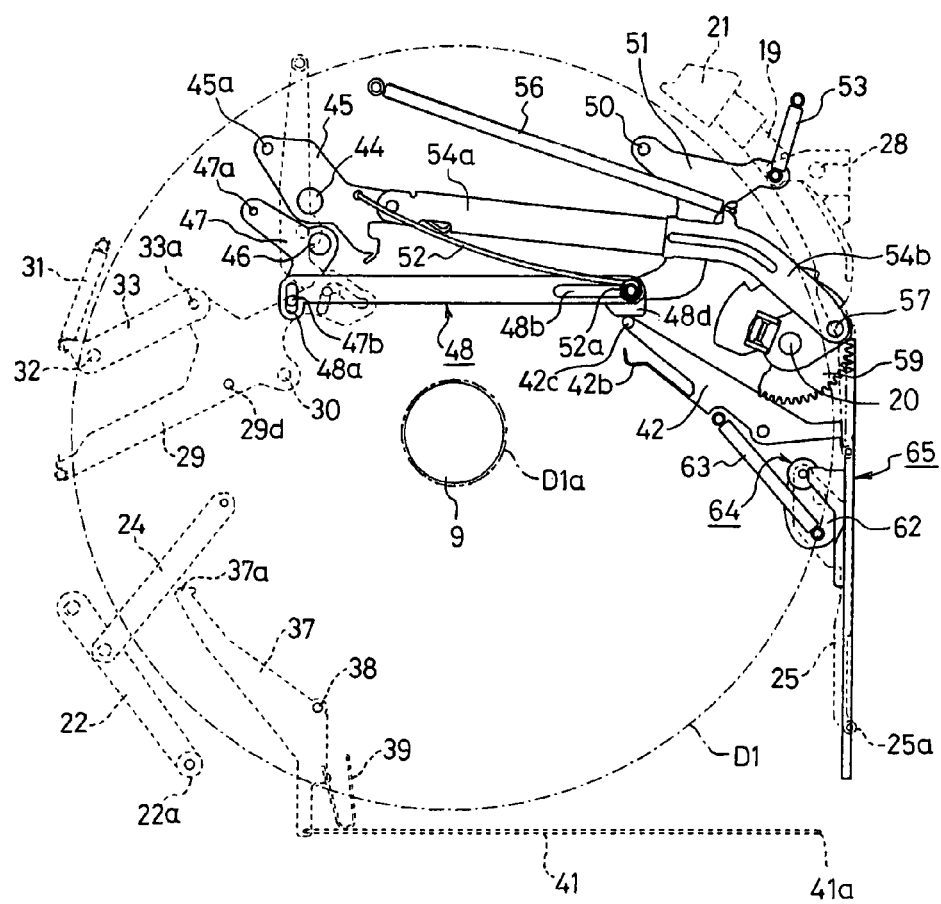
FIG. 22 is a seventh process step diagram illustrative of the state of carrying the large diameter disc.

FIGS. 15 and 22 show a final state in which the clamp head 9 clamps around the central bore D1a of the large diameter disc D1 such that the large diameter disc D1 can be driven. This state can be reached after the disc support arm 19, the loading arm 22 and the guide arm 27 supporting the large diameter disc D1 slightly swing in the centrifugal direction to terminate supporting the disc and not to prevent the large diameter disc D1 from rotating.

Figure 41A:
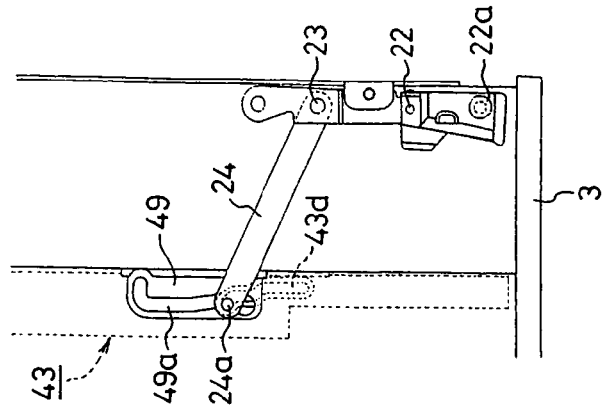
FIGS. 41(A)-41(D) show process step diagrams illustrative of an operation mode of a loading arm.
Figure 41B:
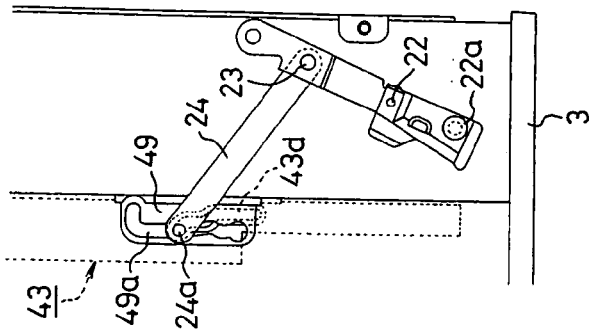
Figure 41C:
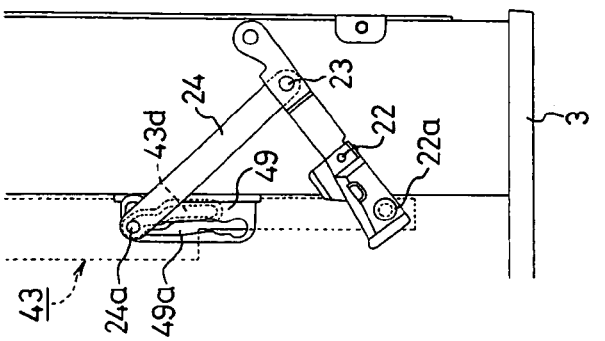
Figure 41D:
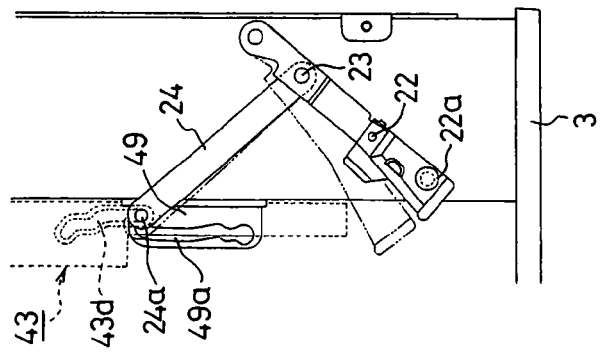

On a position where the loading slider 43 additionally moves backward from the state of FIG. 14 and stops, the follower pin 24a on the link lever 24 is pushed into the lateral groove in the rear end of the guide slit 49a at the off-center portion in the vertical direction in the rear portion of the induction groove 43d. Accordingly, as shown in FIG. 41(D), the link lever 24 slightly moves back in the direction opposite to the direction of pulling. In contrast, the loading arm 22 slightly swings in the centrifugal direction such that the loading roller 22a terminates supporting the outer rim of the large diameter disc D1.

At the same time, the follower pin 45a on the first swinging member 45 slightly swings along the slanting portion formed in the middle of the vertical portion 43b-3 in the guide groove 43b. This swing is transmitted via the link arm 54 to the gear disc 59. As a result, the disc support arm 19 slightly swings in the centrifugal direction to terminate supporting the outer rim of the large diameter disc D1.

On the other hand, the lower end horizontal portion 43b-2 of the guide groove 43b in the loading slider 43 greatly pushes up the follower pin 47a on the second swinging member 47. As a result, the action pin 47b slightly swings in the centrifugal direction to horizontally move the follower slider 48 such that the end through-hole 48b pulls the action pin 51a on the third swinging member 51. Therefore, the third swinging member 51 slightly swings and the action piece 48d pushes up the roller 42c of the lever arm 42 at the same time. As a result, the engagement tongue 42a of the lever arm 42, on which the support member 27a of the guide arm 27 impinges, moves backward. Therefore, the guide arm 27 slightly swings in the centrifugal direction such that the guide arm 27 terminates supporting the outer rim of the large diameter disc D1.

At this time, the end of the guide groove 43c-1 in the loading slider 43 presses the follower pin 29d on the guide arm 29, and accordingly the guide arm 29 slightly swings. As a result, the support member 29a of the guide arm 29 swings in the centrifugal direction to terminate positioning the outer rim of the large diameter disc D1. In addition, the guide arm 35 coupled via the follower pin 35b to the guide groove 29c in the guide arm 29 slightly swings, and accordingly the support member 35 also swings in the centrifugal direction to terminate positioning the outer rim of the large diameter disc D1.

In the process steps from FIG. 14 to FIG. 15, the follower slider 48 horizontally moves in synchronization with the backward movement of the loading slider 43. In this case, the follower pin 7a on the elevator frame 7 shifts from the slanting portion 43e-2 of the cam groove 43e in the loading slider 43 to the higher portion 43e-3. On the other hand, the follower pin 7b shifts from the slanting portion 48c-2 of the cam groove 48c in the follower slider 48 to the higher portion 48c-3.

Figure 37C:
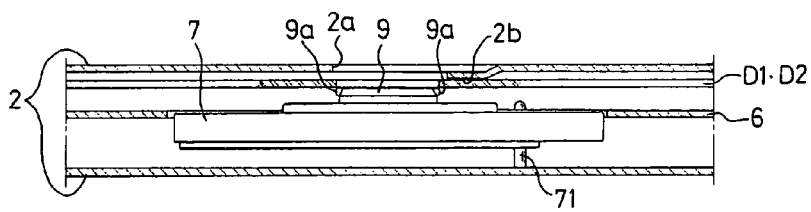

In this process step the elevator frame 7 behaves as below. Namely, the follower pins 7a, 7b ascending the slanting portions 43e-2, 48c-2 elevate the elevator frame 7. In this case, the chuck jaws 9a of the clamp head 9 impinge on the central bore D1a in the large diameter disc D1 and push up the large diameter disc D1 as shown in FIG. 37(C). In addition, the rim of the central bore D1a impinges on the protrusion 2b of the chassis case 2.

Figure 37D:
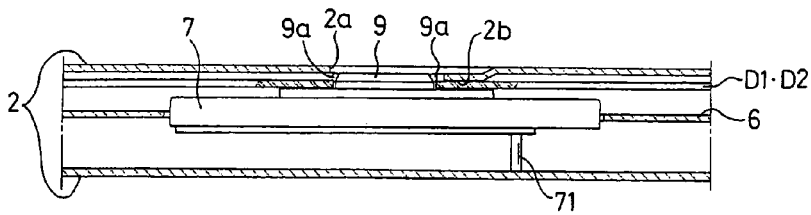
Figure 37E:
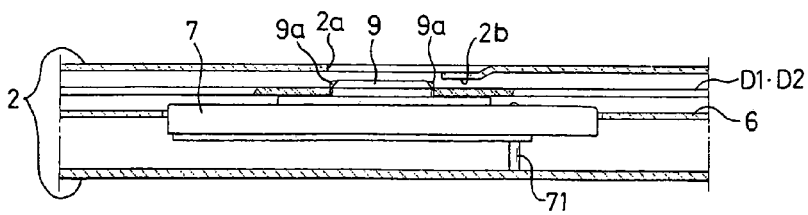

When the follower pins 7a, 7b shift from the above state to the tops of the slanting portions 43e-2, 48c-2, the clamp head 9 fits into the central bore D1a in the large diameter disc D1 as shown in FIG. 37(D) to complete clamping the disc with the chuck jaws 9a. Thus, the large diameter disc D1 is secured on the turntable 10. When the follower pins 7a, 7b shift to the higher portions 43e-3, 48c-3, the elevator frame 7 descends to the position shown in FIG. 37(E) to enable the large diameter disc D1 to be driven.

Figure 38A:
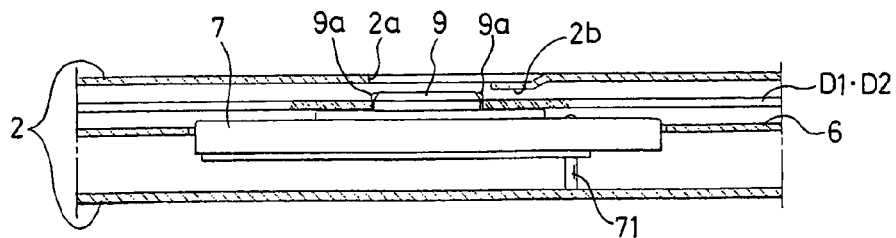
FIGS. 38(A)-38(E) show process step diagrams illustrative of process steps in which the elevator frame descends.
Figure 38B:
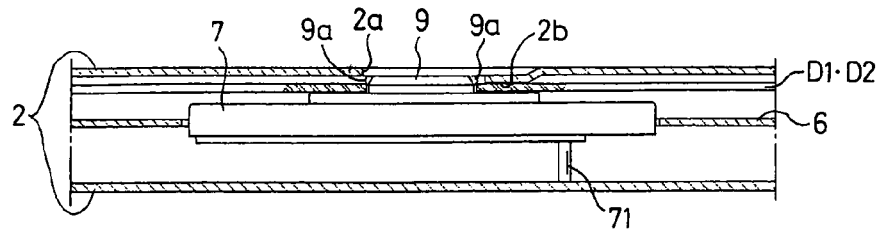
Figure 38C:
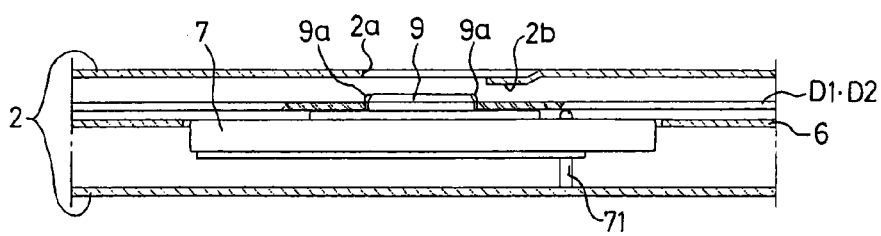
Figure 38D:
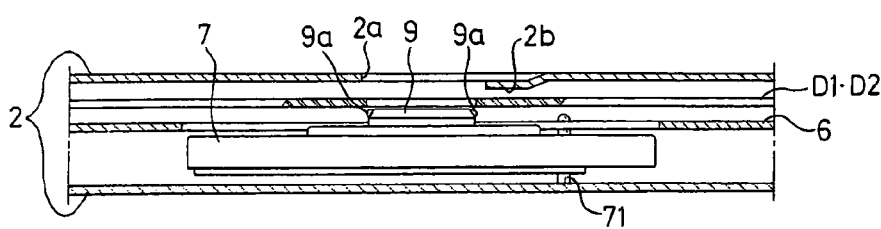
Figure 38E:
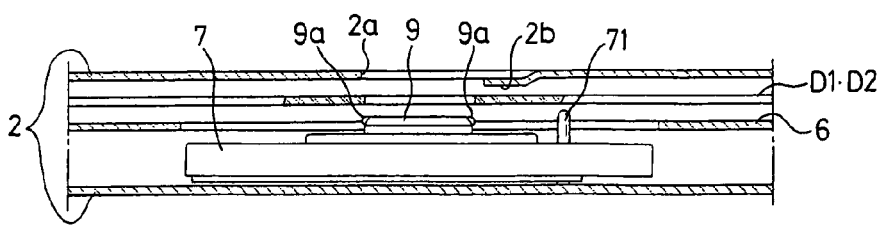

The above description is given to the operation modes of the mechanisms on carrying in the large diameter disc D1 in accordance with the disc device 1 of the present invention. At the time of carry-out, in contrast, the mechanisms operate in the operation modes in reverse order to those at the time of above-described carry-in as the loading slider 43 moves forward. Namely, carrying out the large diameter disc D1 is started, and the loading slider 43 starts to move forward. Then, the elevator frame 7 once ascends and then descends to the initial position as shown in FIGS. 38(A)-(E). During this process, the clamp release pin 71 pushes up the large diameter disc D1 as shown in FIG. 38(C) to release the disc from clamping by the clamp head 9.

In the process steps until the large diameter disc D1 is released from clamping as described above, the disc support arm 19, the loading arm 22 and the guide arm 27 start to move in the centripetal direction. Thus, the outer rim of the large diameter disc D1 is supported as shown in FIG. 14. Thereafter, the disc support arm 19 swings in the centripetal direction and causes a force. The force is used to carryout the large diameter disc D1, of which front end is exposed through the slot 3a in the front bezel and stopped.

The operation modes of the follower pins 24a, 29d, 45a, 47a in accordance with the backward movement of the loading slider 43 are successively shown in FIGS. 42(A)-(F).

The operation modes on carrying the small diameter disc D2 in accordance with the disc device 1 of the present invention are described next with reference to the plan views of FIGS. 23-29 and the corresponding bottom views of FIGS. 30-36. In FIGS. 23-29 the cam grooves 43e, 48c and the follower pins 7a, 7b do not appear originally though they are shown in the same figures for convenience of description to facilitate understanding.

Figure 23:
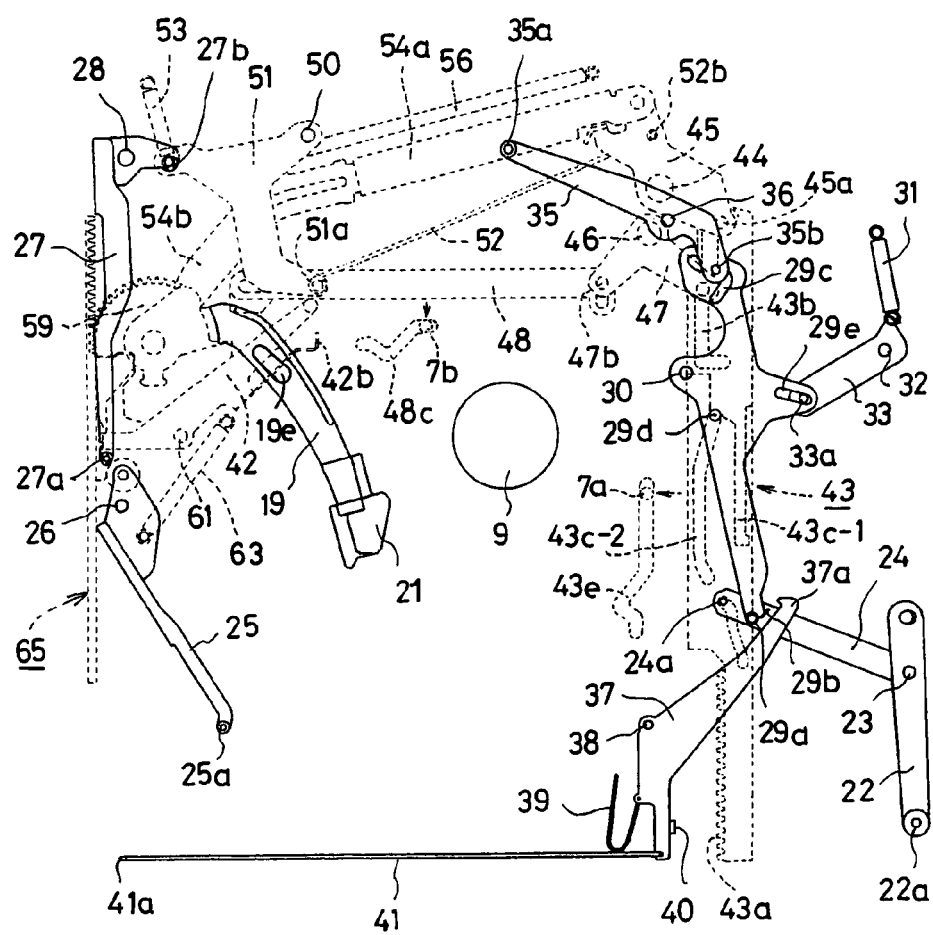
FIG. 23 is a first process step diagram illustrative of the state of carrying a small diameter disc.
Figure 30:
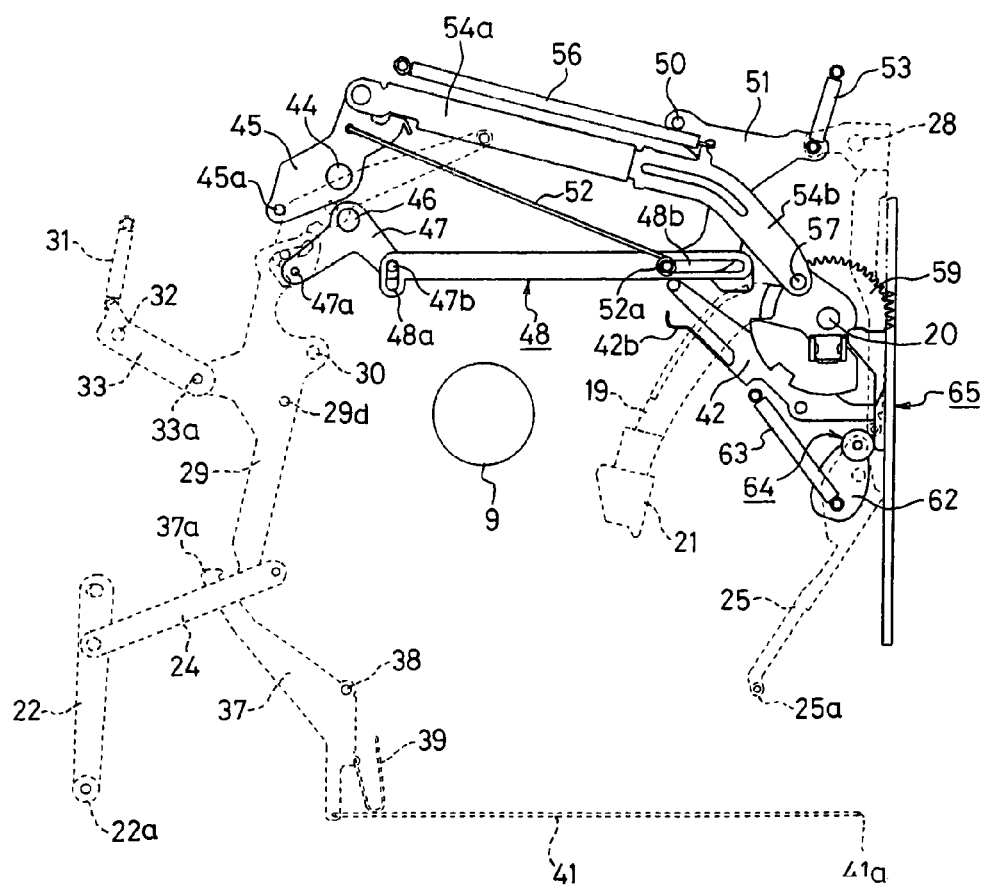
FIG. 30 is a first process step diagram illustrative of the state of carrying the small diameter disc.

FIGS. 23 and 30 show a state in which the small diameter disc D2 is on standby to be inserted through the slot 3a in the front bezel 3 and each arm rests in an initial state. At this time, the large diameter portion 64a of the double roller 64 of the roller support plate 62 fixed to the pivot pin 26 in the rear surface of the base panel 6 impinges on the lower guide piece 65b of the rack slider 65 as shown in FIGS. 8 and 30. In this case, the guide arm 25 halts on a position where it swings a certain distance in the centrifugal direction than a position where it swings most in the centripetal direction.

Halting the guide arm 25 on the position where it swings a certain distance in the centrifugal direction than the position where it swings most in the centripetal direction to wait for an insertion of the disc in this way is for the following reason. Namely, the guide arm 25 may also halt on the position where it swings most in the centripetal direction to wait for an insertion of the disc. In this case, however, when the small diameter disc D2 is inserted into the device near the left side, the small diameter disc D2 enters the left side of the support member 25a. In such the case, the small diameter disc D2 can not be carried. This malfunction can be prevented by halting the guide arm 25 as described above. The state shown in FIGS. 23 and 30 to wait for the small diameter disc D2 is coincident with the state shown in FIGS. 9 and 16 to wait for the large diameter disc D1.

As the base end of the guide arm 27 is driven by the tension coil spring 53, a force always works such that the support member 27a at the tip swings in the centripetal direction. In this case, though, as the third swinging member 51 coupled to the pivot pin 27b rests in place, the guide arm 27 rests in the state shown in FIG. 23. This is because the link wire 52 attached between the first swinging member 45 at rest and the action pin 51a on the third swinging member 51 serves as a stopper and prevents the third swinging member 51 from swinging.

Similarly, the disc support arm 19, the guide arm 29, the guide arm 35 and the loading arm 22, to which power is transmitted in accordance with the movement of the loading slider 43, also rest in the state shown in FIG. 23. The follower pin 7a on the elevator frame 7 guided through the cam groove 43e in the loading slider 43 locates in the lower portion 43e-1 of the cam groove 43e. On the other hand, the follower pin 7b on the elevator frame 7 guided through the cam groove 48c in the follower slider 48 locates in the lower portion 48c-1 of the cam groove 48c. Accordingly, the elevator frame 7 rests in the lowermost state as shown in FIG. 37(A).

Figure 24:
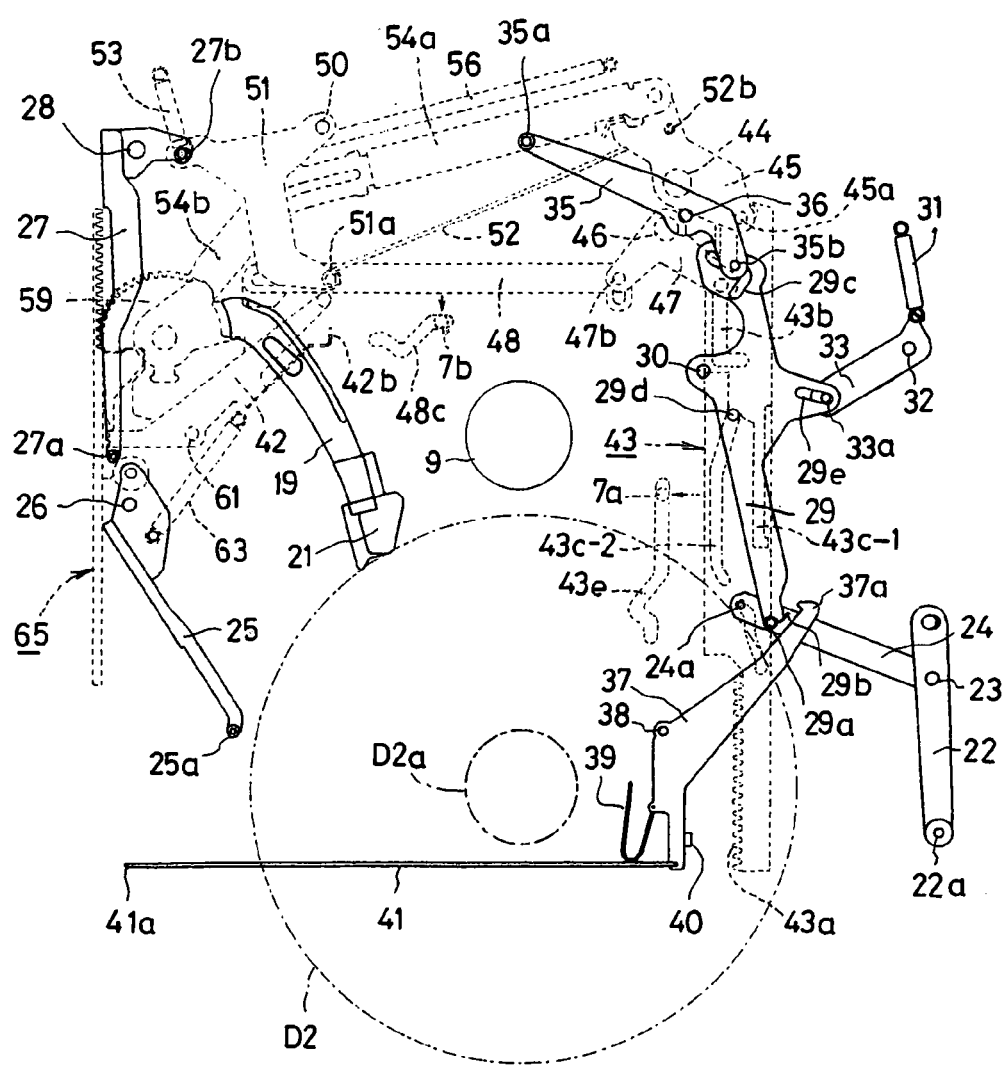
FIG. 24 is a second process step diagram illustrative of the state of carrying the small diameter disc.
Figure 31:
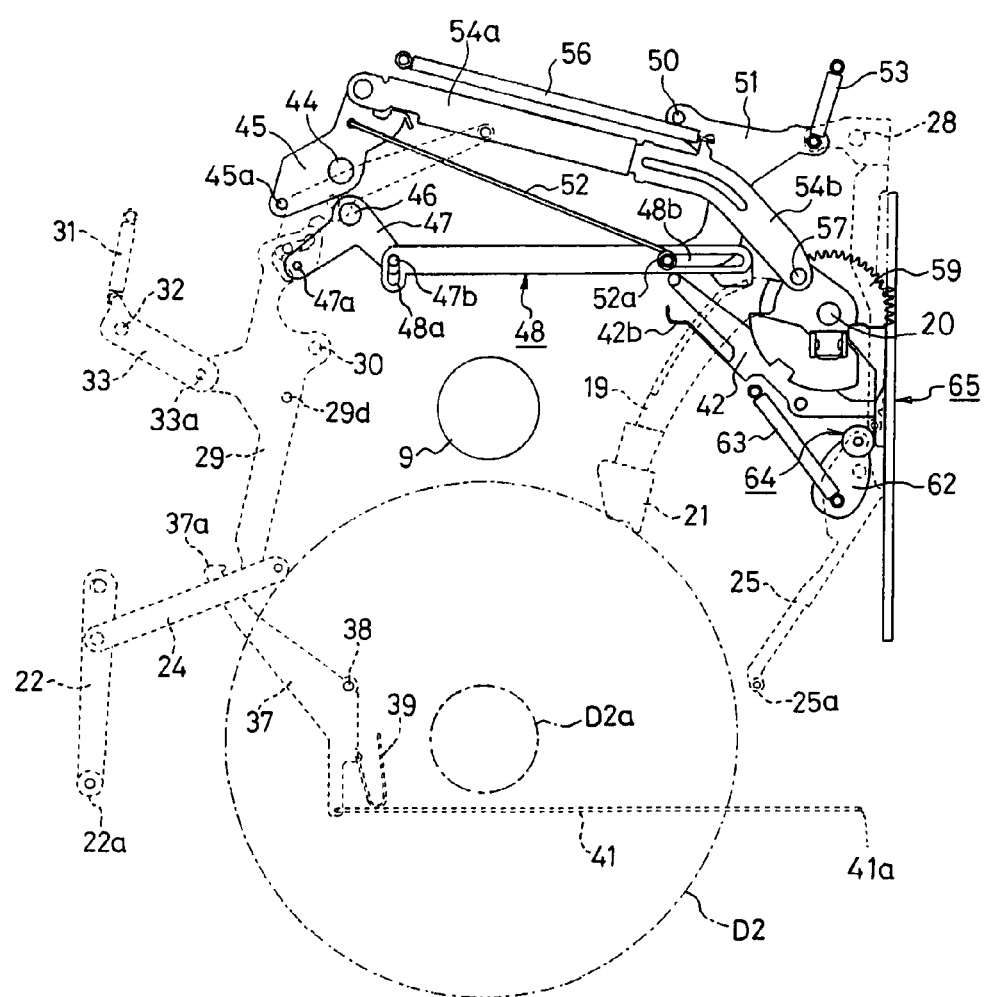
FIG. 31 is a second process step diagram illustrative of the state of carrying the small diameter disc.

FIGS. 24 and 31 show a state in which the operator inserts the small diameter disc D2 through the slot 3a in the front bezel 3. In this state, the front side of the small diameter disc D2 impinges on the holder 21 of the disc support arm 19. During the insertion of the small diameter disc D2 into the slot 3a at this moment, if the small diameter disc D2 deviates to the left in FIG. 24, the left side of the front end of the small diameter disc D2 is brought into contact with the support member 25a of the guide arm 25 and pushed back therefrom. Therefore, it is possible to prevent the small diameter disc D2 from dropping off the carriage path.

Figure 43A:
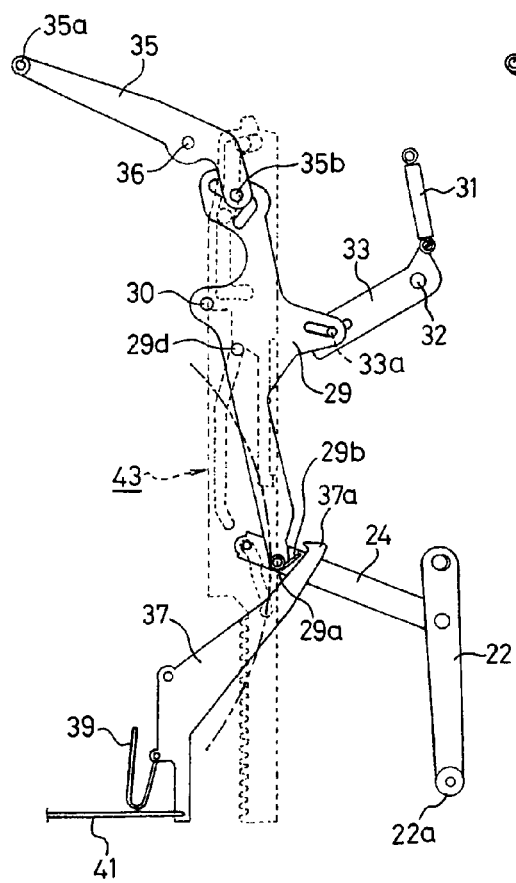
FIGS. 43(A) and 43(B) show process step diagrams illustrative of a lock lever functioning.
Figure 43B:
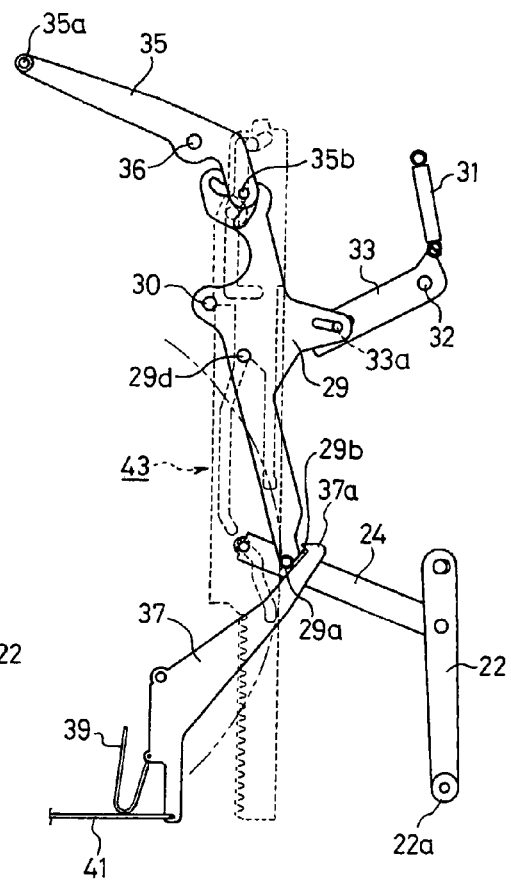

In the operation of inserting the small diameter disc D2, when the right side of the front end of the small diameter disc D2 presses the support member 29a of the guide arm 29 as shown in FIG. 43(A), it swings in the centrifugal direction. In this case, the tongue 29b is engaged with the angle 37a of the lock lever 37 that does not swing but rests in place as shown in FIG. 43(B). Also in this case, it is possible to prevent the small diameter disc D2 from dropping off the carriage path. Namely, the support member 25a of the guide arm 25 and the support member 29a of the guide arm 29 guide the small diameter disc D2 and lead it to the center of the device.

Figure 25:
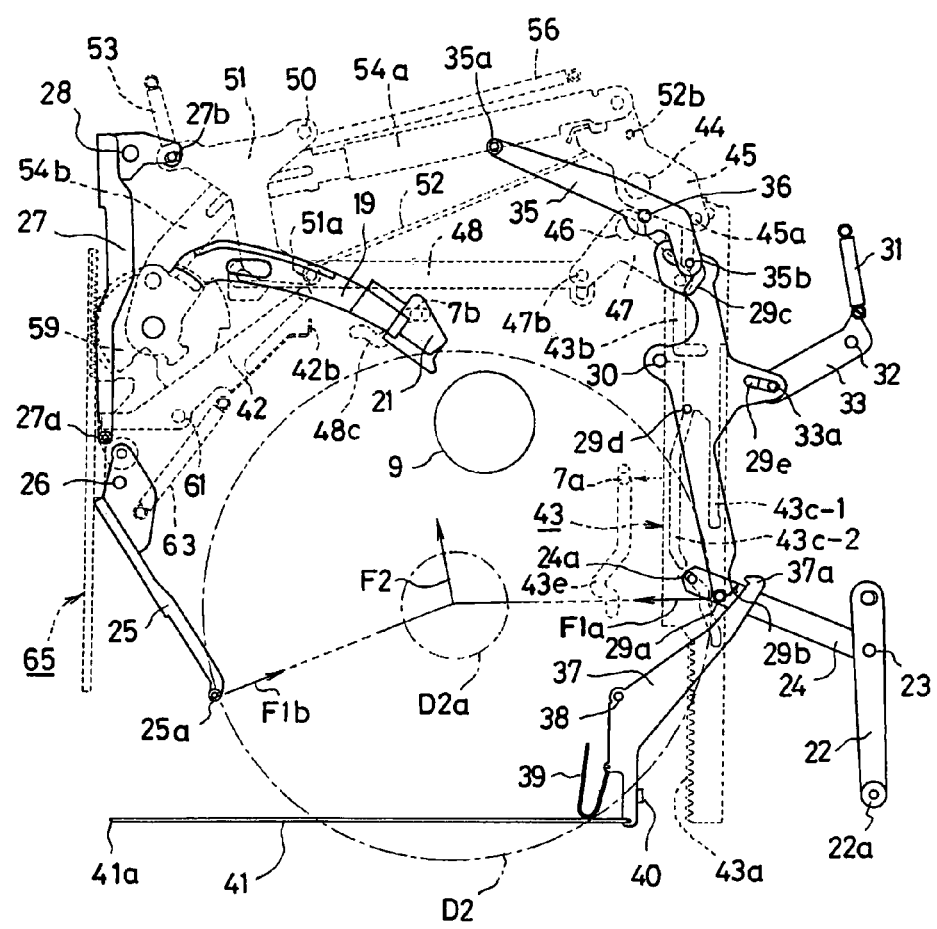
FIG. 25 is a third process step diagram illustrative of the state of carrying the small diameter disc.
Figure 32:
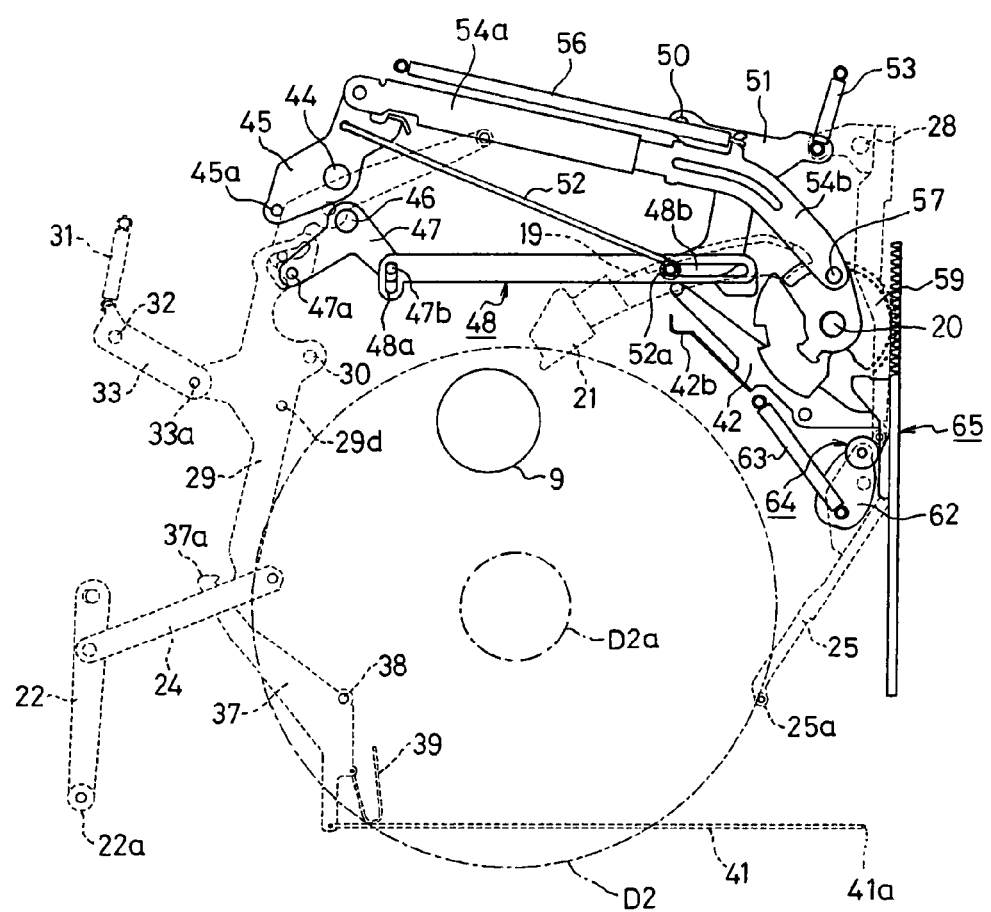
FIG. 32 is a third process step diagram illustrative of the state of carrying the small diameter disc.

FIGS. 25 and 32 show a state in which the operator inserts the small diameter disc D2 much deeper than the above state. In this state, the small diameter disc D2 presses the disc support arm 19, which swings in the centrifugal direction. In addition, the support member 25a of the guide arm 25 and the support member 29a of the guide arm 29 engaging with the swing of the disc support arm 19 contact the sides of the small diameter disc D2. As a result, the small diameter disc D2 is supported on the support members 25a, 29a and the disc support arm 19 at three points.

Figure 39A:
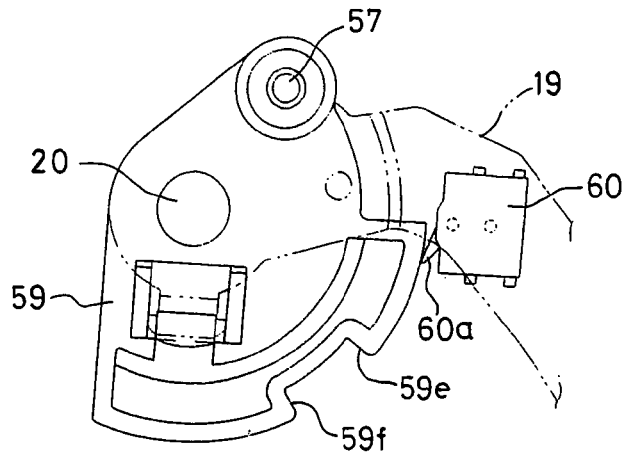
FIGS. 39(A)-39(C) show diagrams illustrative of an operation mode of the gear disc.
Figure 39B:
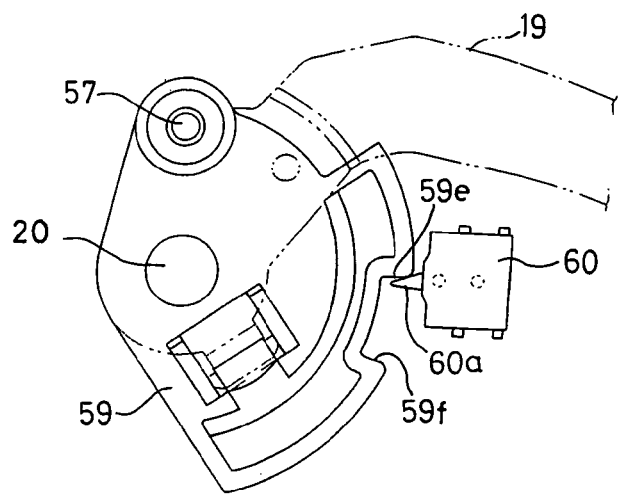

In addition, the base end of the disc support arm 19 rotates about the rivet pin 20 as the fulcrum, from the position of FIG. 39(A) to the position of FIG. 39(B), and the switch actuator step 59f on the gear disc 59 actuates the limit switch 60. On the basis of a signal from the limit switch 60 actuated by the switch actuator step 59f, the low-potential current flows in the loading motor 66. At this time, the component force F1a due to the pressure from the support member 29a of the guide arm 29 and the component force F1b due to the pressure from the support member 25a of the guide arm 25 caused through the action of the tension coil spring 63 greatly act. Therefore, a resultant force F2 for propelling the small diameter disc D2 in the carry-in direction is generated to start automatic loading by the loading motor 66.

Figure 26:
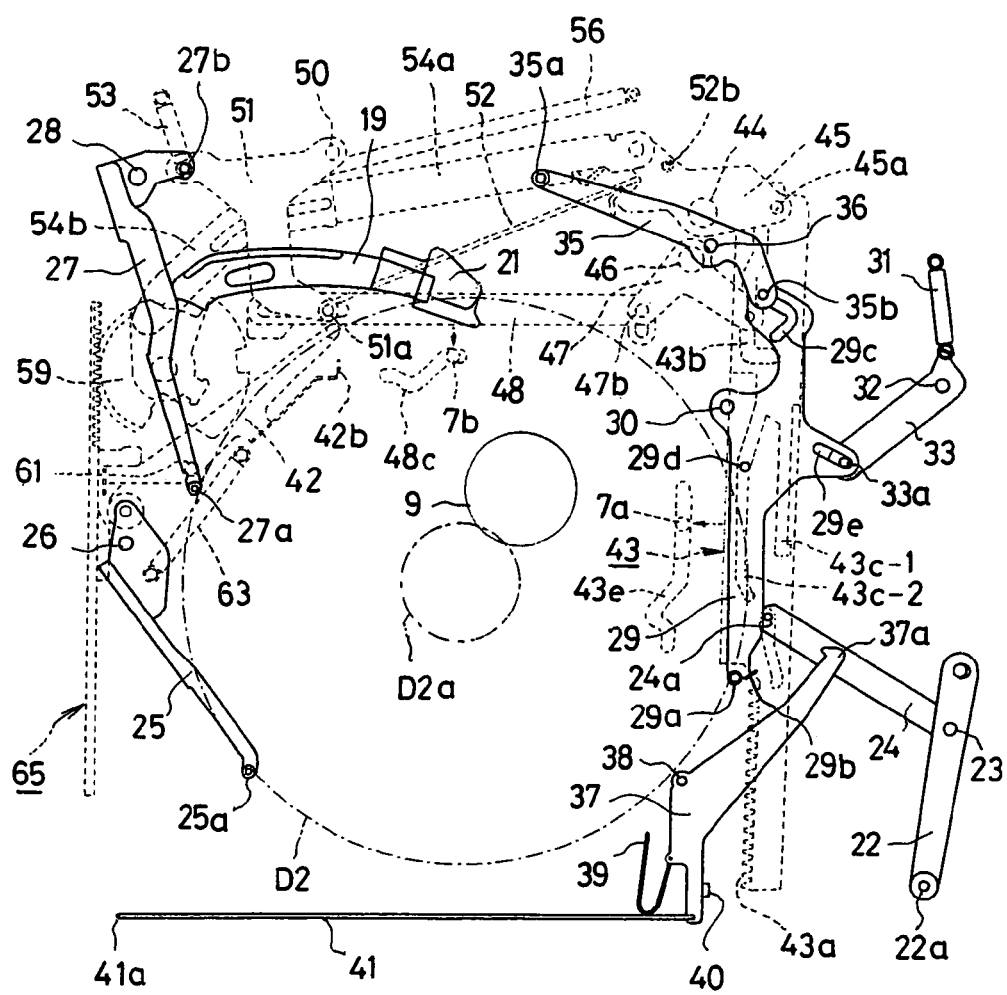
FIG. 26 is a fourth process step diagram illustrative of the state of carrying the small diameter disc.
Figure 33:
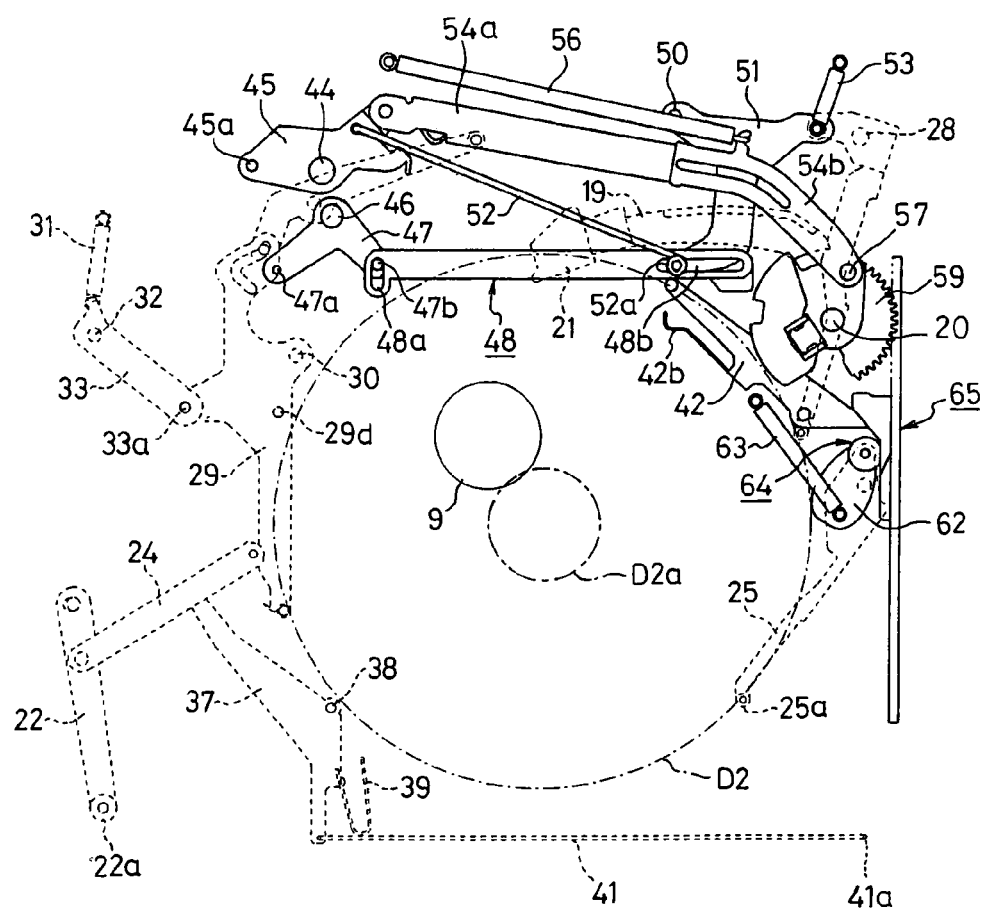
FIG. 33 is a fourth process step diagram illustrative of the state of carrying the small diameter disc.
Figure 39C:
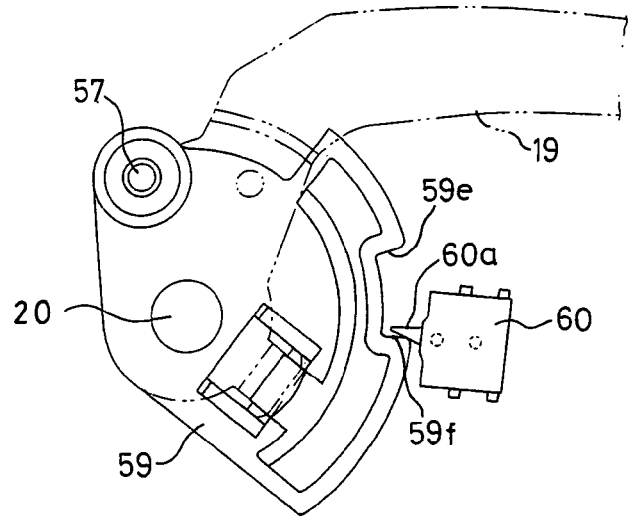

FIGS. 26 and 33 show a state in which the automatic loading by the loading motor 66 is started to carry in the small diameter disc D2. When the loading slider 43 moves backward additionally from the state of FIG. 25, the follower pin 29d on the guide arm 29 enters the guide groove 43c-2 in the loading slider 43. At this time, guided by the slanting portion in the guide groove 43c-2, the guide arm 29 moves a corresponding slanting distance. In this case, the support member 29a carries in the small diameter disc D2 and swings to the position shown in the same figure. At the same time, the guide arm 25 also carries in the small diameter disc D2 and swings to the position shown in the same figure through the action of the tension coil spring 63. At this time, the gear disc 59 on the base end of the disc support arm 19 rotates to the position shown in FIG. 39(C). Accordingly, the switch actuator step 59f actuates the switch knob 60a of the limit switch 60 in reverse to switch the current flowing in the loading motor 66 to the high-potential current.

When the loading slider 43 moves back to the position shown in FIG. 26, the upper end horizontal portion 43b-1 of the guide groove 43b pushes up the follower pin 45a on the first swinging member 45 accordingly. This movement swings the first swinging member 45 about the rivet pin 44 as the fulcrum and rotates the gear disc 59 via the link arm 54. As a result, the disc support arm 19 swings in the centrifugal direction, that is, the holder 21 that supports the rear end of the small diameter disc D2 moves backward in synchronization with the carry-in of the small diameter disc D2. At this moment, the follower pin 47a on the second swinging member 47 slides on the vertical portion in the guide groove 43b. Accordingly, the second swinging member 47 is at rest, and the follower slider 48 is also at rest.

As the first swinging member 45 swings, therefore, the third swinging member 51 swings through the action of the tension coil spring 53. Accordingly, the guide arm 27 swings about the rivet pin 28 as the fulcrum and the support member 27a thereof impinges on the small diameter disc D2. At this time, the follower pin 7a on the elevator frame 7 is made to move laterally through the lower portion 43e-1 in the cam groove 43e while the follower slider 48 rests. Therefore, the elevator frame 7 still stays at the position of FIG. 37(A).

Figure 27:
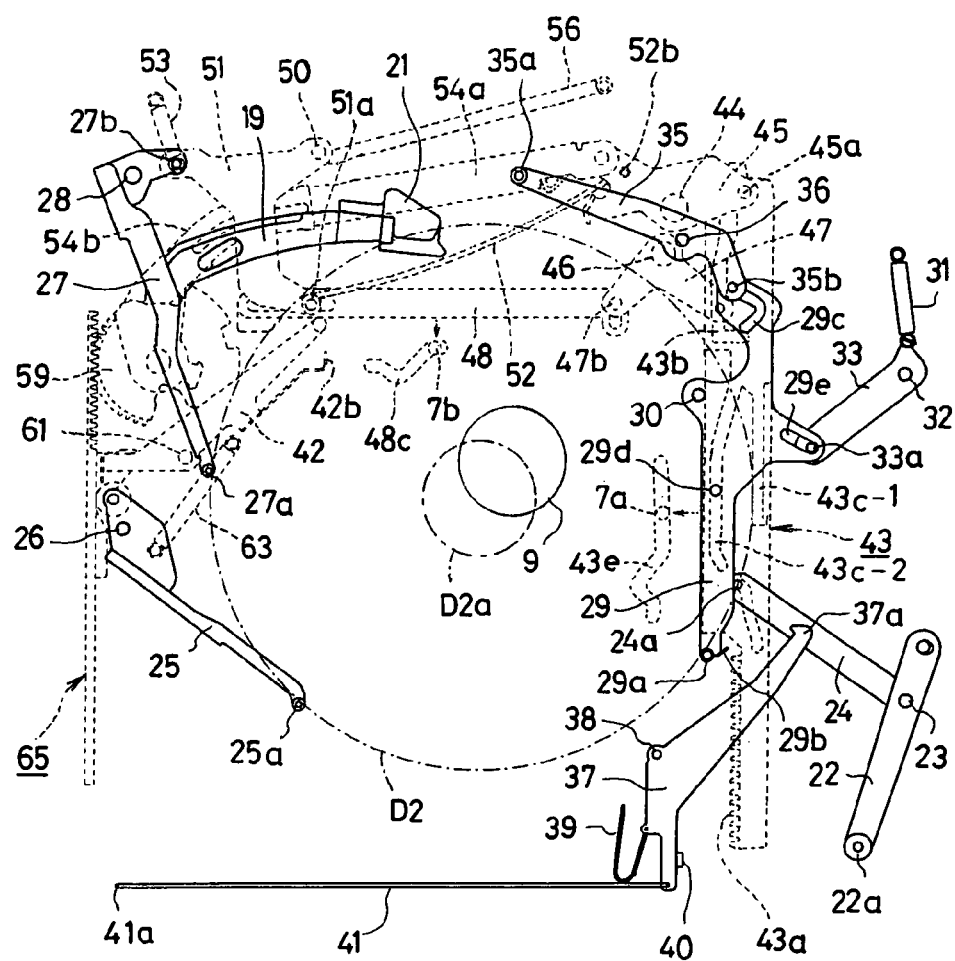
FIG. 27 is a fifth process step diagram illustrative of the state of carrying the small diameter disc.
Figure 34:
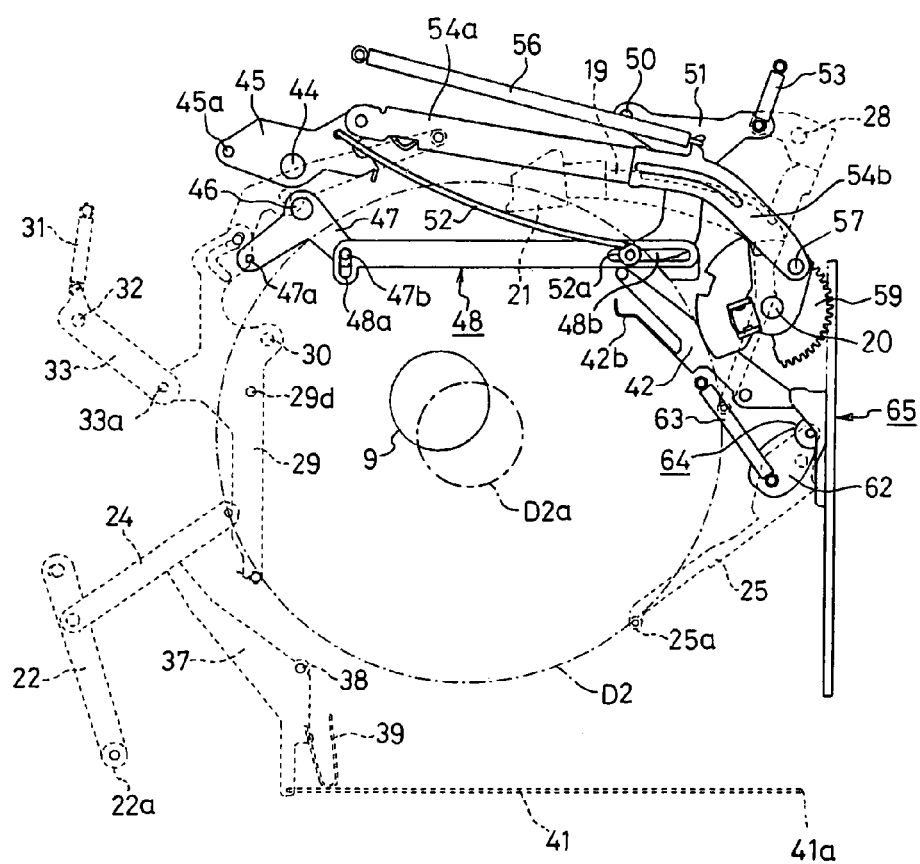
FIG. 34 is a fifth process step diagram illustrative of the state of carrying the small diameter disc.
Figure 35:
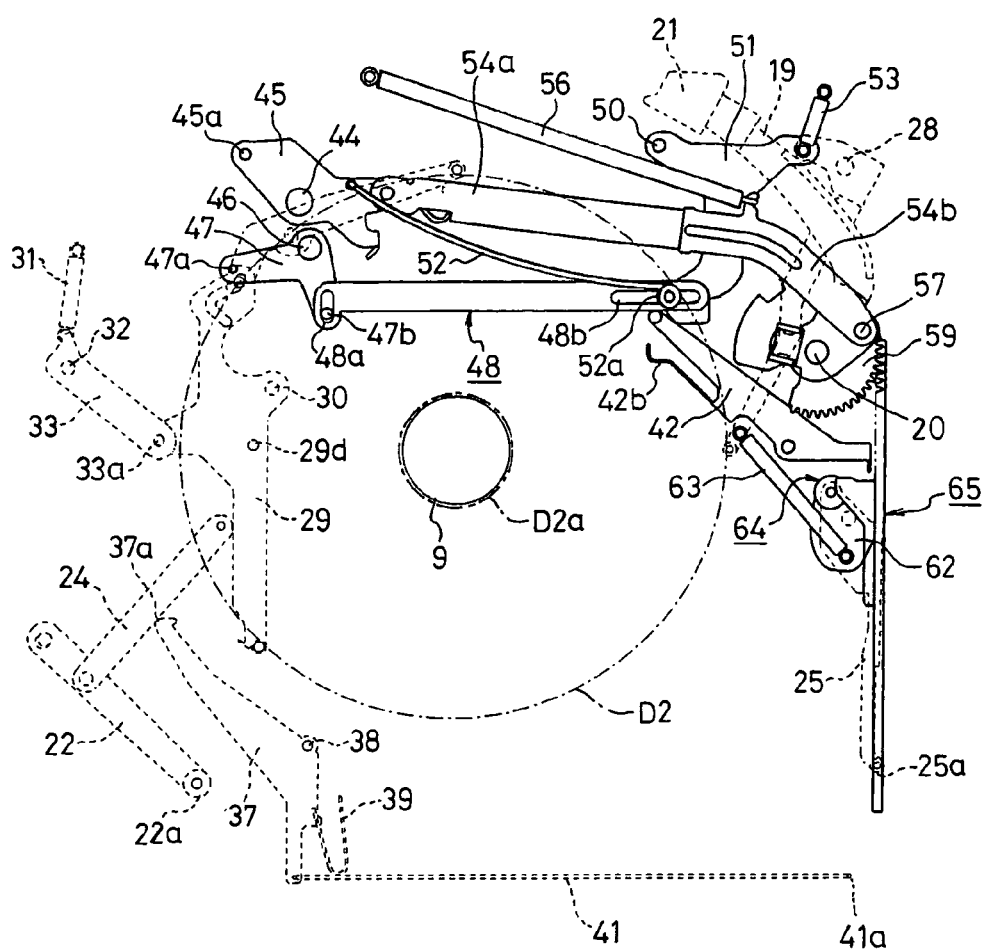
FIG. 35 is a sixth process step diagram illustrative of the state of carrying the small diameter disc.

FIGS. 27 and 34 show a state in which the loading slider 43 additionally moves back from the state of FIGS. 26 and 33 to continuously carry in the small diameter disc D2 while the guide arm 29 halts swinging. In this case, the disc support arm 19 swings in the centrifugal direction and the guide arms 25, 27 swing in the centripetal direction, in accordance with the distance of the movement of the loading slider 43, to support the small diameter disc D2.

Figure 28:
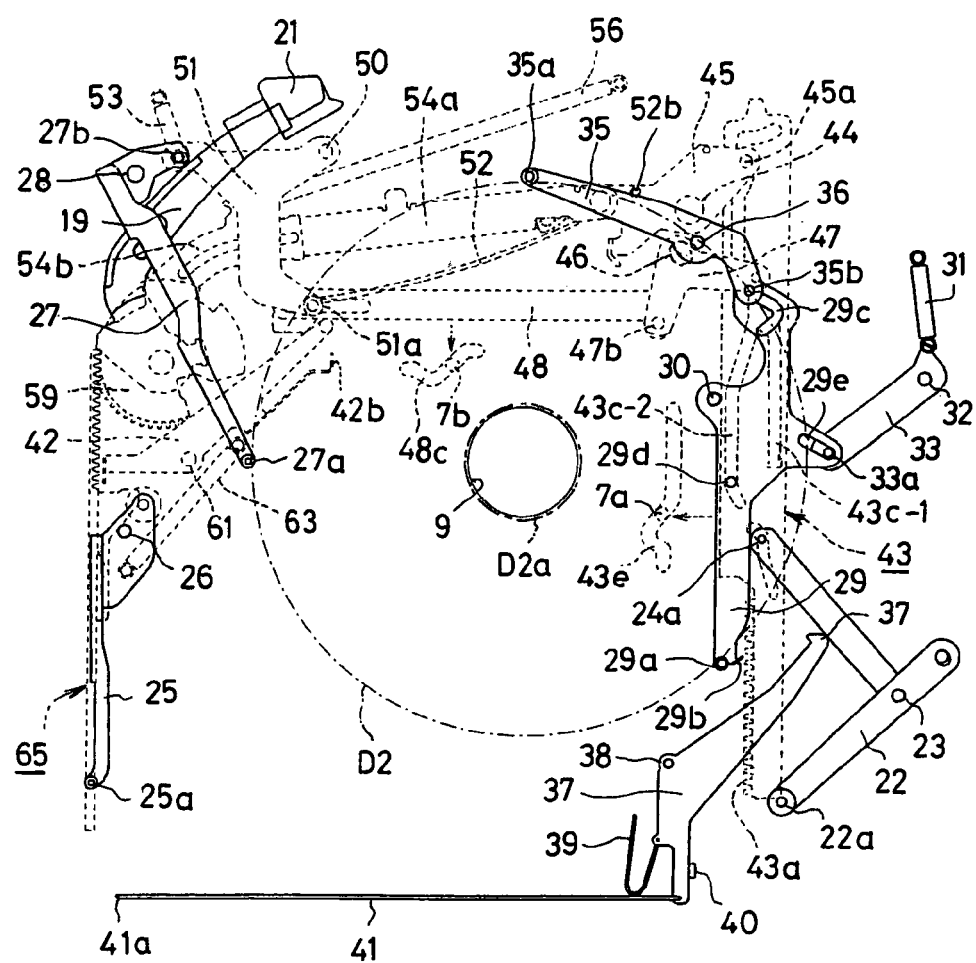
FIG. 28 is a sixth process step diagram illustrative of the state of carrying the small diameter disc.
Figure 36:
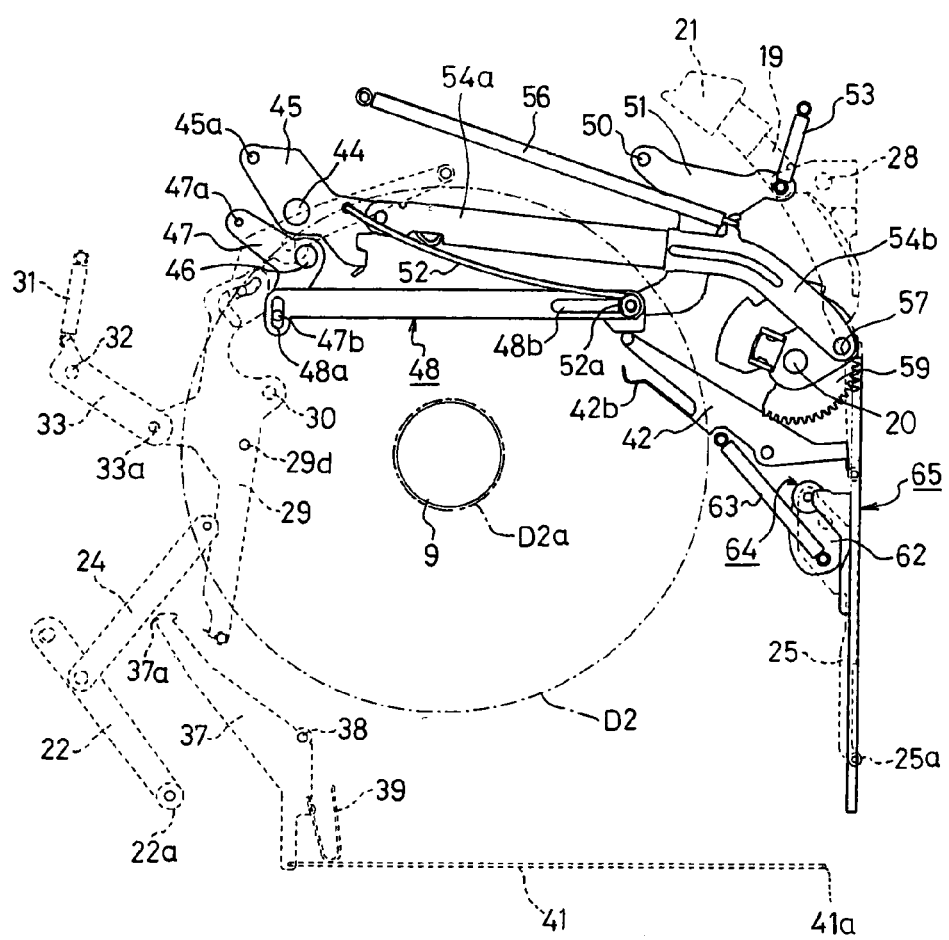
FIG. 36 is a seventh process step diagram illustrative of the state of carrying the small diameter disc.

FIGS. 28 and 36 show a state in which the loading slider 43 additionally moves backward from the state of FIGS. 27 and 34 and stops where the center of the central bore D2a in the small diameter disc D2 meets the center of the clamp head 9. During the transition to such the state, as the loading slider 43 moves backward, the disc support arm 19 greatly swings in the centrifugal direction to terminate supporting the outer rim of the small diameter disc D2. In addition, in response to this swing, the gear disc 59 moves the rack slider 65 forward. As a result, the small diameter portion 64b of the double roller 64 gets on the higher guide piece 65c of the rack slider 65. Therefore, the guide arm 25 swings greatly in the centrifugal direction to terminate supporting the outer rim of the small diameter disc D2. As a result, the guide arm 25 escapes to the side of the elevator frame 7 so as not to extend over the elevator frame 7.

In the above state, the outer rim of the small diameter disc D2 is supported on the support member 27a of the guide arm 27, the support member 29a of the guide arm 29 and the support member 35a of the guide arm 35 at three points. During the transition to this state, a pressing force works from the support member 27a of the guide arm 27 through the action caused by the coil spring 53 to continue carrying in the small diameter disc D2.

In the process steps from FIG. 27 to FIG. 28, as the cam groove 43e in the loading slider 43 moves backward, the follower pin 7a on the elevator frame 7 is made to shift from the lower portion 43e-1 to the slanting portion 43e-2 and ascend it. On the other hand, the follower pin 47a on the second swinging member 47 shifts from the vertical portion 43b-3 of the loading slider 43 to the lower end horizontal portion 43b-2 and the second swinging member 47 swings in the centrifugal direction. Therefore, the action pin 47b horizontally moves the follower slider 48 and accordingly the cam groove 48c horizontally moves. As a result, the follower pin 7b on the elevator frame 7 is made to shift from the lower portion 48c-1 to the slanting portion 48c-2 and ascend it and the elevator frame 7 starts to ascend as shown in FIG. 37(B).

Figure 29:
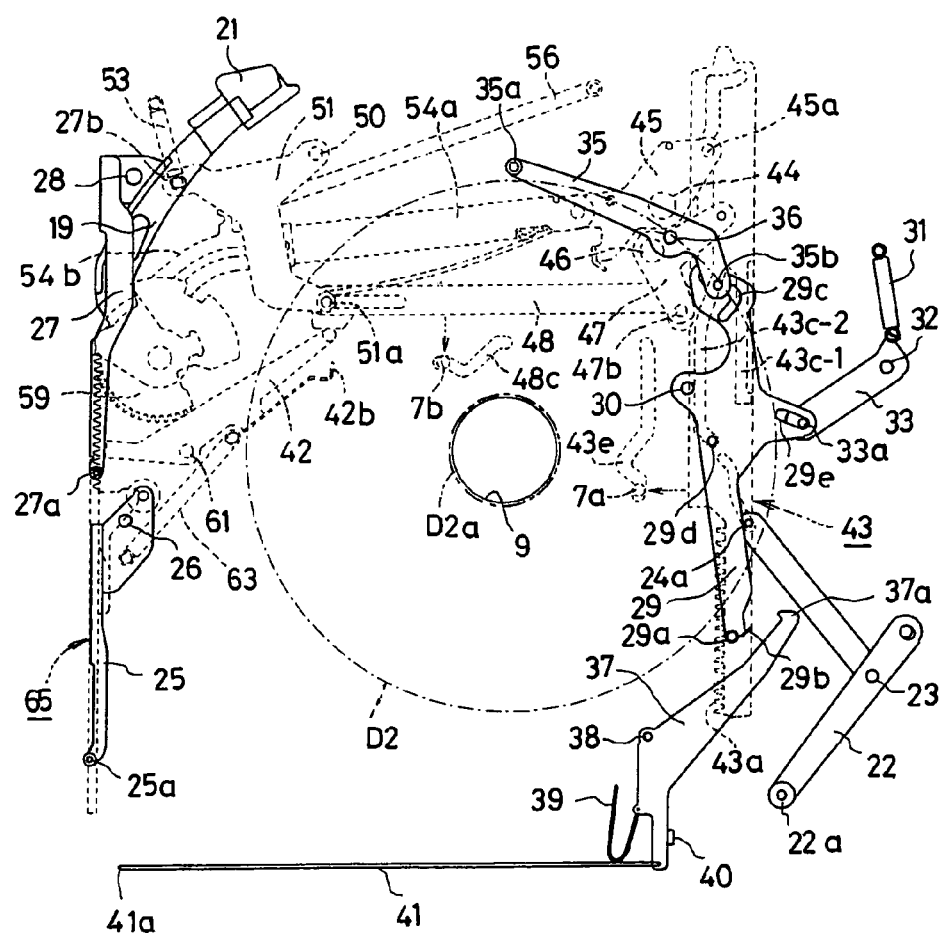
FIG. 29 is a seventh process step diagram illustrative of the state of carrying the small diameter disc.

FIGS. 29 and 36 show a final state in which the clamp head 9 clamps around the central bore D2a of the small diameter disc D2 such that the small diameter disc D2 can be driven. This state can be reached after the guide arms 27, 29, 35 swing to terminate supporting the small diameter disc D2 and not to prevent the small diameter disc D2 from rotating.

On a position where the loading slider 43 additionally moves backward from the state of FIG. 28 and stops, the follower pin 47a is pushed up by the lower end horizontal portion 43b-2 and the second swinging member 47 swings in the centrifugal direction. As a result, the action pin 51a coupled to the end through-hole 48b in the follower slider 48 is pulled and the third swinging member 51 swings in the centripetal direction. As a result, the guide arm 27 swings in the centrifugal direction to terminate supporting the small diameter disc D2.

On the other hand, the guide arm 29 slightly swings in the centrifugal direction because the follower pin 29d thereof reaches the slanting portion in the terminal of the guide groove 43c-2 in the loading slider 43, and the support member 29a terminates supporting the small diameter disc D2. The swing of the guide arm 29 actuates the follower pin 35b coupled to the guide groove 29c thereof, and the guide arm 35 slightly swings in the centrifugal direction to terminate supporting the small diameter disc D2.

In the process steps from FIG. 28 to FIG. 29, the follower slider 48 horizontally moves in synchronization with the backward movement of the loading slider 43. In this case, the follower pin 7a on the elevator frame 7 shifts from the slanting portion 43e-2 of the cam groove 43e in the loading slider 43 to the higher portion 43e-3. On the other hand, the follower pin 7b shifts from the slanting portion 48c-2 of the cam groove 48c in the follower slider 48 to the higher portion 48c-3.

In this process step the elevator frame 7 behaves as below. Namely, the follower pins 7a, 7b ascending the slanting portions 43e-2, 48c-2 elevate the elevator frame 7. In this case, the chuck jaws 9a of the clamp head 9 impinge on the central bore D2a in the small diameter disc D2 and push up the small diameter disc D2 as shown in FIG. 37(C). In addition, the rim of the central bore D2a impinges on the protrusion 2b of the chassis case 2.

When the follower pins 7a, 7b shift from the above state to the tops of the slanting portions 43e-2, 48c-2, the clamp head 9 fits into the central bore D2a in the small diameter disc D2 as shown in FIG. 37(D) to complete clamping the disc by the chuck jaws 9a. Thus, the small diameter disc D2 is secured on the turntable 10. When the follower pins 7a, 7b shift to the higher portions 43e-3, 48c-3, the elevator frame 7 descends to the position shown in FIG. 37(E) to enable the small diameter disc D2 to be driven.

The above description is given to the operation modes of the mechanisms on carrying in the small diameter disc D2 in accordance with the disc device 1 of the present invention. At the time of carry-out, in contrast, the mechanisms operate in the operation modes in reverse order to those at the time of carry-in described above, as the loading slider 43 moves forward. Namely, carrying out the small diameter disc D2 is started, and the loading slider 43 starts to move forward. Then, the elevator frame 7 once ascends and then descends to the initial position as shown in FIGS. 38(A)-(E). During this process, the clamp release pin 71 pushes up the small diameter disc D2 as shown in FIG. 38(C) to release the disc from clamping by the clamp head 9.

In the process steps until clamping the small diameter disc D2 is released as described above, the guide arms 25, 27, 29 swing in the centripetal direction and support the outer rim of the small diameter disc D2 as shown in FIG. 28. Subsequently, in the operations in reverse order of FIGS. 27-24, the disc support arm 19 swings in the centripetal direction and causes a force. The force is used to carry out the small diameter disc D2, of which front end is exposed through the slot 3a in the front bezel and stopped.

The disc device 1 of the present invention of the slot-in type is thus configured to support at least three locations on the outer rim of the large diameter disc D1 and the small diameter disc D2 using the plurality of arms that are actuated in synchronization with the forward and backward movement of the loading slider 43. Accordingly, in the loading system with swinging arms, it is made possible to automatically loading discs different in diameter.

Figure 44:
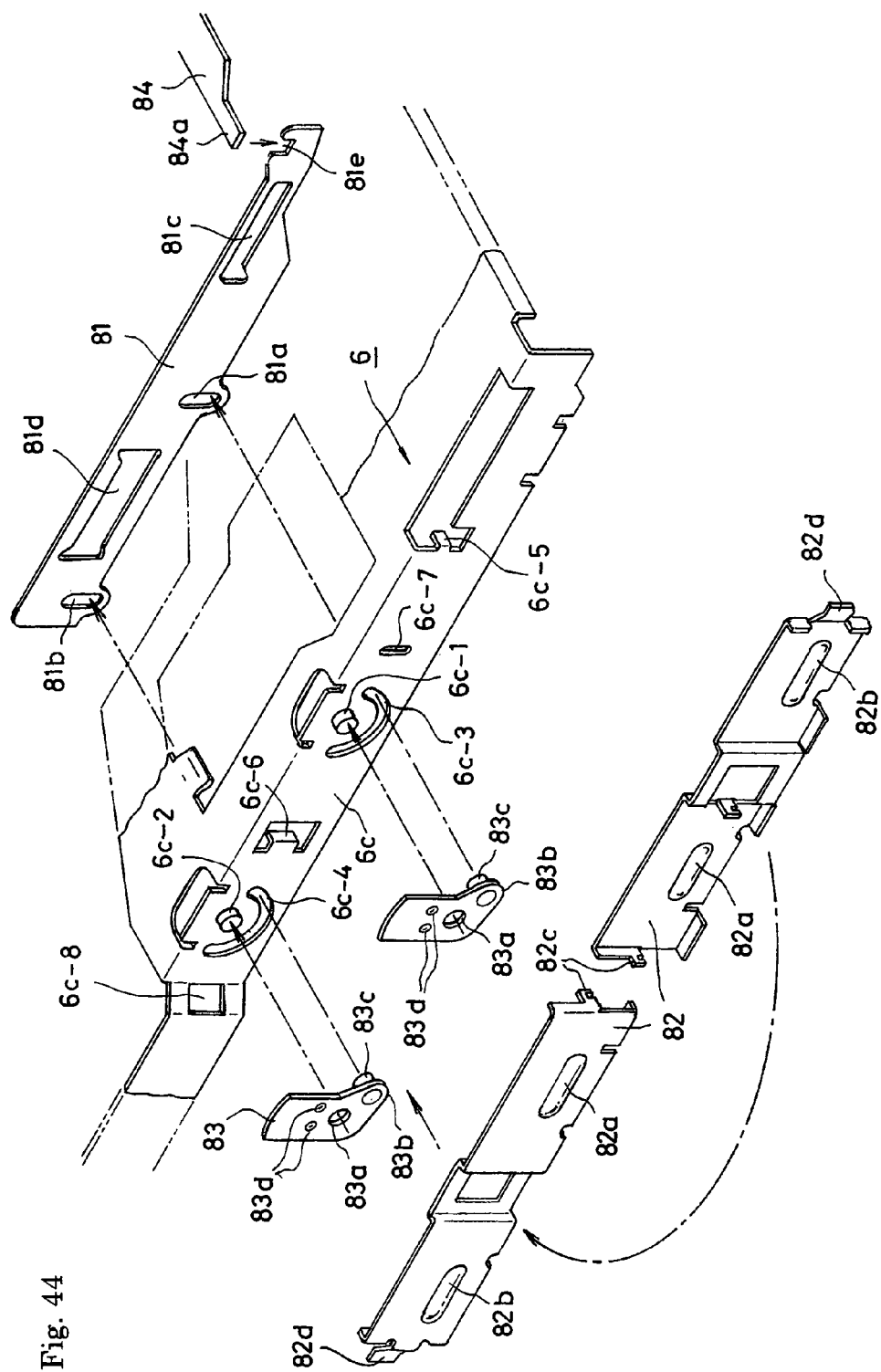
FIG. 44 is an exploded perspective view showing an arrangement of the major part of the present invention.

The following detailed description is given to the arrangement of the shutter mechanism configured to solve the above-described subject of the present invention. FIG. 44 is an exploded perspective view of the shutter mechanism according to the present invention. The components are assembled on a front flange 6*c* hanging down in the front of the base panel 6. On right and left positions spaced equidistant from the position on the front flange 6*c* corresponding to the center of the aperture of the slot 3*a* in the front bezel 3, pivot pins 6*c*-1, 6*c*-2 are provided standing. In addition, circular-arc slits 6*c*-3, 6*c*-4 are formed around the pivot pins 6*c*-1, 6*c*-2. The front flange 6*c* includes guide pieces 6*c*-5, 6*c*-6 formed to guide a slide member 81 and directed to the rear surface, and through-holes 6*c*-7, 6*c*-8 formed to receive a shutter cover 82 attached thereto. The front flange 6*c* thus configured is used to support a pair of shutter pieces 83 rotatable.

The shutter piece 83 used in the present invention includes a main constituent, which is rectangular. It includes a through-hole 83*a* formed in the lower portion and rotatably supported about the pivot pin 6*c*-1, 6*c*-2. A link piece 83*b* obliquely extending below the through-hole 83*a* has a follower pin 83*c* thereon, which faces the slit 6*c*-3, 6*c*-4 and has a tip extends to the rear surface of the front flange 6*c*. The shutter piece 83 has dimples 83*d* formed thereon and slightly protruded therefrom toward the front surface of the front flange 6*c*. The dimples keep a slight clearance between the shutter piece and the front surface of the front flange 6*c* and prevent the sliding contact resistance from increasing.

The slide member 81 disposed on the rear surface of the front flange 6*c* has longitudinally elongated through-holes 81*a*, 81*b*, which are coupled to the follower pin 83*c* on the shutter piece 83 formed therethrough. In addition, there are formed therethrough a laterally elongated through-hole 81*c*, which engages the guide piece 6*c*-5, and a laterally elongated through-hole 81*d*, which engages the guide piece 6*c*-6. The slide member 81 has an end having a recess 81*e* formed therein to engage a tip 84*a* of a link arm 84. The other end of the link arm 84 is provided with a follower pin 85 as shown in FIG. 45, of which tip is guided through the cam groove 43*f* formed in the end of the loading slider 43. The link arm is configured to pivot about the pivot pin 86 as the fulcrum such that the tip 84 swings.

The shutter cover 82 for preventing the shutter piece 83 from dropping off the front flange 6*c* has laterally elongated, embossed portions 82*a*, 82*b* formed on portions corresponding to the right and left shutter pieces 83. The embossed portions partly contact the front surface of the shutter pieces 83 to keep a clearance therebetween and prevent the sliding contact resistance from increasing. The shutter cover 82 has engagement pieces 82*c*, 82*d* on both ends thereof. The engagement piece 82*c* engages the through-hole 6*c*-7 in the front flange 6*c* while the engagement piece 82*d* engages the through-hole 6*c*-8. The shutter cover 82 is herein engaged at both ends though the present invention is not limited to this example. Even when the shutter is closed (the shutter piece 83 is raised), the user may intend to insert a disc and press the shutter piece 83. In this case, the shutter cover 82 deforms in response to the pressure force and swells to the outside but returns to the original form by the resilience when the pressure force vanishes. If the shutter cover 82 greatly deforms, however, the shutter piece 83 greatly tumbles and may possibly lose the function as the shutter. In such the case, the shutter cover 82 may be engaged on three points: both ends and the central portion.

The shutter mechanism of the present invention is assembled as above. Accordingly, when the link arm 84 is actuated, the shutter piece 83 is raised and tumbled in synchronization therewith. FIG. 45 is an illustrative view of the operating states of the shutter piece 83, which shows only the movable parts, that is, the shutter piece 83 and the slide member 81 to facilitate understanding. The parts associated with the loading slider 43 and the link arm 84 are shown in the same plane.

Figure 45A:
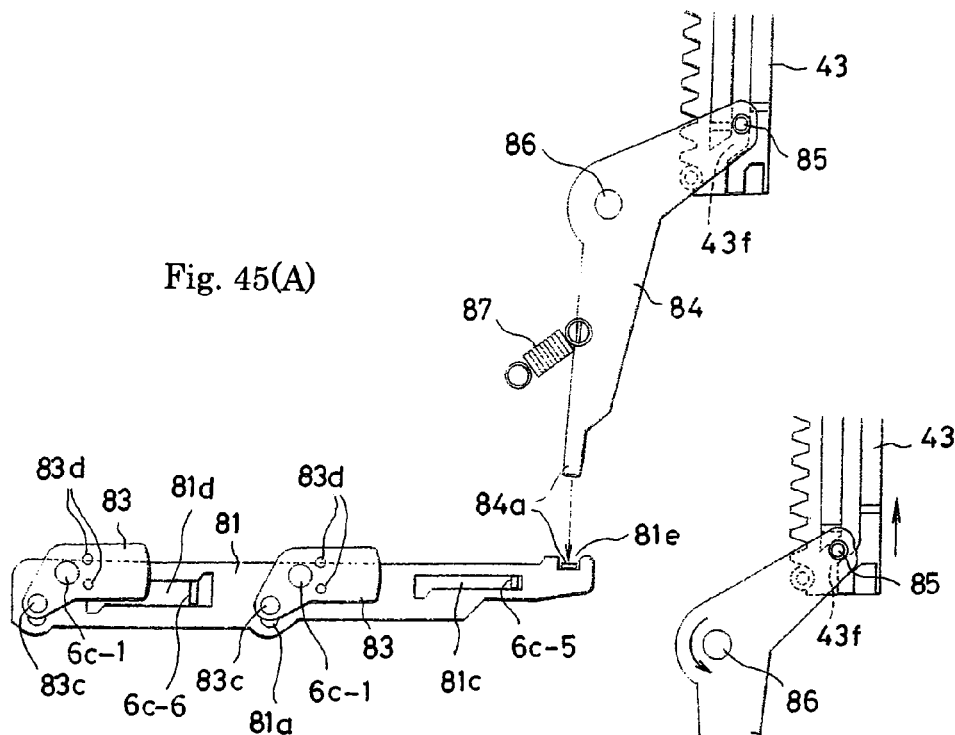
FIGS. 45(A)-45(C) show diagrams illustrative of the operation of the shutter mechanism of the present invention.

FIG. 45(A) shows a state in which the large diameter disc D1 or the small diameter D2 stays in the final process of automatic loading. The loading slider 43 continuously moves backward to this state though the follower pin 85 rests on the horizontal portion in the cam groove 43*f*, and the link arm 84 does not start pivoting. Therefore, the shutter piece 83 stays in the initial position, that is, tumbled.

Figure 45B:
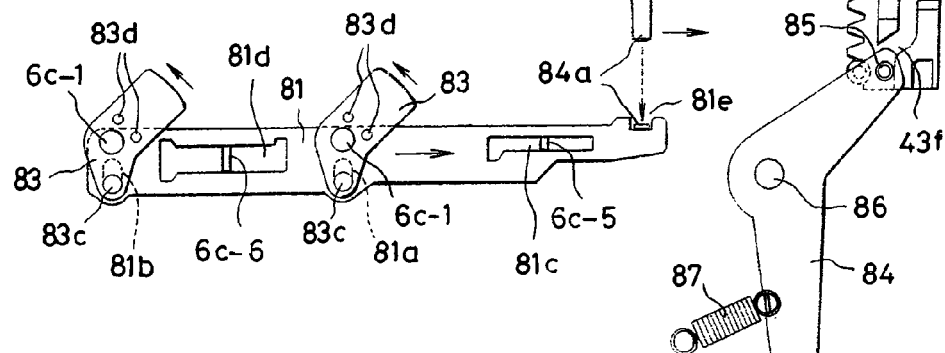

As the loading slider 43 additionally moves backward from the state shown in FIG. 45(A), the follower pin 85 reaches the slanting portion in the cam groove 43*f* as shown in FIG. 45(B). Accordingly, the link arm 84 starts to pivot about the pivot pin 86 as the fulcrum to swing the tip 84*a* and the slide member 81 starts to slide in the direction indicated by the arrow as shown in the same figure. As a result, the follower pins 83*c* on the shutter pieces 83 are pulled by the through-holes 81*a*, 81*b* in the slide member 81 to start standing.

Figure 45C:
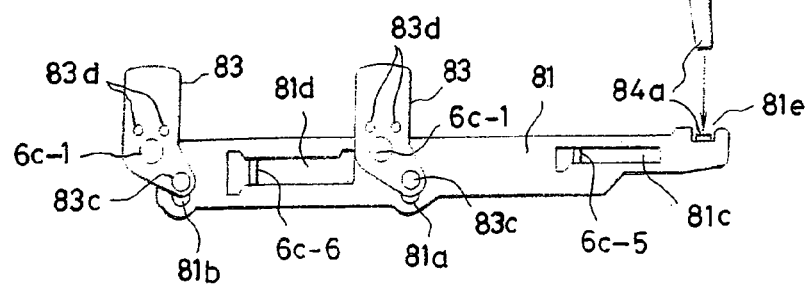
Figure 46:
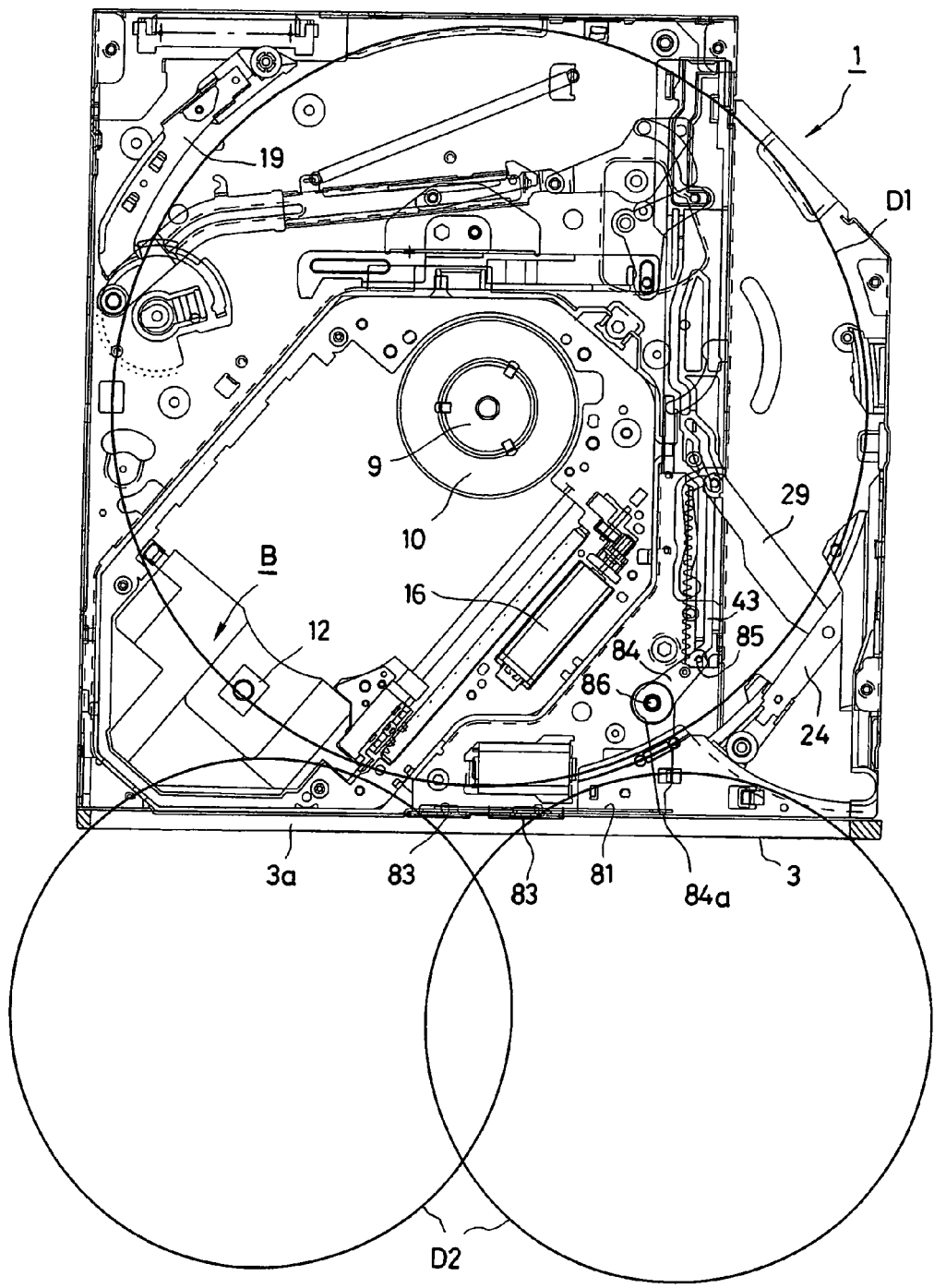
FIG. 46 is a diagram illustrative of the action of the shutter mechanism of the present invention.

FIG. 45(C) shows a state in which the loading slider 43 additionally moves backward from the state shown in FIG. 45(B), and, after completion of clamping the large diameter disc D1 or the small diameter disc D2, the loading slider 43 halts the backward movement. When this state is reached, the shutter pieces 83 pulled by the through-holes 81*a*, 81*b* in the slide member 81 fully stand spaced to block the central portion of the slot 3*a* in the front bezel 3. As a result, as shown in FIG. 46, the shutter pieces 83 prevent the small diameter disc D2 from entering and contacting the large diameter disc D1 housed inside.

Preferably, one aperture end of the slot 3*a* and a side end of the shutter piece 83 opposed thereto have a distance of 55.1 mm or less therebetween.

On carrying out the large diameter disc D1 or the small diameter disc D2 housed inside, the above-described operations are executed in reverse order. In this case, immediately after the loading slider 43 starts to move forward, the shutter pieces 83 fall down to the state of FIG. 45(A) and accordingly do not prevent the large diameter disc D1 or the small diameter disc D2 from being carried out. At this time, the link arm 84 returns to the initial position through the action of a tension coil spring 87.

Figure 47:
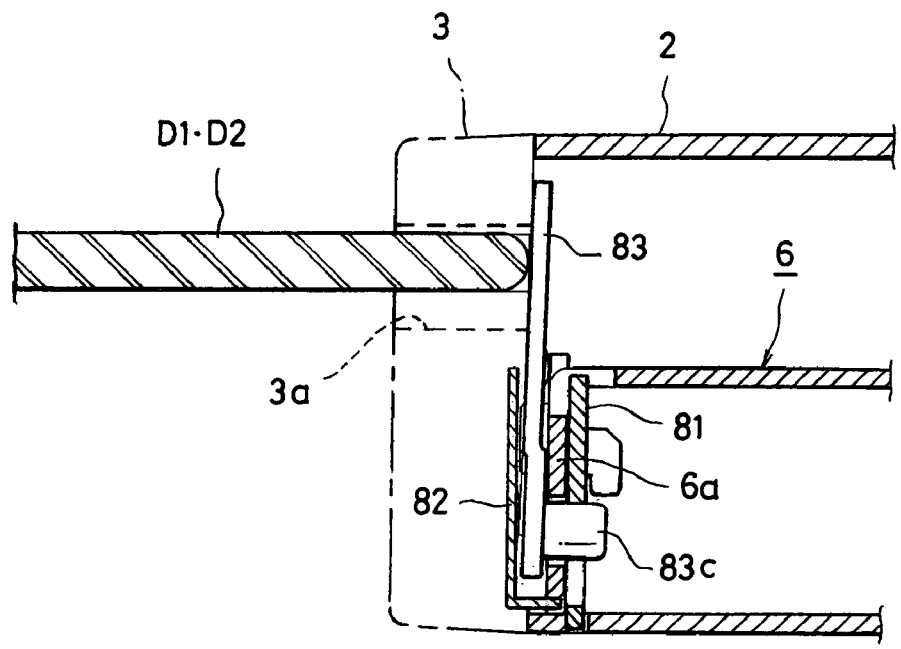
FIG. 47 is a diagram illustrative of the action of the shutter mechanism of the present invention.

Thus, in the shutter mechanism of the present invention, the reciprocation of the slide member 81 turns the shutter pieces 83 between the raised and tumbled states. As the shutter pieces 83 have no parts that contact other members at acute angles, the drive torque is not made larger. Thus, it is possible to execute a stable operation with no variation over time. The shutter piece 81 raised as shown in FIG. 47 has a lower half, which is held by the shutter cover 82. Accordingly, it is possible to make the structural hardness kept higher.

Figure 48:
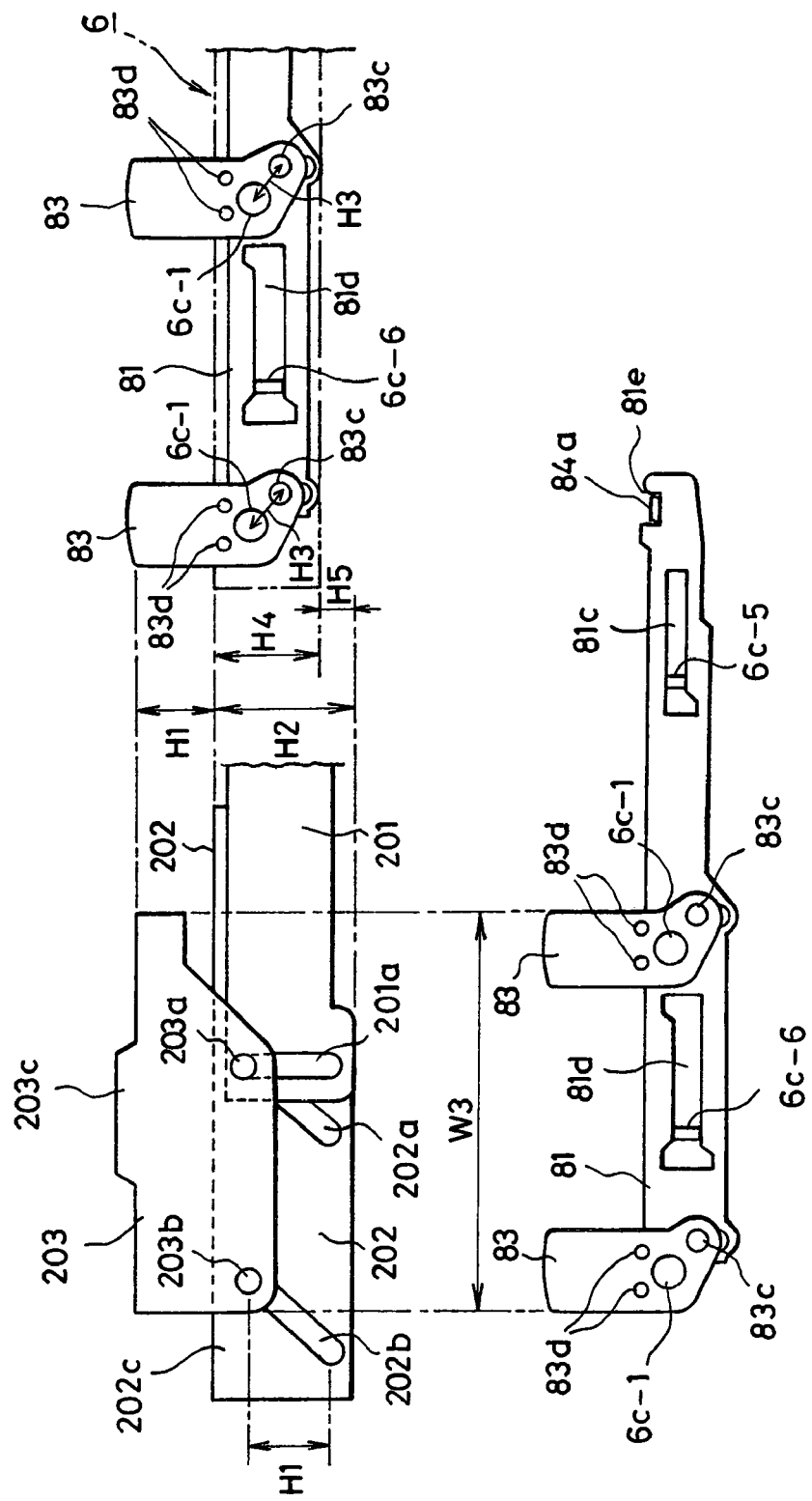
FIG. 48 is a diagram illustrative of the feature of the shutter mechanism of the present invention.

In the shutter mechanism of the type that moves the shutter 203 upward/downward as described above, the vertical width required for blocking the central portion of the slot is equal to H1 as shown in FIG. 48. In this case, the upward/downward movement of the pin 203*a*, 203*b* also has a stroke of H1. Therefore, in order to ensure the stroke H1, the width H2 of the front flange 202*c* of the base panel 202 is determined from the lengths of the vertical groove 201*a* and the slanting groove 202*a*, 202*b* as shown in the same figure, and the width H2 can not be reduced further.

To the contrary, in the shutter mechanism of the present invention, the width H1 can be ensured with the shutter piece 83 having the tip that stands as the lower end pivots. Accordingly, the width for ensuring the stroke to actuate the shutter piece 83 can be determined from a distance H3 between the pivot pin 6c-1, 6c-2 and the follower pin 83c. Therefore, it is possible to establish the condition H1>H3. Thus, the width H4 of the front flange 6c of the base panel 6 can be made smaller by a width H5 than the width H2 of the front flange 202c of the known base panel 202. As a result of prototype manufacturing based on the above condition, the width H4 of the front flange 6c of the base panel 6 can be made equal to 6 mm. The width of the front flange 202c of the base panel 202 in the conventional disc device has a width of 7.5 mm. Therefore, the base panel 6 can be made to have a relatively great reduction of 1.5 mm in width.

Figure 49:
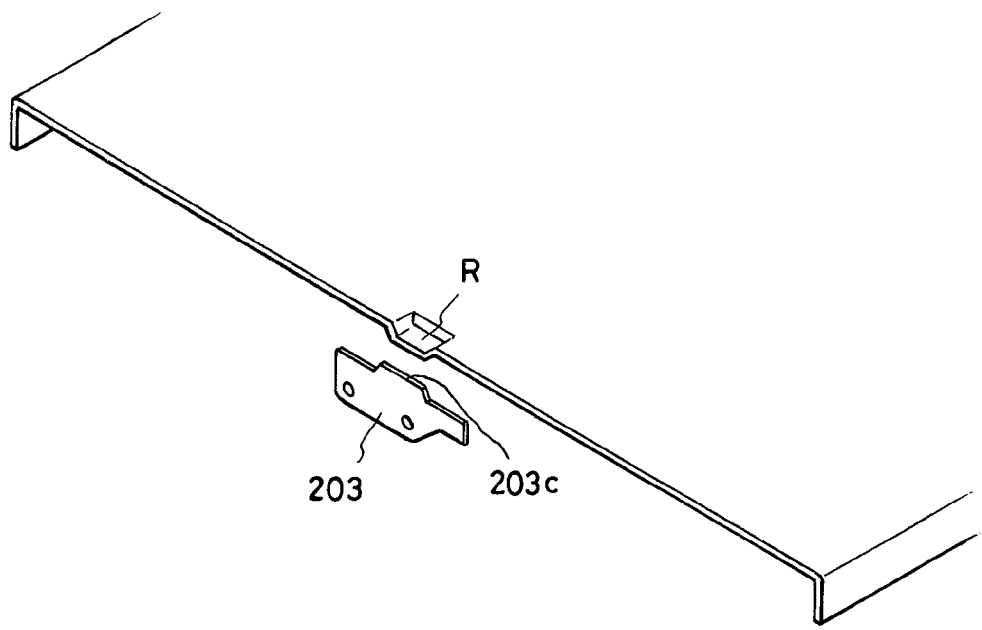
FIG. 49 is a diagram illustrative of an arrangement of a chassis case of the related art.
Figure 50:
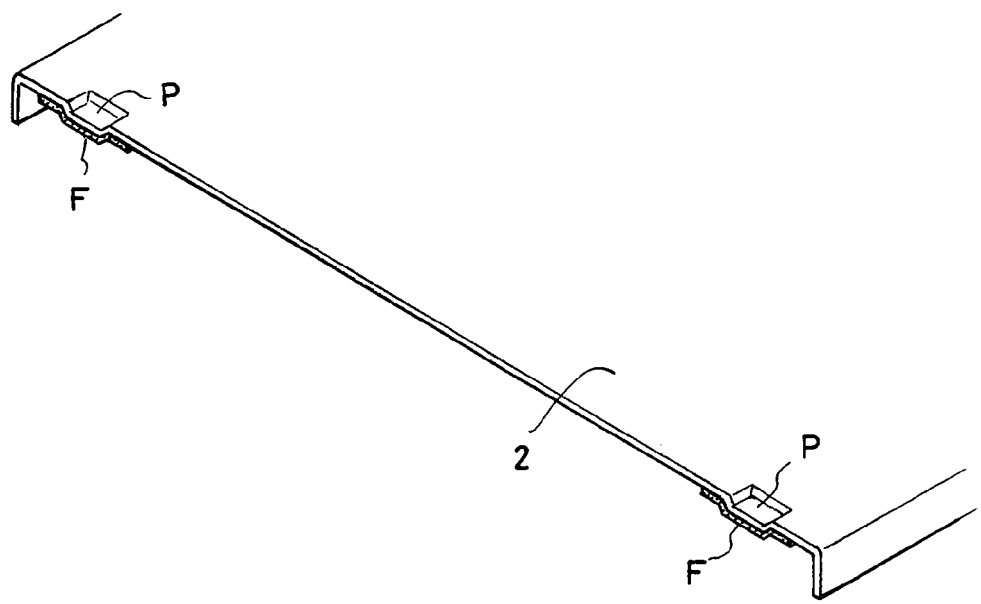
FIG. 50 is a diagram illustrative of an arrangement of a chassis case used in the present invention.
Figure 51:
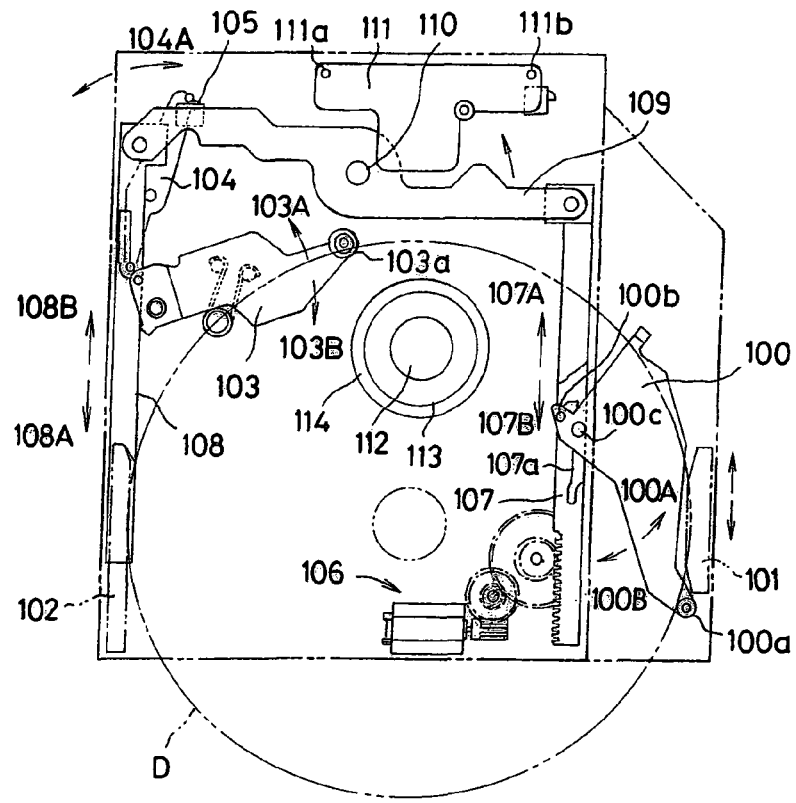
FIG. 51 is a plan view showing a disc device of the related art.
Figure 52:
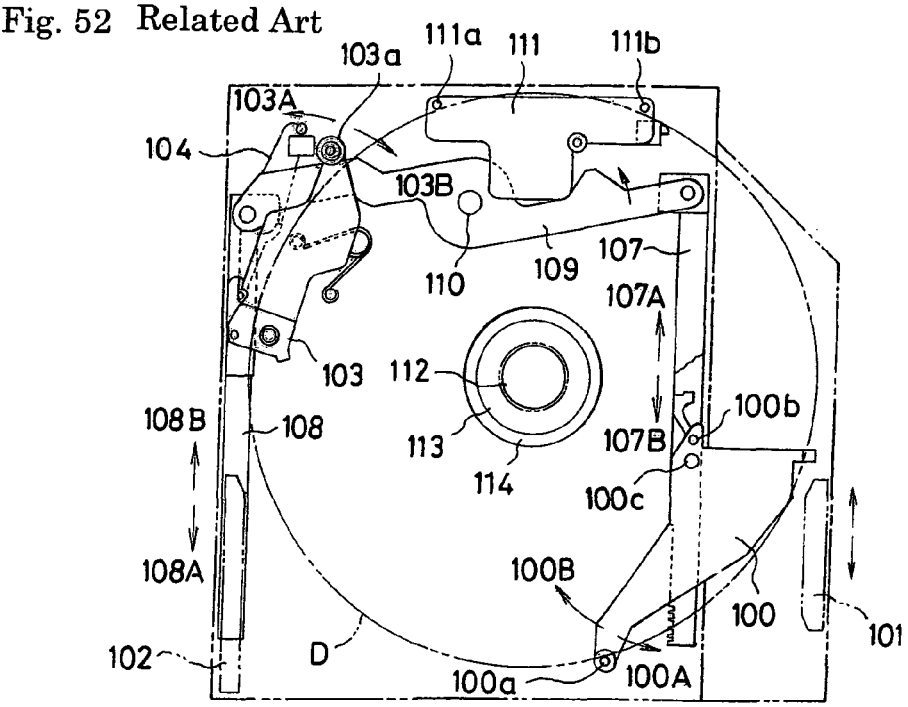
FIG. 52 is a plan view showing the disc device of the related art.
Figure 53:
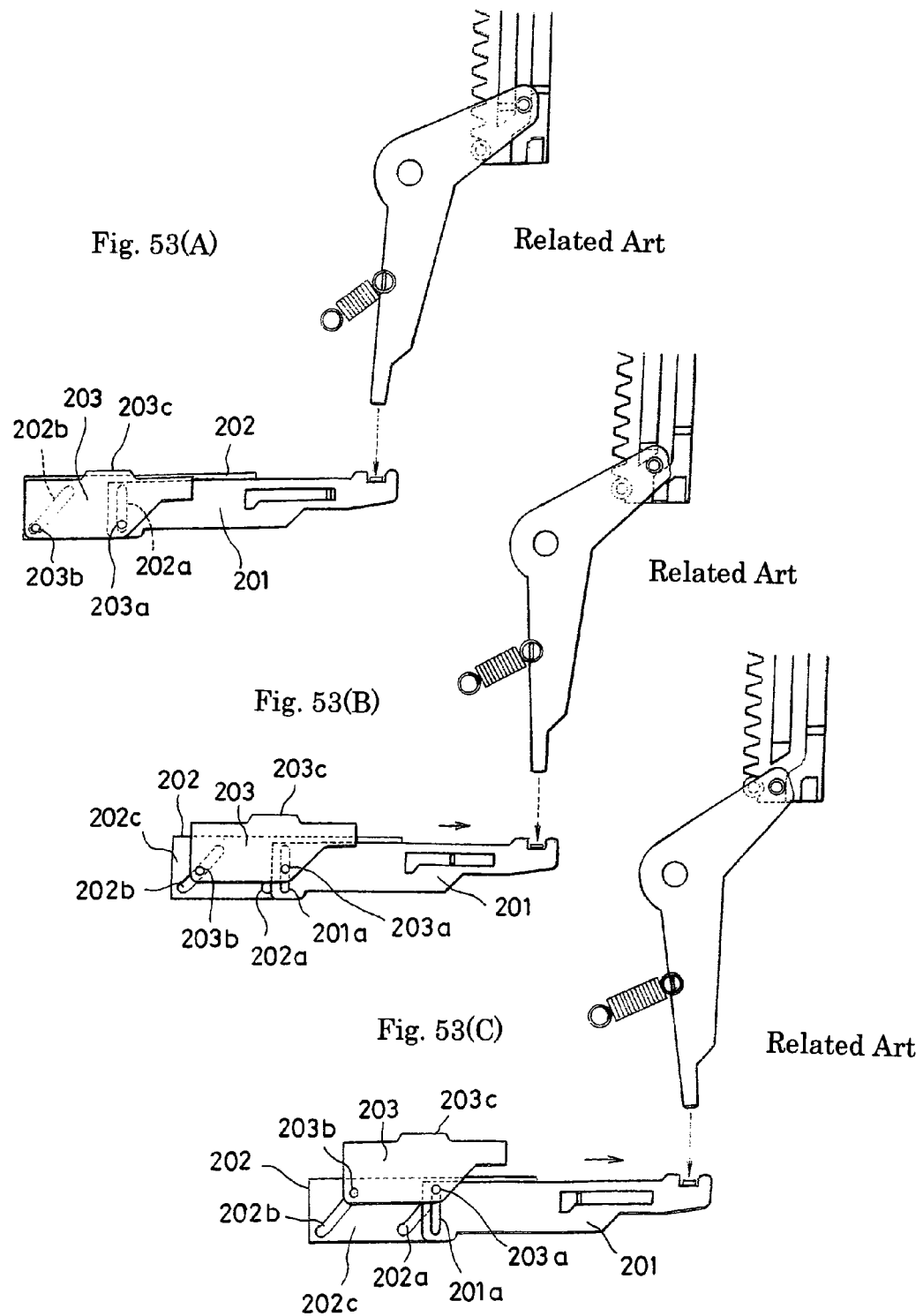
FIGS. 53(A)-53(C) are diagrams illustrative of the operation of a shutter mechanism of the related art.
Figure 54:
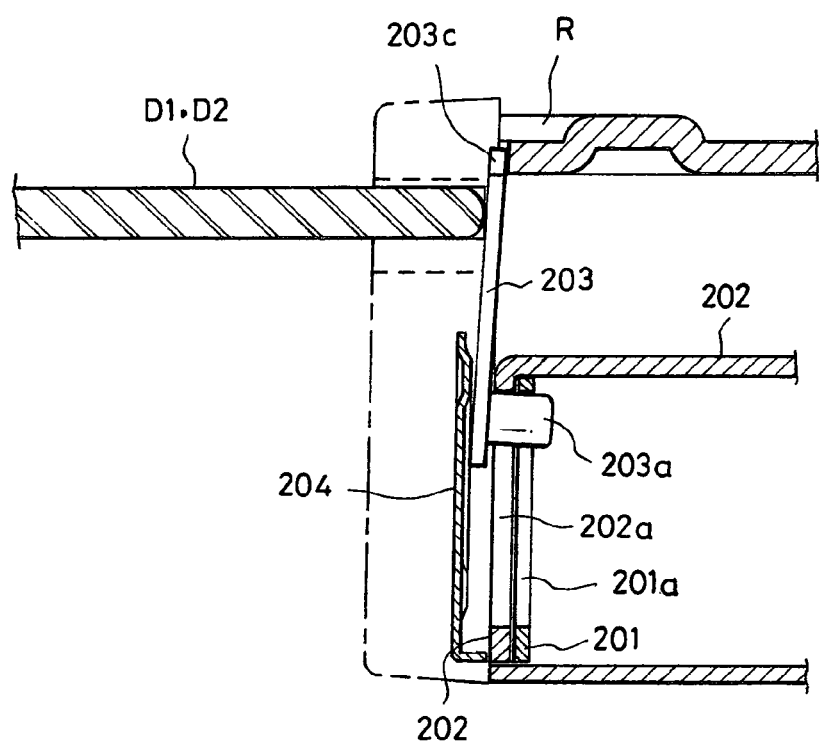
FIG. 54 is a diagram illustrative of the action of a shutter mechanism of the related art.
Figure 55:
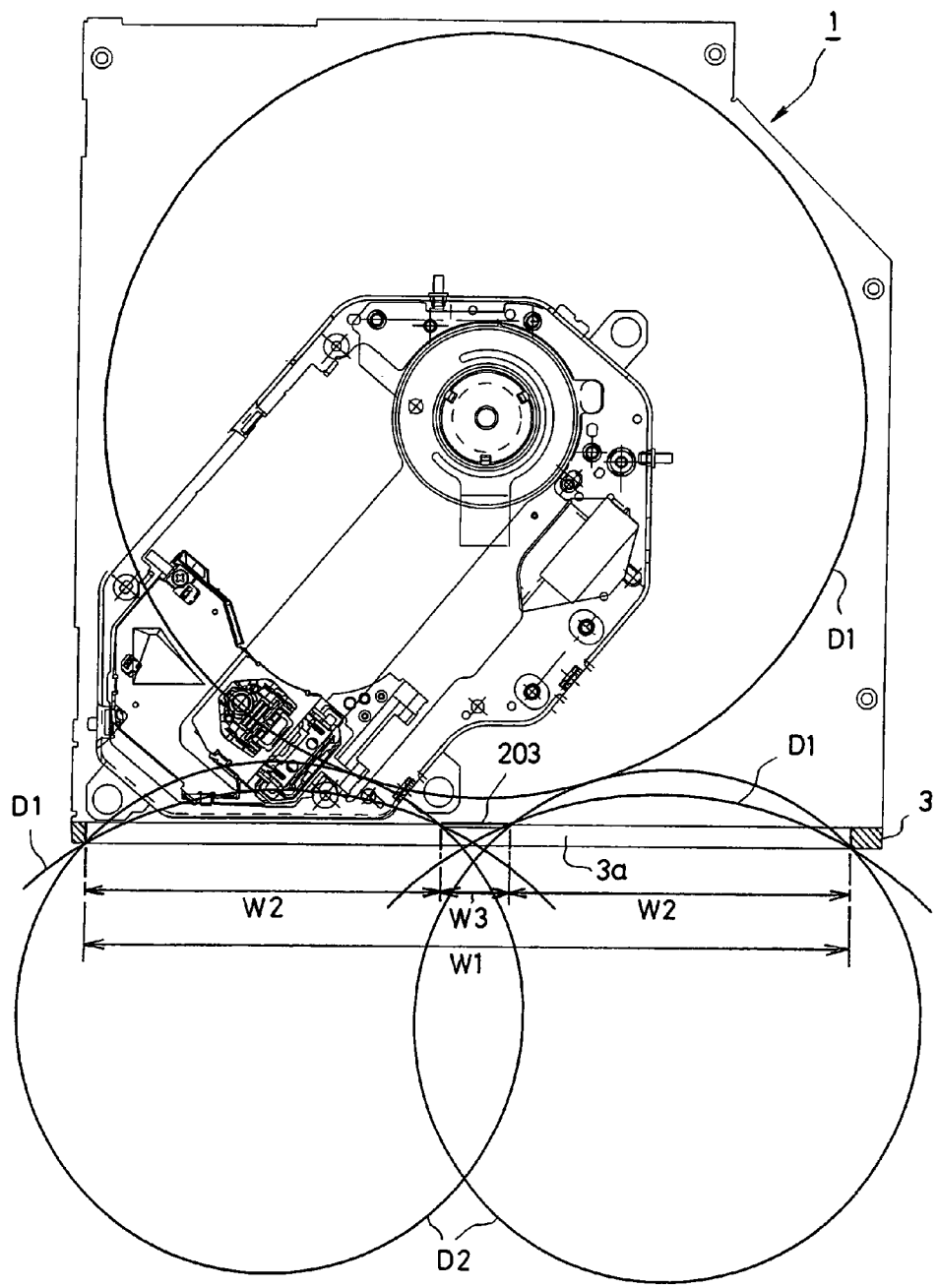
FIG. 55 is a diagram illustrative of a malfunction caused in the shutter mechanism of the related art.

Further, in the known shutter mechanism, as shown in FIG. 49, a recess R protruding to the rear surface is formed on the central portion of the chassis case 2. A protrusion 203c of the shutter 203 is made to impinge on the recess R to prevent the shutter from falling down. In the present invention, however, the shutter mechanism has higher structural hardness and accordingly does not require such the recess R to be formed in the chassis case 2. In the present invention, on carrying in the large diameter disc D1, the upper end thereof is kept from damaging. Therefore, an elastic material F such as felt is adhered to a portion, in which a recess P is formed, as shown in FIG. 50. As a result, once the large diameter disc D1 is inserted, the upper surface of the side end of the large diameter disc D1 is guided along the elastic material F to restrict the insertion height and keep the upper surface from damaging.

As described above in detail, in the shutter mechanism of the present invention, the stroke for actuating the shutter piece 83 is determined from the distance H3 between the pivot pin 6c-1, 6c-2 and the follower pin 83c. Therefore, the smaller the distance H3 is made the smaller the width H4 of the front flange 6c of the base panel 6 can be made. In this case, as the distance H3 is made smaller, the drive torque for the shutter piece 83 must be made relatively larger. The drive torque, though, comprises only rotation torque and does not become a large impediment for implementation.

What is claimed is:

1. A disc device having a plurality of arms configured to support the outer rim of a disc carryable such that the disc inserted through a slot formed in a front bezel can be automatically carried in the device and the disc carried inside the device can be automatically carried out of the device, the device comprising:
    a shutter piece located on a position of a central portion of the slot in the front bezel and configured to rotate about one end thereof to raise/tumble the other end thereof, the shutter piece being shorter in length than the height of the device;
    a front flange configured to rotatably support the shutter piece, wherein an axis of rotation of the shutter piece is perpendicular to the front bezel;
    a rotation means configured to rotate the shutter piece such that the shutter piece changes from the tumbled state to the raised state after the disc is carried in the device while the shutter piece changes from the raised state to the tumbled state before the disc is carried out of the device; and
    a loading slider to be moved forward/backward to carry the disc in/out, wherein the rotation means is a link arm linked to the loading slider and configured to raise/tumble the shutter piece in engagement with the forward/backward movement of the loading slider.

2. The disc device according to claim 1, wherein the shutter piece is one of a pair of shutter pieces, which are located on the central portion of the slot and spaced at a certain interval.

3. The disc device according to claim 2, wherein one aperture end of the slot and a side end of the shutter piece opposed thereto have a distance of 55.1 mm or less therebetween.

* * * * *